USOO6122572A

United States Patent [19]
Yavnai

[11] Patent Number: 6,122,572
[45] Date of Patent: Sep. 19, 2000

[54] AUTONOMOUS COMMAND AND CONTROL UNIT FOR MOBILE PLATFORM

[75] Inventor: Arie Yavnai, Kiryat Bialik, Israel

[73] Assignee: State of Israel, Haifa, Israel

[21] Appl. No.: 08/952,145

[22] PCT Filed: Apr. 29, 1996

[86] PCT No.: PCT/EP96/01789

§ 371 Date: Nov. 10, 1997

§ 102(e) Date: Nov. 10, 1997

[87] PCT Pub. No.: WO96/35982

PCT Pub. Date: Nov. 14, 1996

[30] Foreign Application Priority Data

May 8, 1995 [IL] Israel ........................................ 113647
Apr. 2, 1996 [IL] Israel ........................................ 117792

[51] Int. Cl.⁷ ...................................................... G06F 7/00
[52] U.S. Cl. ................................. 701/23; 701/3; 701/36; 701/200; 342/13; 342/16
[58] Field of Search .................................... 701/3–13, 23, 701/27, 36, 200, 208; 342/13, 16; 244/2, 3.16, 75 R, 76 R; 367/131; 434/29, 30, 31, 34, 38

[56] References Cited

U.S. PATENT DOCUMENTS

| | | | |
|---|---|---|---|
| 3,612,837 | 10/1971 | Brandau | 235/150.2 |
| 4,868,755 | 9/1989 | McNulty et al. | 701/1 |
| 5,340,056 | 8/1994 | Guelman et al. | 244/3.16 |
| 5,508,928 | 4/1996 | Tran | 364/423 |
| 5,608,627 | 3/1997 | Lecomte | 701/3 |

OTHER PUBLICATIONS

Arie Yavnai, "Context Recognition and Situation Assessment in Autonomous Mobile Robots", vol. 1831pp. 119–130 (1992). month, date unknown.
F.C.A. Groen et al., "Intellignet Autonomous Systems", pp. 428–438. no date.

A. Yavnai, "Context Recognition and Situation Assessment in Intelligent Autonomous Systems", pp. 394–399, (1993). month/date unknown.
Dimitri P. Bersekas, "Dynamic Progarmming", (1987). month/date unknown.
Avron Barr et al. "The Handbook of Artificial Intelligence", vol. 1 and II. date unknown.
Paul R. Cohen et al. The Handbook of Artificial Intelligence, vol. III. date unknown.
Richard Bellman"Adaptive Control Processes: A Guided Tour", Princeton Univesity Press, (1961). month/date unknown.
Shimon Even, "Graph Algorithms", Computer Science Press. month/date unknown.

(List continued on next page.)

*Primary Examiner*—William A. Cuchlinski, Jr.
*Assistant Examiner*—Yonel Beaulieu
*Attorney, Agent, or Firm*—Oliff & Berridge, PLC

[57] ABSTRACT

In a vehicle designed for the execution of a mission, a programmable decision unit capable of managing and controlling the execution of the mission by utilizing a plurality of subsystems and database capable of holding and managing data including pre-stored data and data acquired by and received from the plurality of subsystems. The programmable decision unit includes a mission plan (MP) for accomplishing the execution of the mission includes a succession of iterations that include each assignment of a mission segment associated with a current mission stated to one or more of the subsystems. Each iteration further includes receipt from the subsystems report data which include data indicative of the execution status of the mission segment by the corresponding subsystem; and evaluation of the report data for determining either normal behavior or an exceptional event. The programmable decision unit is capable of managing and controlling the execution of the mission in an autonomous fashion whereby the vehicle becomes an autonomous vehicle.

60 Claims, 20 Drawing Sheets

OTHER PUBLICATIONS

Mourad Barkat, "Signal Detection and Estimation", State University of New York, (1991). month/date unknown.

Lawrence R. Rabiner et al., "Theory and Application of Digital Signal Processing", (1975). month/date unknown.

Arie Yavnai, "Context Recognition and Situation Assessment in Autonomous Mobile Robots", pp. 119–130, vol. 1831 Mobile Robots VII, (1992). month/date unknown.

Arie Yavnai, "Arbitration Network, A New Approach for Combining Reflexive Behaviors and Reasoning–Drive Behaviors in Intelligent Autonomous", pp. 428–438. no date.

Arie Yavnai, "Distributed Decentralized Architecture for Autonomous Cooperative Operation of Multiple Agent System", pp. 95–101.

Arie Yavnai, "Criteria of System Autonomability", pp. 448–458. no date.

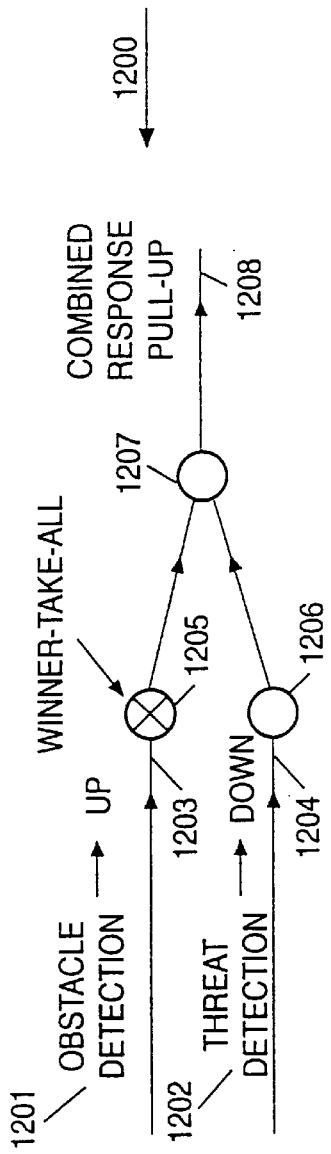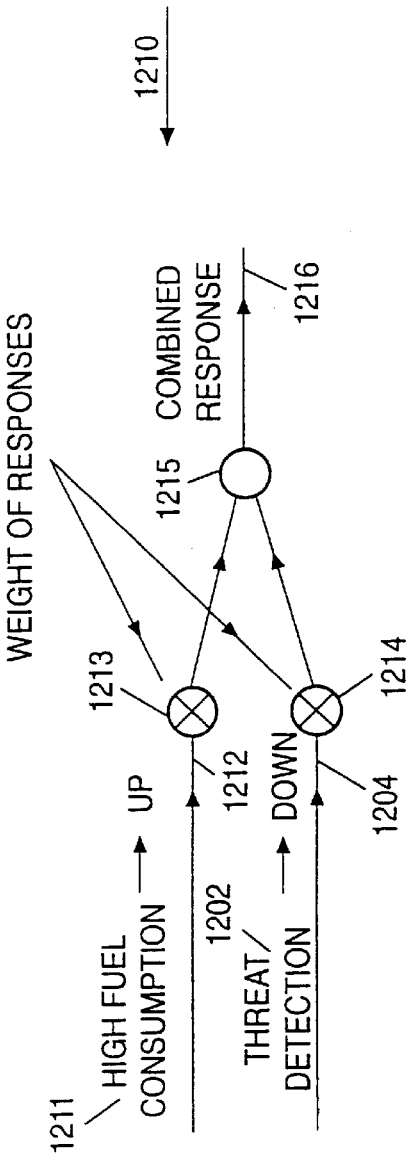
FIG. 12 (a)
FIG. 12 (b)

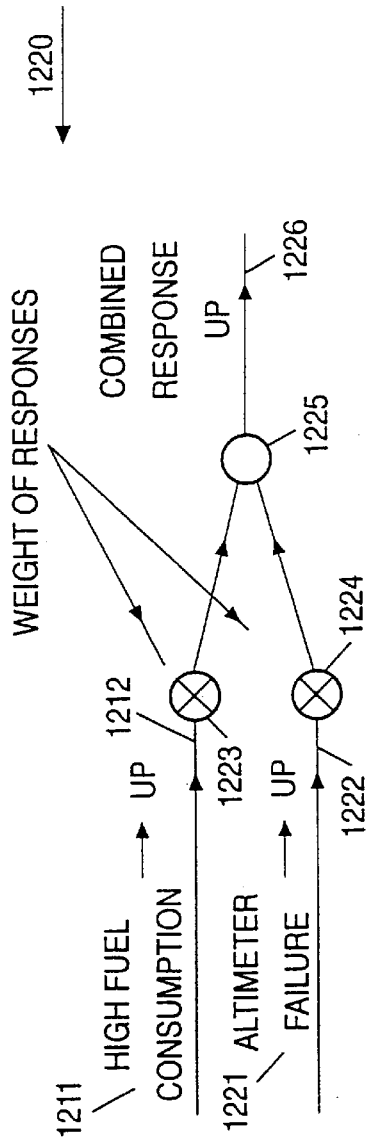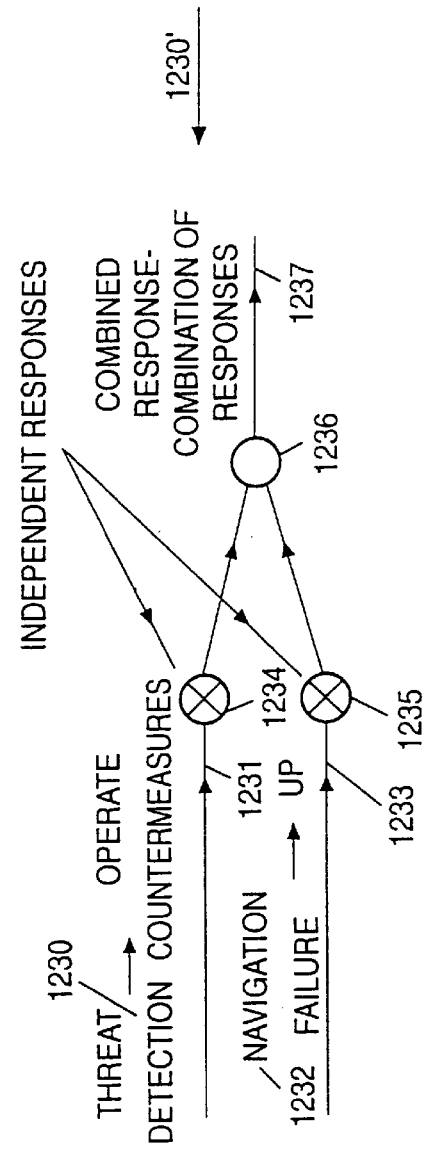

AUTONOMOUS COMMAND AND CONTROL UNIT FOR MOBILE PLATFORM

FIELD OF THE INVENTION

This invention is in the field of command and control of Unmanned Vehicles—(UV), in air, space, ground, underground, sea, and underwater applications.

BACKGROUND OF THE INVENTION

The rational for the ever increasing need for autonomous capability of UVs, stems from the need to provide efficient means to operate vehicles and to accomplish missions in remote locations, for long, or even very long duration, and very often, in areas without safe accessibility to a human operator. A human operator was found to be ineffective, and even unreliable or unresponsive in such missions. Furthermore, to operate a vehicle from a remote location, in a semi-autonomous man-in-the-loop mode, i.e. a mode of operation involving man intervention, a bi-directional data link between the remote, man controlled command and control center, and the on-site unmanned vehicle, must be established. Moreover, achieving high fidelity video transmission over the data link for long distance, where sometimes, the data link has to be a secure link, involves high cost and cumbersome logistic effort, which, in some cases, may render the use of such system commercially and/or operationally prohibitive.

High autonomy operation is also a key rational, when the mission has to be executed by a fleet of UVs, which are operating in coordination and cooperation. Manual command and control of a fleet of UVs by a human operator is extremely complex, if not impossible.

It is accordingly the object of the present invention to substantially reduce or overcome the drawbacks associated with hitherto known semi-autonomous systems.

More specifically the present invention seeks to enhance the autonomous capability of UV, by incorporating thereto an onboard programmable decision unit, operating in an essential autonomous fashion, thereby enabling the UV to achieve better performance in accomplishing its mission under dynamic, changing and unknown environment and at the same time increasing the likelihood of mission success, while simplifying the pertinent operational procedures. "Autonomous" in the context of the invention means execution of a mission under self control without any intervention of an external supervisor, operator or incooperative agent, while operating in a dynamic, unpredictable friendly, neutral or hostile environment. For further details refer to reference 12 below.

Insofar as military applications are concerned, it is another object of the invention to incorporate a decision unit, in the manner specified, thereby not only increasing the likelihood of mission success along with simplifying the pertinent operational procedures, but also reducing the required supporting logistic, whilst, at the same time, extending the range of operation parameters and operational envelope over enemy territory.

GLOSSARY OF TERMS

For a better understanding there follows a glossary of terms and definitions used herein (in alphabetical order), some being conventional and others having been coined.
ALP Auxiliary Logic Plan
AM Autonomous Missile
AMC Autonomous Mission Controller
AMO Air Mission Order
ASM Auxiliary Systems Manager
ATE Automatic Test Equipment
AV Autonomous Vehicle
BIT Build In Test
CISC Complete Instruction Set Computer
CLP Communication Logic Pin
CM Communication Manager
DCM Data Communication Module
DR Dead Reckoning
DSP Digital Signal Processing
DTU Data Transfer Unit
FLP Flight Logic Plan
FM Flight Manager
FPM Functional Processing Module
FPSM Functional Processing Sub-Module
GMDB Global Memory and Data Base
GN&C Guidance, Navigation, and Control
GPS Global Positioning System
Graph: denoting a general data structure consisting of nodes (states) and arcs interlinking them, as referred to for example in the book "Graph Algorithms", by S. Even. In the context of the invention, the graph is not limited to any particular architecture (e.g. binary tree) and accordingly this term encompass all known per se architectures, depending upon the particular application. Typical yet not exclusive examples of graph architectures are described in U.S. Pat. No. 5,340,056 Guelman et al.
IMU Inertial Measuring Unit
INS Inertial Navigation System
IR Infra Red
LOS Line Of Sight
Man-in-a-loop mode of operation—(referred to also as semi-autonomous mode of operation):
 a mode of operation in which management and control of a mission partially involves man intervention and is partly based on a programmable autonomous decision unit,
MM Mission Manager
MM-MP Mission Manager Mission Plan
MM-MS Mission Manager Mission State
MP Mission Plan
MPS Mission Planning System
NLP Navigation Logic Plan
NM Navigation Manager
OMEGA Radio Navigation System
PM Payload manager
RDT Response Decision Tree
RF Radio Frequency
RISC Reduced Instruction Set Computer
RPM Revolutions Per Minute
SLP Sensor Logic Plan
SM System Manager
SM-TS System Manager Task State
SNM Sensor Manager
SOP System Operation Plan
SYLP System Logic Plan
TP Trajectory Plan
TRN Terrain Reference Navigation
UAV Unmanned Air Vehicle
UGV Unmanned Ground Vehicle
UUV Unmanned Underwater Vehicle
UV Unmanned Vehicle
WP Way Point
WTA Weapon to Target Assignment

LIST OF REFERENCES

There follows a list of publications to which reference is made throughout the description.

1. Yavnai A., (1992). Context Recognition and Situation Assessment in Autonomous Mobile Robots, Proceedings SPIE Vol. 1831 Mobile Robots VII, Boston, November 1992, pp. 119–130.
2. Yavnai A., (1993). "Arbitration Network-A New Approach for Combining Reflexive Behaviors and Reasoning-Driven Behaviors in Intelligent Autonomous Systems., Ch. 43 in Proceedings of International Conference on Intelligent Autonomous Systems, IAS-3, Pittsburgh Feb. 15–18, 1993, pp. 428–438.
3. Yavnai A., (1993). "Context Recognition and Situation Assessment in Intelligent Autonomous Systems", in Proceedings of IEEE 1993 International Symposium on Intelligent Control, August 1993, Chicago, pp. 394–399.
4. Yavnai A., (1994). "Distributed Decentralized Architecture for Autonomous Cooperative Operation of Multiple Agent System", in Proceedings AUVS-94, 21st Annual Technical Symposium Association for Unmanned Vehicle Systems, May 23–25, 1994, Detroit, pp. 95–101.
5. Bertsekas D. P. (1987). "Dynamic Programming—Deterministic and Stochastic Models", Prentice-Hall, N.J., USA 1987.
6. Barr A., Feigenbaum E. A., (1981). "The Handbook of Artificial Intelligence", William Kaufmann Inc., USA, 1981.
7. Bellman R., (1961), "Adaptive Control Pressure—A Guided Tour", Princeton University Press, N.J. , USA, 1961.
8. Rabiner L. R., Gold B. (1975), "Theory and Application of Digital Signal Processing", Prentice-Hall, N.J. , USA, 1975.
9. Barkat M., (1991), "Signal Detection and Estimation", Artech House, MA, USA, 1991.
10. S. Even, "Graph Algorithms".
11. U.S. Pat. No. 5,340,056, Guelman et al., for "Active defence system against tactical ballistic missiles".
12. Yavnai A., (1989), "Criteria of System Autonomability", Proceedings International Conference on Intelligent Autonomous Systems 2, Amsterdam December 1989, pp. 448–458.

GENERAL DESCRIPTION OF THE INVENTION

It should be noted that, for convenience of explanations, the following description is primarily focused on military applications. Nevertheless, any military connotation is by way of example only.

In accordance with the present invention, there is provided a decision unit, for autonomous, real time, onboard, management and control of vehicles and their associated sub-systems. The decision unit can be applied to variety of unmanned vehicles, for air, space, sea, underwater, ground, or underground applications. "Management and control", in this connection, should be construed in a broad sense as encompassing also commanding, decision making, information processing scheduling and others, all as required and appropriate, depending upon the particular application. Vehicle, in the context of the present invention encompass any mobile platform including, for example, a missile.

The decision unit, hereinafter referred to, occasionally, as Autonomous Mission Controller—AMC, provides the unmanned vehicle, and its sub-systems, with management and control functions which are needed in order to accomplish the assigned mission goals, essentially, without intervention of a human operator, or any other external element throughout the entire mission sequence. If desired, an external element can be engaged, in a supervisory role, or in very specific, time limited situation.

The AMC of the invention provides the unmanned vehicle with extended capability to operate autonomously, whereby the vehicle becomes autonomous vehicle (AV). The decision unit of the invention further provides for the following onboard, real time, self-contained capabilities of the AMC, taken alone or in combination:

Capability for replanning, adjusting, or updating the Mission Plan (MP), or the System Operation Plan (SOP) (for explaining the function and operation of the SOP—see below) of the vehicle subsystems in any time, throughout the execution of the mission.

Capability for in-flight (after launch or take-off) or, on-the-move, complete planning of MP and/or SOP.

Extended capability for event-driven decision, on the response to exceptional and unanticipated events, including handling the situation of multiple simultaneous unanticipated events, where a decision on the combined response must be taken.

Extended capability for fault management, error recovery, and reconfiguration of vehicle functions or systems.

Still further, the AMC of the invention provides for:

Capability for coordination the operation of the UV, with other UV's, when operate in cooperative operation mode, as a member of a UV's fleet, or a mixed fleet of UVs and manned vehicles.

Extended capability for optimal resource management.

The above-mentioned capabilities, distinguish the system of the present invention, from any other regular hitherto known mission computers, mission controllers, or any other means, which has been used for management, command and control of UVs, and which inherently lack the capability of fully autonomous operation in dynamic, changing, and unpredictable environment.

There is thus provided in accordance with the invention, in a vehicle designed for the execution of a mission, a programmable decision unit capable of managing and controlling the execution of the mission by utilizing a plurality of subsystems and database means capable of holding and managing data including pre-stored data and data acquired by and received from said plurality of subsystems, which programmable decision unit comprises a mission plan (MP), for accomplishing the execution of said mission, associated to said database; said MP comprising:

(a) a plurality of phases each being a mission phase representing a mission segment to be executed by at least one of the subsystems and including mission phases that are defined as "initial phase", "terminal phase", and (b) a plurality of transition conditions for transiting between said mission phases;

the operation of managing and controlling the execution of the mission includes a succession of iterations that include each:

(i) assignment of a mission segment associated with a current mission phases to at least some of said subsystems;

(ii) receipt from the subsystems of report data which include data indicative of the execution status of said mission segment by said at least one subsystem;

(iii) evaluation of said report data for determining either of normal behavior and exceptional event; and (iii.1) in response to normal behavior, either staying in current mission phases of the MP or transiting from the current mission phase of the MP to another in the case that said report data, or portion thereof, satisfy said transition conditions; or (iii.2) in response to exceptional event eliciting a responsive action in order to accomplish the execution of said mission;

said programmable decision unit is capable of managing and controlling the execution of said mission in essentially autonomous fashion whereby said vehicle becomes an autonomous vehicle (AV).

The invention further provides in a vehicle designed for the execution of a mission, a programmable decision unit capable of managing and controlling the execution of the mission by utilizing a plurality of subsystems and database means capable of holding and managing data including pre-stored data and data acquired by and received from said plurality of subsystems, which programmable decision unit comprises a mission plan (MP) for accomplishing the execution of said mission which MP may be described as a graph that utilizes said database; said graph comprising:

(a) a plurality of states each being a mission state representing a mission segment to be executed by at least one of the subsystems and including mission state that are defined as "mission start", "mission complete" and "mission failed"; and (b) a plurality of arcs linking said state and each signifying transition conditions between two mission states which it links;

the operation of managing and controlling the execution of the mission includes a succession of iterations that include each:

(i) assignment of a mission segment associated with a current mission state to at least one of said subsystems;

(ii) receipt from the subsystems of report data which include data indicative of the execution status of said mission segment by said at least one subsystem;

(iii) evaluation of said report data for determining either of normal behavior and exceptional event; and (iii.1) in response to normal behavior, either staying in current mission state of the MP or transiting from the current mission state of the MP to anther in the case that said report data, or portion thereof, satisfy said transition conditions; or (iii.2) in response to exceptional event eliciting a responsive action in order to accomplish the execution of said mission;

said programmable decision unit is capable of managing and controlling the execution of said mission in essentially autonomous fashion whereby said vehicle becomes an autonomous vehicle (AV).

The term "essentially autonomous" signifies a mode of operation in which management and control of a mission is predominantly based on a programmable autonomous decision unit, with only little or no intervention of man, external computing or any other external means.

It should be further noted that in the context of the invention, Vehicle/Air Vehicle are, as a rule, unmanned, and accordingly the terms Unmanned Vehicle and Vehicle are, essentially interchangeable and the same applied to the terms "Autonomous Vehicle" (AV) and "Unmanned Autonomous Vehicle".

The mission segment that is assigned to said at least one subsystems is, as a rule, divided to at least one task assigned, respectively, to a like number of said at least one subsystems. Whenever necessary, there may be two or more "mission complete and/or mission fail states in said graph arrangement.

The management and control include, as a rule, in addition to said MP, other procedures which may or may not be describes as a graph and which will be discussed in greater detail below, e.g. decison unit and subsystems initialization and BIT procedures, as well as auxiliary procedures affording to follow the mission plan, such as various information processing procedures and monitoring events procedures.

It should be noted that whilst there may be more than one pre-stored available MP, only one of them is active at any given time. It should be also noted that whilst, normally, a given mission is assigned to a UAV, the mission or portion thereof may be dynamically altered during the operation of the AV, all as required and appropriate depending upon the particular application. Nevertheless, only one mission is active at any given time. When stating that the decision unit utilizes a plurality of sub system, it should be interpreted as encompassing also as utilizing different subsystem(s) at given stages of the unit's operation.

Preferably, said decision unit is capable of classifying said exceptional event as belonging to a first group, constituting a replanning group, or a second group, constituting non-replanning group, and in response to a first group classification, said decision unit is capable of activating an associated planner module, for short time, while-on mission, modifications of said mission plan either partially or in its entirety.

Normally, said report data may further include operational status (or health data) that is received, on regular basis, from the various subsystems (being typically those assigned to execute the mission segment in (i) above, but possibly also from the other subsystems not participating in the execution of the current mission segment). Other report data may be added as required and appropriate.

The report data is received from the subsystems by employing either or both of known per se interrupt driven and/or polling techniques. Generally speaking, interrupt driven technique, necessary entails that the acquisition of the event by a given subsystem is immediately "reported" (unless intentionally masked), whereas polling technique necessarily entailed that upon acquisition of an event by a given subsystem the necessary pertinent data are temporarily stored in a buffer, until the latter is polled by the decision unit at predetermined time intervals.

As specified, the report data may include data being indicative of exceptional events that were acquired by some or all of the subsystems, for generating an appropriate responsive action. "Acquired", in this connection, encompass also detection recognition and other forms of acquisition. Preferably, the responsive action results, eventually, in one of the following actions:

a) no change at all, keep executing said MP, no change of mission state;

b) make a minor modification in the MP, or a parameter thereof with no change of mission state, then update the database and execute the modified MP;

c) transit the mission state to a new mission state of the MP, not according to a regular transition sequence; then execute the MP, while being at the new mission state;

d) select a new MP out of a bank of pre-stored MP according to a selection criteria; then update the database, and execute the new selected MP;

e) select and combine pre-stored MPs, or pre-stored MP segments thereof, into a new combined MP; then, update the database and execute the combined MP;

f) re-plan an alternative MP or segments thereof by utilizing said planner module; then update the database and execute the replanned MP;

g) reconfigure the AV either by replacing an inoperative device or module in a subsystem, by an identical backup device, or activate other modules in the subsystem; then continue according to the MP; and h) select a crisis recovery MP, out of a bank of pre-stored crisis recovery MPs according to selection criteria; then update the database and execute the selected crisis recovery MP.

The latter range of possible responsive actions may vary depending upon the particular application; and if desired other responsive action may be added as required and appropriate.

If desired, said MP may be downloaded, in its entirety, to said database prior to departure to said mission, or alternatively portion of said MP can be downloaded prior to departure to the mission whereas the remaining portion thereof is planned by said planner module while-on-mission.

Optionally, said decision unit is responsive to, essentially simultaneous at least two of said events, for generating a combined response. Said combined response is dependent upon at least one of the following factors: the degree of the abnormal event, the system state, the mission context, the sub-systems status, risk to mission accomplishment and the priority of responses, which is decided upon, according to the possible effect of the event on the operation of the decision.

If desired, the management and control functions of the AV, and the AMC of the kind specified, are functionally organized, in a multi-level hierarchy, and preferably, in a three-level hierarchical architecture, in which:

a) Level 1 (top or root) is a global organization and management level;

b) Level 2 (intermediate) is the supervision and coordination level functionally broken down by subsystems; and c) Level 3 (bottom or leaf) is the execution and control level for each particular subsystem.

The responsibility of Level 1 is mainly on the mission level, and on the AV system level issues. Level 1 determines the tasks to be performed by the AV and its sub-systems. It provides the answer to the question "What tasks should be done in order to meet the mission objectives?". Specifically, it determines the tasks to be executed by selected subsystems and provides, generally, the associated parameters and constrains, which, as will be explained below, are processed into detailed design by the system managers (SM) of level 2. The latter are responsible, each, to a given subordinated subsystem and will assign the detailed task thereto.

Accordingly, the responsibility of level 2 is mainly on the AV subsystems operation and performance issues. Level 2 processes the tasks to be performed, into detailed operation plans, for the respective subsystems and provides for each one of them an answer to the question "How the tasks should be achieved?" It should be noted that "processing" may require, at times, actual detailed planning of the task, or a portion thereof, utilizing to this end an internal "planner" module (whose particulars will be explained in greater detail below), or, alternatively retrieving a "pre-stored" nominal detailed plan which has been downloaded to the database associated with level 2, prior to departure to the mission or while-on-mission. Regardless of the processing mode of level 2, it has to coordinate and schedule the operation of the subsystem subordinated thereto.

If desired, the detailed planning aspects associated with level 2, may be shifted to level 1, in which case the detailed design is transmitted from level 1 to level 2. The latter still has to coordinate and schedule the execution of the task by its subordinate subsystem.

The responsibility of level 3 is mainly on the execution, the control and the data processing functions which are related to the operation of the respective subsystems. Subsystems hardware forms part of level 3.

Each level of the AMC hierarchy is composed of Functional Processing Modules—FPM, which perform the logical and the computational functions, by using computer means. Level 1, the top level of the AMC, include, preferably, one FPM only, the Mission Manager (MM) FPM (in short MM). FPMs in level 1 and level 2 (i.e., System Manager (SM) FPM or SM in short), perform, mainly, the managing, planning, monitoring, coordination, and the supervising logical and computational functions for the respective subordinated subsystem.

FPMs in level 3, performs, mainly, information processing, GN&C functions, as well as, hardware operation, monitoring control functions, again for the respective subsystems. FPMs in level 3 are directly linked to the hardware subsystems. Hardware subsystems, e.g., mobility subsystems, navigation sub-system, sensor, engine, actuators, payload, are part of level 3 of the functional hierarchy. Allocation of computational functions between levels 2 and 3, may depend on the self-contained processing capability of the respective subsystems, e.g., the navigation system may have self-contained processing capability, to perform all the required navigation computations independently, i.e. it inherently encompasses level 2 and level 3. It should be noted, that given subsystem may include more than one assembly, thus, for example, a flight subsystem may include, inter alia, fins, engine and rudder assemblies.

It should be further noted that the hierarchy of levels 1, 2 and 3 described in the foregoing is confined merely to functional definition and it does not necessarily dictate the manner in which the pertinent hardware and processors will be physically realized. Thus, for example, the MM of level 1, albeit being globally responsible for level 1 missions may, under certain circumstances, utilize a network of interlinked distributed processors.

Accordingly, there is further provided in accordance with the invention, an autonomous vehicle designated for the execution of a mission and having an autonomous programmable decision unit capable of managing and controlling the execution of the mission by utilizing a plurality of subsystems and database means capable of holding and managing data including pre-stored data and data acquired by and received from said plurality of subsystems, said autonomous programmable decision unit being functionally organized in a three-level hierarchy architecture of a top level, an intermediate level and a leaf level;

said top level having a mission manager (MM) comprising a mission manager mission plan (MM MP) for accomplishing the execution of said mission which mission plan may be described as a mission plan (MP) graph that utilizes said database; said MP graph consisting of a plurality of states each being a mission manager's mission state (MM MS) and including MM MS that are defines as "mission start", "mission complete" and "mission failed"; and a plurality of arcs linking said states each signifying transition conditions between two MM MSs which it links;

said intermediate level comprising a plurality of system managers (SM) subordinated to said MM, and comprising each a system manager's operational plan (SOP) which may be described as an SOP graph that utilizes said database;

said leaf level comprising a plurality of subsystems each subordinated to one only of said SM's;

each MM MS representing a MM mission segment, to be assigned to at least one of the SMs, in terms of at least one essentially functionally defined task and its associated constraints and parameters; the SOP of each SM determining an SOP mission segment for assignment to and execution by the subsystem subordinated thereto in terms of detailed design of said essentially functionally defined task;

the operation of managing and controlling the execution of the mission including a succession of iterations that include each:

(i) assignment of an MM mission segment associated with a current MM MS via said at least one SM to said at least one subsystem;

(ii) receipt by each one of said at least one SM from its subordinated subsystem intermediate level report data which include data indicative of the execution status of said SOP mission segment by said subsystem;

(iii) receipt by said MM from the SMs top level report data which include data indicative of the execution status of said MM mission segment by said at least one sub system;

(iv) evaluation of said top level report data for determining either of normal behavior and an exceptional event; and (iv.1) in response to normal behavior either staying in current MM MS or transiting from the current MM MS to another in the case that said top level report data, or portion thereof, satisfy said transition conditions; or (iv.2) in response to an exceptional event eliciting a responsive action from the MM in order to accomplish the execution of said mission.

If desired, step (iv) above may applied, mutatis mutandis, also to each SOP, and accordingly by one embodiment there is provided a decision unit of the kind specified, wherein at least one of said SOP graphs consisting of a plurality of states each being an SM task state (SM TS) and including SM TS that are defined as "task start", "task complete" and "task failed"; and a plurality of arcs linking said states and each signifying transition conditions between two SM TS which it links, and wherein said SM is further capable of:

(ii.1) evaluation of said intermediate level report data for determining either of normal behavior and an exceptional event; and (ii.11) in response to normal behavior either staying in current SM TS or transiting from the current SM TS to a next one in the case that said intermediate level report data, or portion thereof, satisfy said transition conditions; or (ii.12) in response to an exceptional event eliciting a responsive action from the SM.

The management and control include, as a rule, in addition to said MM MP and SOPs, actions which may or may not be describes as a graph and which will be described in greater detail below, e.g. decision unit and subsystems initialization and BIT procedures, as well as auxiliary procedures affording to follow the mission plan such as various information processing procedures and monitoring events procedures.

It should be noted that whilst there may be more than one available MM MP and more than one available SOP for each SM, only one MM MP and one SOP for each SM are active at any given time. Put differently, the management and control functions are governed by only one active MM MP (for the MM) and one SOP (for each operating SM), at any given moment. Whenever necessary, there may be two or more "mission complete and/or mission fail states in either or both of said MP and SOP graph arrangements.

As a rule, the communication between the top, intermediate and leaf levels (and vice versa), exploits known per se data link, and by the intermediary of said database means.

Typically, prior to mission execution, the MM FPM in level 1, reads the AV Mission Plan—MP, and the associated Data Base—DB, which was prepared in the MPS, and thereafter downloaded to the AV computer memory, via DTU. If desired the AV may be sent to accomplish a mission on the basis of only coarse guidelines, whereas the remaining portion of the planning process, typically the major portion thereof, is completed on-board, as the AV advances towards the mission site, by the AMC of the pertinent AV itself utilizing, to this end, internal Planning Functional Processing Sub-Modules (FPSM) referred to also as "planner module") and data from the DB. Shifting the Planning Process, partially or entirely to the AV in the manner specified can shorten, significantly, the elapsed time from mission alert, to the arrival of the AV, at the geographical mission site, constituting thus a significant advantage when short time response is required.

Normally, after the MP and DB are downloaded, to the AMC computer memory, a BIT procedure is initiated and run, to check the status of the AMC, to check DB correctness, and to check the status of the AV sub-systems. If the BIT has succeed, the AMC initiate the operation of the AV and its subsystems.

While in-mission, the MM gets reports on AV mission execution status, and on subsequent status, as well as reports on events, regular and exceptional, from SM FPMs in the intermediate level that is subordinated to the MM FPM. The MM FPM monitors the mission execution status, and switches to another mission phase/state of the Mission Plan upon meeting the pertinent transition conditions.

Based on the current state of the Mission Plan, the received reports and particularly upon encountering exceptional events, the MM modifies the MP partially or entirely and as result also of the pertinent SOP. The updated plans, (defined in a functional manner), along with indication of the current mission phase/state and other data, are then transmitted from the MM FPM, to the subordinated SMs, in level 2.

Each SM in level 2, is associated with, and in charge of, an execution subsystem in level 3. SMs in level 2 are fed with operation plan, operation data, and mission/phase indication from MM FPM in level 1. If desired, additional information is sent.

Then, each SM FPM in level 2, generates and sends commands, operation data and operation mode instructions, to its associated subordinate subsystem in lower level 3. SM FPMs in level 2, gets processed data, execution status report, and health status reports (referred to, collectively, as intermediate level report data) from their subordinate subsystems in level 3.

Following the instructions and the commands from level 2 SMs, level 3 subsystem perform their tasks, under local control. If desired, data processing tasks may be performed by embedded processors in level 3 subsystems, e.g., embedded processors in the navigation subsystem, or, in the sensor subsystem. Level 3 subsystems transmit processed data, task status report, and health reports, to their associated FPMs in level 2.

Unless an exceptional event occurred and detected, the MM, and the SM FPMs manage and control the AV and its subsystems, following the MM Mission Plan, and the SOPs.

If an exception event, such as abnormal AV operation, unexpected mission situation or, AV subsystem malfunction, occurred and detected, the relevant FPM decides on a responsive action, and activates the associated procedures in order to cope with the new situation, and to minimize the effect that may be caused as a result of the exceptional event.

In certain cases exceptional or abnormal events may lead to change in part or all of the Mission Plan. A repertoire of possible responsive actions for abnormal events has been described in the foregoing.

Accordingly by a preferred embodiment of the invention there is provided an MM of the kind specified being capable of classifying said exceptional event as belonging to a first group, constituting a replanning group, or a second group, constituting non-replanning group, and in response to a first group classification, said MM is capable of activating an associated planner module, for short time, while-on-mission, modifications of said MM MP either partially or in its entirety. The same applies to a planner module associated to said SMs adapted for local planning of the corresponding SOP or portions thereof.

Thus, by one embodiment there is provided a decision unit of the kind specified wherein said responsive action of said MM being one of the following a to h options:

a) no change at all, keep executing said MM MP, no change of MM mission state;

b) make a minor modification in the MM MP, or a parameter thereof with no change of MM mission state, then update the database and execute the modified MM MP;

c) transit the mission state to a new mission state of the MM MP, not according to a regular transition sequence; then execute the MM MP, while being at the new mission state;

d) select a new MM MP out of a bank of pre-stored MM MPs according to a selection criteria; then update the database, and execute the new selected MM MP;

e) select and combine pre-stored MM MPs, or pre-stored MM MP segments thereof, into a new combined MM MP; then, update the database and execute the combined MM MP;

f) re-plan an alternative MM MP or segments thereof by utilizing said planner module; then update the database and execute the replanned MM MP;

g) reconfigure the AV either by replacing an inoperative device or module in a subsystem, by an identical backup device, or activate other modules in the subsystem; then continue according to the MM MP; and h) select a crisis recovery MM MP, out of a bank of pre-stored crisis recovery MM MPs according to selection criteria; then update the database and execute the selected crisis recovery MM MP.

Likewise, said responsive action of said SM being one of the following a to h options:

a) no change at all, keep executing said SOP, no change of SM TS;

b) make a minor modification in the SOP, or a parameter thereof with no change of SM TS, then update the database and execute the modified SOP;

c) transit the task state to a new task state of the SOP, not according to a regular transition sequence; then execute the SOP, while being at the new task state;

d) select a new SOP out of a bank of pre-stored SOPs according to a selection criteria; then update the database, and execute the new selected SOP;

e) select and combine pre-stored SOPs, or pre-stored SOPs segments thereof, into a new combined SOP; then, update the database and execute the combined SOP;

f) re-plan an alternative SM SOP or segments thereof by utilizing said planner module; then update the database and execute the replanned SOP;

g) reconfigure the AV either by replacing an inoperative device or module in a subsystem, by an identical backup device, or activate other modules in the subsystem; then continue according to the SOP; and h) select a crisis recovery SOP, out of a bank of pre-stored crisis recovery SOPs according to selection criteria; then update the database and execute the selected crisis recovery SOP.

Obviously, one or more of said SMs may be adapted to operate in accordance with the responsive actions a)–h), stipulated in the foregoing. Other responsive actions may be added or deleted, all as required and appropriate depending upon the particular application.

Typically, the intermediate level report data is of local and detailed nature, e.g. detailed report from the subordinated subsystem and may also include quantitative data, e.g. navigation error in meters. As opposed thereto, the top level report data is more generic nature e.g. mission execution status—complete, fail or ongoing, thereby providing the MM with "global picture" of the mission execution enabling it to duly coordinate the various SMs for the next mission segment or for generating the necessary responsive action. This, however, is not imperative and under certain circumstances detailed report data may be supplied to the MM and by the same token, generic report data may be evaluated, under certain circumstances by one more of said SMs.

As had already been specified in the foregoing, the report data is received from the subsystems and/or the SMs by employing either or both of known per se interrupt driven and/or polling techniques. Likewise, the report data is not necessarily bound to those SMs and subsystem assigned to execute the current mission segment.

By one embodiment, said MM MP is downloaded, in its entirety, to said database prior to departure to said mission. Alternatively, a portion of said MP is downloaded prior to departure to the mission, whereas the remaining portion thereof is planned by said MM planner module while-on-mission.

In a similar manner, said plurality of SOP are downloaded, in their entirety, to said database prior to departure to said mission, or alternatively at least one of said plurality of SOP is only partially down-loaded prior to departure to mission whereas the remaining portion thereof is planned by the respective SM planner module while-on-mission.

In a situation of multiple simultaneous events, a response combination FPSM is applied, to generate a combined response. The combined response is, as a rule, a function of the exception events, the system state, the mission context, the sub-systems status, and the priority of responses, which is decided upon, according to the possible effect of the event.

Accordingly, by this particular embodiment there is provided an AV of the kind specified, wherein said MM and/or at least one of said SMs is responsive to essentially simultaneous at least two of said events, for generating a combined response. Generally speaking, the higher the possible risk of the event, e.g. flying in low altitude which jeopardize fight safety, the higher is the response priority that is assigned to that event.

As had already been specified in the foregoing, the major planning aspects of level 2 may be shifted to level 1, leaving thus essentially scheduling and coordination responsibilities to level 2.

If desired the various modification that were described with respect to the previous three-level hierarchy embodiment, apply *mutatis mutandis,* also to the latter three level hierarchy embodiment.

The operation of the decision unit as well as the MM and SMs apply, *mutatis mutandis,* to civilian applications such as, for example, cleaning ocean atomization, combatting locus or clearing maritime field mines and environmental monitoring. The MM mission plan, the SOP, the subsystems and the stored data are all, of course, designed in accordance with the particular application under consideration.

Still further the invention provides a system comprising a fleet of AV's, of the kind specified, arranged in a given fleet architecture, for accomplishing a common mission. As will be explained in greater detail below the AVs in the fleet may employ a cooperative mode of operation for enhancing the likelihood of accomplishing the common mission.

DESCRIPTION OF THE DRAWINGS

For better understanding, the invention will now be described, by way of example only, with reference to the accompanying drawings in which:

FIGS. 12a–12d are a schematic illustration of, respectively, four response combination modes;

DETAILED DESCRIPTION OF THE INVENTION

The detailed description, whilst focusing primarily in the tree-level hierarchy architecture of the invention applies, *mutatis mutandis* to different arrangements including multi-level hierarchy.

Figure 1:
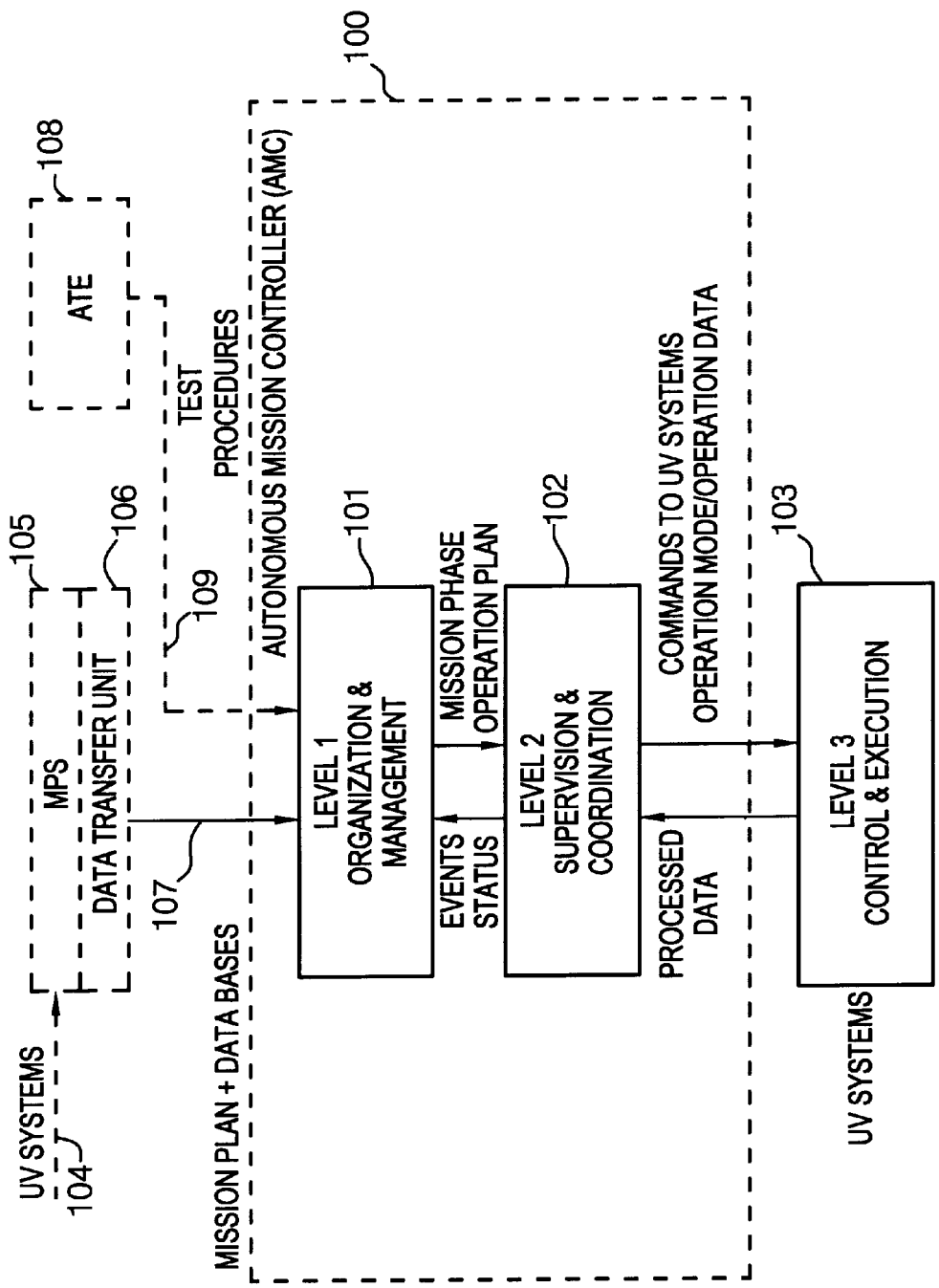
FIG. 1 is a block diagram which illustrates a general view of an Autonomous Mission Controller—AMC; according to one embodiment of the invention.

Attention is first directed to FIG. 1, which illustrates, in a diagrammatic way, the general view of the three-level functional organization of the Autonomous Mission Controller—AMC 100, and its relation to the Mission Planning System—MPS 105. The AMC 100 is the core element of the autonomous UAV (referred to hereinbelow as AV) avionics. It is an onboard embedded computer, which manage, supervise, command and control the AV and its sub-systems, throughout the entire mission sequence, in order to meet the assigned mission goals. In a fully autonomous mode of operation, the AMC 100 shall command and control the AV, without any human intervention, from launch, or take-off, until the mission is completed. Typically, the AMC 100 is installed in the avionics/electronics section. If desired, it may be installed in another section. The AMC three-level functional hierarchy is organized as follows: Level 1 101, the top level, is the organization and management level. Level 2 102, the intermediate level is the supervision and coordination level. Level 3 103, the bottom level, is the execution and control level.

The upper two levels, namely, level 1 101, and level 2 102, constitute the core of the AMC 100, while level 3 103 comprise of the AV subsystems, which in many cases, already exist, e.g., navigation subsystem, propulsion subsystem, sensor subsystem. Therefore, level 3 103 is not considered as an integral part of the AMC 100 although it is a part of a three-level hierarchy of the management, command, and control of the AV and its subsystems. As had already been specified in the foregoing, by an alternative embodiment level 1 and 2 may be joined together to constitute a decision unit employing a generic mission plan for managing and controlling the subsystems.

Reverting now to the three-level hierarchy, illustrated in FIG. 1, upon receiving a mission order 104, from the relevant authority, a mission planning process is conducted by the Mission Planning System—MPS 105. The MPS 105 may be either a ground based system, or installed on a platform, such as an aircraft, a ship, or any other platform. The planning process in the MPS 105 is preferably automatic. However, this planning process is supervised and guided, checked and approved, by a human operator. Upon completion the planning process, the plan is checked for correctness and validity.

If validated, the Mission Plan—MP, which includes, as an internal plans the mission manager mission plan (MM MP), the Systems Operation Plans—SOP, and the associated Data Bases—DB, are stored in the MPS 105, memory, or in the Data Transfer Unit—DTU 106 ready to be downloaded to the AV. When the AV is tested and approved for a mission, and the AMC 100 is ready to receive data, the MP (including MM MP and SOP) and the associated DB are downloaded from the DTU 106 via a data transmission link 107 which may be a serial link, e.g., a standard RS-422 data link, to the AMC 100 memory.

As will be explained in greater detail below, if the time allowed from receiving the mission command, to AV take-off, or launch, is too short, or, in case that the MPS 105 is failed, or no MPS operator is available to operate the MPS 105 and to conduct the mission planning process, the entire mission planning process may be performed by the AMC 100, after AV take-off, or launch.

The Automatic Test Equipment—ATE 108, performs automatic test and diagnostic procedures 109 in order to verify the status of the AV, the status of AV sub-systems, and the status of the AV AMC 100.

Level 1 101 performs, mainly, managing and controlling functions which include supervision and sequencing, mission planning/replanning, global route/trajectory planning, mission monitoring, plan evaluation and simulation, decision on responsive action to exceptional events, assignment of tasks and their associated parameters and constraints, which are processed to bring about SOPs, i.e. detailed design of the task for execution by the AV subsystems. If desired, additional functions may be added or deleted to Level 1 101 all as required and appropriate. Level 1 101 transmit the tasks (defined in a functional manner) to be executed by the AV subsystems, and the associated SOPs, to the System Manager FPMs in Level 2 102. Indication of mission phase/state of the MM MP of level 1 is also transmitted. If desired, additional information may be also send. Level 2 102, which comprise, mainly, System Manager—SM FPMs, send to Level 1 101 information about event, regular and exceptional, that has been detected, or recognized at that level, or by elements in Level 3 103 subsystems. Level 3 102 also send to Level 1 101 information regards the tasks execution status, sub-systems health status, and data as requested, e.g., navigation information. Additional data may be transmitted, from Level 2 102 to Level 1 101, if desired. Based on the instructions and on the data received from Level 1 101, and on the data which is received from the execution subsystems in Level 3 103, each SM FPM in Level 2 102 processes the data, determines the mode of operation of its subordinate subsystem, and generates commands, set points, operational data to its subordinate subsystem. This information is send, routinely, from Level 3 102 SM FPMs to the subsystems in Level 3 103.

Each subsystem in Level 3 103, i.e., Flight & Guidance subsystem, Navigation subsystem, Sensor subsystem, Payload subsystem, Communication Subsystem, and if desired, any other subsystem, receive the commands and the operational data from their supervising SM FPM in Level 2, 102, and perform the commanded task. To accomplish their tasks, the subsystems use local and self-contained control and data processing, computing means. Data regarding operational status, health status, as well as processed data, is send from the subsystems in Level 3 103 to their associated superiors in Level 2 102.

Each FPM has a command and management authority for the area under its responsibility, and for its subordinates, e.g., level 1 has full authority for level 1, level 2, and level 3. A FPM in level 2, has full authority for itself, and for its associated subordinate sub-system in level 3.

On the basis of the report data received from the various SMs the MM MP and other factors, the MM in level 1 is capable of coordinating the operation of the SMs by issuing synchronization signals and by associating and adjusting operating data.

Although untypical, level 1 may, under certain circumstances, execute some of the procedures which are normally assigned to one or more of the SMs of level 2.

Figure 2:
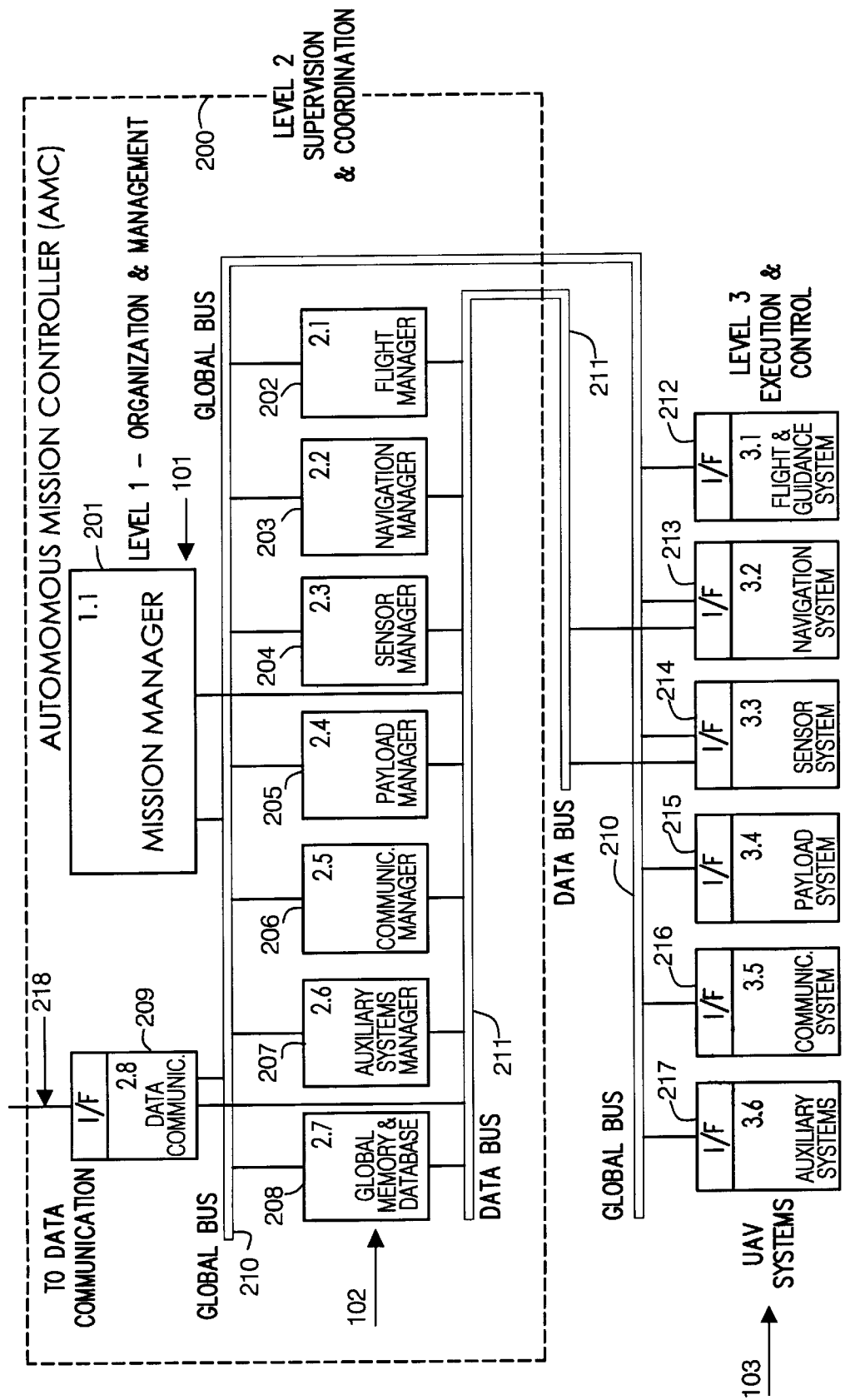
FIG. 2 is a block diagram of the functional architecture of the AMC of FIG. 1 fitted in an AV.

FIG. 2 describes the functional architecture of AMC 200 (100 of FIG. 1) for AV. In this embodiment, Level 1 101, the organization and management level, which is the top level of the hierarchy, is composed of one FPM, the Mission Manager (MM) FPM 201.

Level 2 102, the supervision and coordination level, consists, by this embodiment, of six (6) SM FPMs, which are in charge of their subordinate subsystems. Two other FPMs, which do not form part of Level 2, are the Global Memory and Data Base (GMDB) 208, and Data Communication Module (DCM) 209. The SM FPMs, in this level, are: a) Flight Manager (FM) 202, b) Navigation Manager (NM 203, c) Sensor Manager (SNM) 204, d) Payload Manager (PM) 205, e) Communication Manager (CM) 206, and, f) Auxiliary Systems Manager, (ASM) 207. Each of these six SM FPMs has associated subordinate subsystem in Level 3 103. If desirable, other FPMs may be added to Level 2 or, deleted from that level.

Level 3 103 consists of six (6) sub-systems of the AV: a) Flight and Guidance Systems 212, b) Navigation System 213, c) Sensor System 214, d) Payload System 215, e) Communication System 216, and, f) Auxiliary Systems 217. If desired, other subsystems may be added or, deleted, all as required and appropriate. The subsystems in Level 3 103, may optionally have their own local processing means, including local memory unit, local bus, and other data processing and data handling and transmission means, as desired. As shown, the Flight and Guidance System 212 is subordinate of the Flight Manager 202. The Navigation System 213 is subordinate of the Navigation Manager 203. The Sensor System 214 is subordinate of the Sensor Manager 204. The Payload System 215 is subordinate of the Payload Manager 205. The Communication System 216 is subordinate of the Communication Manager 206. The Auxiliary Systems 217 are subordinate of the Auxiliary Systems Manager 207.

The FPMs and the AV subsystems are interlinked by two buses. A Global Bus 210 which may be a standard serial bus, e.g. a MIL-STD. 1553B bus, for control and low volume data transfer between all elements, and, a Data Bus 211, which is a standard fast parallel bus, e.g. a VME bus, for high data rate, which interconnects only selected elements. If desired, additional FPMs or subsystems may be connected or, disconnected to and from the buses, respectively. The subsystems in level 3 are linked to the buses 210 and 211, via a known per se interface. If desirable, only one bus may be used for the functions of the global bus, or, more than two buses may be used. Also, if desirable, other types of buses, or bus standards may be used. A Data Link 218, preferably a bi-directional serial link, is used for data transfer between the AMC 100 and supporting equipment, such as the MPS 105 and between the AMC and the external Automatic Test Equipment (ATE), which checks the AMC and the AV subsystems prior to launch, or take-off. If desirable, other types of data link may be used.

The allocation of FPMs and AV subsystems to the architecture levels is:

| Level | FPM/SUB/SYSTEM |
|---|---|
| 1 | Mission Manager 201 |
| 2 | Flight Manager 202 |
|   | Navigation Manager 203 |
|   | Sensor Manager 204 |
|   | Payload Manager 205 |
|   | Communication Manager 206 |
|   | Auxiliary Systems Manager 207 |
| 3 | Flight and Guidance System 212 |
|   | Navigation System 213 |
|   | Sensor System 214 |
|   | Payload System 215 |
|   | Communication System 216 |
|   | Auxiliary Systems 217 |
| Others (i.e. not belonging to levels 1, 2 and 3 above) | Global Memory and Data Base 208 |
|   | Data Communication Module 209 |

If desired, the allocation of FPMs into hierarchy levels may be changed.

The main functions which are performed by the MM 201, are: a) initialization of AV operation, b) AV mission management and sequencing, according to Mission Manager Mission Plan—MM MP, (referred to also, occasionally, in short as MP), c) monitoring the mission execution status, and the subsystems health, d) reasoning about the mission context and situation, e) global MP planning, plan adjustment, and replanning, f) generate and assign tasks for assignment to the SMs, wherein the tasks are defined in functional manner and are associated with task parameters and constraints, g) plan evaluation and simulation, h) decision making on responsive action in case of exceptional event or failure, i) response combination if multiple exceptional events occur simultaneously, and j) coordination the AV operation in cooperative operation mode. Where desired, further functions may be performed by the MM 201. More detailed description of the MM, will be given below.

The main functions which are performed by the Flight Manager FM 202, are: a) initializing the operation of the Flight and Guidance System 212, including the propulsion subsystems, b) Flight and Guidance System 212 management and sequencing, following the mission and flight plan, i.e. the SOP of the flight manager, c) planning and generation of detailed local Trajectory Plan—TP, according to the mission plan, where the TP has to be executed by the guidance and flight control subsystems, d) generate commands including operation (flight) mode, e.g. instrumented flight along a fixed-altitude leg with level wings, or flight to the next way-point, and operation (flight) data, to Flight and Guidance subsystems 212, e) monitoring the flight execution status, and the Flight and Guidance System 212 health status, f) report the flight execution status, and the Flight and Guidance subsystems 212 health status to MM 201, g) decision on responsive action to exceptional events which are related to flight and guidance, and to Flight and Guidance System 212 failures, h) report the MM 201 on exceptional events, i) run BIT procedure of Flight and Guidance subsystems 212. Where desired, further functions may be performed by the FM 202. The functional architecture of the FM 202 is based on the generic functional architecture of the SM FPM, as described by FIG. 5 below. If desired, a different functional architecture may be employed for the FM 202.

The main functions which are performed by the Navigation Manager NM 203, are: a) initializing the operation of the Navigation System 213, b) calibration and alignment of the Navigation System 213, c) Navigation System 213 management and sequencing, following the navigation plan, i.e. the detailed SOP which is executed in accordance with the functional definitions of the task and its associated constraints and parameters generated by MM 201, d) update the navigation plan, e) generate commands including operation (navigation) mode e.g. which navigation sensor will be active and contribute to data processing, at certain time, and operation data to navigation sub system 213, f) monitoring the navigation execution status, and the Navigation System 213 health status, g) report the navigation execution status, and the Navigation subsystems 213 health status to MM 201, h) decision on responsive action to exceptional events which are related to navigation performance, and to Navigation System 213 failures, i) control the distribution of the processed navigation data to the user FPMs, i.e. one or more SMs and their associated subsystems j) perform high level data processing, data association and data fusion functions, on data which is received from Navigation sub-systems 213, and/or from the Global Memory and Data Base—GMDB 208, k) report the MM 201 an exceptional events, l) run BIT procedure of Navigation sub-systems 213.

Where desired, further functions may be performed by the NM 203. The functional architecture of the NM 203 is based on the generic functional architecture of the SM FPM, as described by FIG. 5 below. If desired, a different functional architecture may be employed for the NM 203. The above mentioned functions of the NM 203 apply for various combination of navigation sensors, systems and techniques, including: INS, IMU, GPS, OMEGA, TRN, DR, and any combination of these sensors. If desirable, other navigation sensors, or navigation sensor combinations, or other navigation techniques may be used.

The main functions which are performed by the Sensor Manager SM 204, are: a) initializing the operation of the Sensor System 214, b) initialization the calibration of the Sensor System 214, c) Sensor System 214 management and sequencing, following the sensing plan, i.e., the detailed SOP which is executed in accordance with the functional definitions of the task and its associated constraints and parameters generated by MM 201, d) update the sensing plan to cope with actual situation, e) generate commands including operation (search and sensing) mode, e.g. using single sensor or dual, apply conning search or raster search of the detecting elements and of the scanning, and gimbal drive mechanisms; and in case of using multiple sensors, which sensor will be active and contribute to data processing, at certain time, to Sensor sub-system 214, f) monitoring the sensing execution status, and the Sensor System 214 health status., g) report the sensing execution status, and the Sensor sub-systems 214 health status to MM 201, h) decision on responsive action to exceptional events which are related to sensor performance, and to Sensor System 214 failures, i) control the distribution of the sensor processed data to all the user FPMs, j) perform high level data processing, data association and data fusion functions, on data which is received from Sensor sub-systems 214, and/or from the Global Memory and Data Base—GMDB 208, k) report the MM 201 on exceptional events, l) run BIT procedure of Sensor sub-systems 214. Where desired, further functions may be performed by the SM 204. The functional architecture of the SM 204 is based on the generic functional architecture of the SM FPM, as described by FIG. 5 below. If desired, a different functional architecture may be employed for the SM 204. The above mentioned functions of the SM 204 apply for various combinations of sensors, sensor systems and sensing techniques, including: Optical, Electro-optical, IR, RF, Millimeter Wave Radar, Laser based sensors, Acoustic, and any combination of these sensors. If desirable, other sensors, or sensor combinations, or other sensing techniques may be used.

The main functions which are performed by the Payload Manager PM 205, are: a) initializing the operation of the Payload System 215, b) initiate the calibration of the Payload System 215, c) Payload System 215 management and sequencing, following the payload operation plan, i.e. the detailed SOP which is executed in accordance with the functional definitions of the task and its associated constraints and parameters generated by MM 201, d) update the payload operating plan to cope with the actual situation, e) generate and transmit commands including payload operation mode (depends on the specific payload), and operation data/parameters to payload sub-system 215, f) monitoring the payload operation execution status, and the Payload System 215 health status., g) report the payload execution status, and the Payload sub-systems 215 health status to MM 201, h) decision on responsive action to exceptional events which are related to payload performance, and to Payload System 215 failures, i) control the distribution of the payload processed data to all the user FPMs, j) perform high level data processing, data association and data fusion functions, on data which is received from payload sub-systems 215, and/or from the Global Memory and Data Base—GMDB 208, k) report the MM 201 on excepted events, l) run BIT procedure of Payload sub-systems 215. Where desired, further functions may be performed by the PM 205. The functional architecture of the PM 205 is based on the generic functional architecture of the SM FPM, as described by FIG. 5 below. If desired, a different functional architecture may be employed for the PM 205. The payload may be a weapon system, e.g., one or more of the following options: an interceptor missile against tactical ballistic missiles, or their ground based launchers, or a warhead—in case of a "Kamikaze" AV, or an intelligence gathering device, or an electronic countermeasure means, or a communication relay, or a chaff dispenser, or any other mission related payload means, as desirable. The above mentioned functions of the PM 205 apply for various kinds of payload sub-systems, depending upon the particular application.

The main functions which are performed by the Communication Manager CM 206, are: a) initializing the operation of the Communication System 216, b) Comm. System 216 management and sequencing, following the communication plan, i.e. the detailed SOP which is executed in accordance with the functional definitions of the task and its associated constraints and parameters generated by MM 201, c) update the communication plan to cope with the actual situation, d) organize the in-coming and the out-going transmissions, according to protocols, e) monitoring the communication execution status, and the Communication System 216 health status., f) report the communication execution status, and the Communication System 216 health status to MM 201, g) decision on responsive action to exceptional events which are related to communication performance, and to Communication System 216 failures, h) report the MM 201 on exceptional events, i) run BIT procedure of Communication System 216. Where desired, further functions may be performed by the CM 206.

The functional architecture of the CM 206 is based on the generic functional architecture of the SM FPM, as described by FIG. 5 below. If desired, a different functional architecture may be employed for the CM 206. The above mentioned functions of the CM 206 apply for various kinds of communication subsystems and techniques, including: RF, optical, optical fibre, and any combination of these.

The main functions which are performed by the Auxiliary System Manager ASM 207, are: a) initializing the operation of the Auxiliary Systems 217, b) Auxiliary Systems 217 management and sequencing, following the auxiliary systems operation plan, i.e the detailed SOP which is executed in accordance with the functional definitions of the task and its associated constraints and parameters generated by MM 201, c) update the auxiliary systems operating plan to cope with the actual situation, d) generate and transmit commands including operation mode, and operation data/parameters to auxiliary systems 217, e) monitoring the auxiliary systems operation execution status, the resource level, and the Auxiliary Systems 217 health status., f) report the auxiliary systems execution status, the resource level, and the Auxiliary Systems 217 health status to MM 201, g) decision on responsive action to exceptional events which are related to auxiliary systems performance, and to Auxiliary Systems 217 failures, h) report the MM 201 on exceptional events, i) run BIT procedure of Auxiliary sub-systems 217. Where desired, further functions may be performed by the ASM 207. The functional architecture of the PM 205 is based on the generic functional architecture of the SM FPM, as described by FIG. 5 below, with some simplifications. If desired, a different functional architecture may be employed for the ASM 207.

The main functions which are performed by the Global Memory and Data Base GMDB 208, are: a) memory and data base management, b) data storage and retrieval, c) data organization, d) memory monitoring, e) data error detection and correction. The GMDB 208 has three functional areas: a) long-term, inerasable memory, which store data that is not changed from mission to mission, e.g., main programs and data which is related to the AV per se, b) mission memory which store data that is specific to the mission. This data is downloaded to the GMDB 208, via data link 218, prior to launch or take-off. c) dynamic memory which store data which is gathered throughout the mission, or, a data which has to be stored temporarily, during the execution of the mission.

Data which is stored in the long-term, inerasable memory, includes: Main program, AV models and parameters, navigation error models and parameters, sensor models and parameters, models of threats and countermeasures, parameters of G, N&C loops and filters, parameters of sensor system. If desirable, further types of data may be added or deleted. Data which is stored in the mission memory, includes: Mission Plan—MP, global route and Trajectory Plan—TP, System Operation Plans—SOPs, targets map, e.g. sites launchers of tactical ballistic missiles, threat and intelligence maps, e.g. sites of surface-to-air missiles batteries, weather conditions information, e.g., maps of wind conditions and map of visibility conditions, cartographic data, e.g., Digital Terrain Elevation Data (DTED), airphotos. If desired, further information may be added or, deleted to, or from the mission memory, respectively. Data which is stored in the dynamic memory, may include: dynamic location of recognized threats, gathered intelligence information, record of AV mission execution parameters for post- mission analysis, telemetry information, record of sub-systems operational parameters. If desired, other data may be stored, or deleted.

The main function of the Data Communication Module DCM 209, is to reorganize, manage and control the data transmission via Data Link 218. The Data Link 218, preferably a bi-directional serial link, is used for data transfer between the AMC 200 and the supporting equipment, such as the MPS 105 and between the AMC 200 and the external Automatic Test Equipment (ATE), which checks the AMC 200 and the AV sub-systems prior to launch, or take-off. If desirable, other types of data link may be used. Since the Data Link 218 is operative only in the pre-mission phase, and it is disconnected prior to AV launch or the take-off, the DCM 209 is non-operative after launch or, take-off.

As described earlier, the AV sub-systems in level 3, are not considered to be an integral part of the AMC 200. It should be emphasized, however, that the data processing capabilities which are required from the FPMs in level 2, are a function of the self contained processing capabilities which are embedded in the sub-systems of level 3. A possible approach is to allocate as much local processing power is feasible, to each of the sub-systems in level 3. However, this approach has to be trade off against the resulting cost.

The Flight and Guidance Subsystem 212 includes of the guidance loops, the flight control and autopilot control loops, the engine and its associated control loops, the acrodynamic surfaces and its associated servo control loops, the servo actuators and the associated electronics, and, as an option, the Flight and Guidance processing means. If desirable, further elements may be added. The Flight and Guidance Subsystem 212 is linked to the AMC 200, via the Global Bus 210. If desirable, a link to the Data Bus 211 may be added.

The Navigation Subsystem 213 includes of the Inertial Navigation System—INS, Global Positioning System—GPS radio navigation system, Dead Reckoning—DR navigation assembly which accommodates a vertical gyro, tri-axis magnetometer, air-data sensors, and the associated drive and conditioning electronics, and, if desirable, the navigation computing means. Optionally, other navigation means, e.g., other radio navigation systems, or TRN—Terrain Reference Navigation means, or laser or RF altimeter, or other sensors, or optical-based navigation means may be added, or replace current means. The Navigation Subsystem 213 is linked to the AMC 200, via the Global Bus 210 and the Data Bus 211. If desirable, other means may be used to link the Navigation Subsystem 213 to the AMC 200.

The Sensor Subsystem 214 includes of a stabilized IR scanning search system, a laser detector, and a radar detector warning systems, and their associated processing means, as well as their gimbal drive and control means. If desirable, other sensors and/or drive and stabilization means may be added. Other sensor means for the AV may include: Optical sensors, Electro-optical sensors, IR sensors, RF sensors, Millimeter Wave sensors, chemical agents sensors, laser based sensors, acoustic sensors, and other sensors, as may be required and appropriate. If desirable, the processing functions may be performed by processing means in the Sensor Manager 204. The Sensor Subsystem 214 is linked to the AMC 200, via the Global Bus 210 and the Data Bus 211. If desirable, other means may be used to link the Sensor Subsystem 214 to the AMC 200.

The main element of the Payload Subsystem 215 of the AV in the present invention is the interceptor missiles, the objective of which is to intercept tactical ballistic missiles in the boost phase of their trajectory. Thus the Payload Subsystem 215 comprise of the missiles, their launching mechanisms, and their electrical and mechanical interface to the AV body, assemblies, and sub-systems. If desirable, other payload elements, or sub-systems may be used. The Payload Subsystem 215 is linked to the AMC 200, via the Global Bus 210. If desirable, it may also, be linked to the Data Bus 211. If desirable, other means may be used to link the Payload Subsystem 215 to the AMC 200.

The Communication Subsystem 216 includes of two-way narrow band RF communication link. If desirable, other means for communication, including electro-optical, or fiber-optic based communication link, may be used. The communication link is used, mainly, for status reporting to command, control, communication and intelligence centers, and for intra-group and intra-fleet communication with other AVs in cooperative mode of operation (see below). The Communication Subsystem 216 is linked to the AMC 200, via the Global Bus 210. If desirable, a link to the Data Bus 211 may be added and other means of data transmission between the Communication Subsystem 216 and the AMC 200, may be used.

The Auxiliary Subsystem 217, includes: landing gear, electrical alternator, fuel pumps, and further sub-systems, and assemblies, as may be desirable. The Auxiliary Subsystems 217 are linked to the AMC 200, via the Global Bus 210. If desirable, a link to the Data Bus 211 may be added and other means of data transmission between the Auxiliary Subsystems 217 and the AMC 300, may be used.

Figure 3:
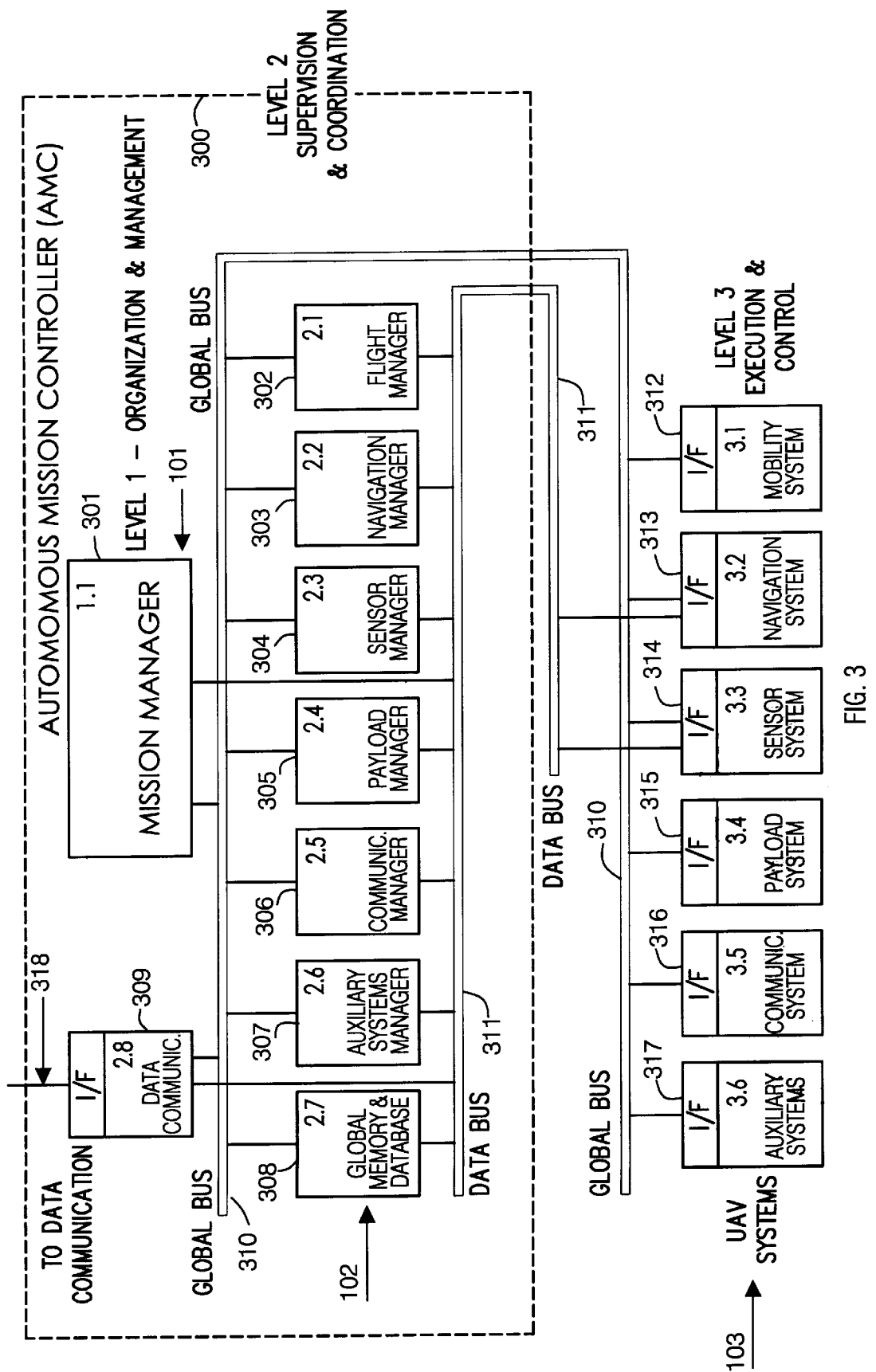
FIG. 3 is a block diagram of the functional architecture of a general-purpose AMC of FIG. 1, fitted in an AV.

Attention is now directed to FIG. 3 showing a functional architecture of AMC 300 (100 in FIG. 1, 200 in FIG. 2) for AV, other than air AV. The structure of AMC 300 is similar to that of AMC 200, which was described with reference to FIG. 2. Also, the structure, the functions, and the functional architecture of FPMs in AMC 300, are similar to FPMs in AMC 200 which has the same responsibilities, e.g., Sensor Manager 304 in AMC 300, is similar in its functionalities, functional architecture, and data transmission links to AMC 300, to Sensor Manager 204 in AMC 200. Obviously, since the specific application of the AV in FIG. 3, and its vehicular characteristics are different from that of an air AV in FIG. 2, i.e. not necessarily intercepting tactical ballistic missiles, the specific algorithms, models, data bases, mobility systems, sensor systems, navigation systems, and other AV subsystems modules of the AV AMC 300 have a different structure from their counterparts in the air AV, and the air AV AMC 200, and those versed in the art will readily understand that the detailed description of each specific element $3xy$ of AMC 300, is similar, mutatis mutandis, to its counterpart $2xy$ of AMC 300, and therefore will not be further expounded herein.

Figure 4:
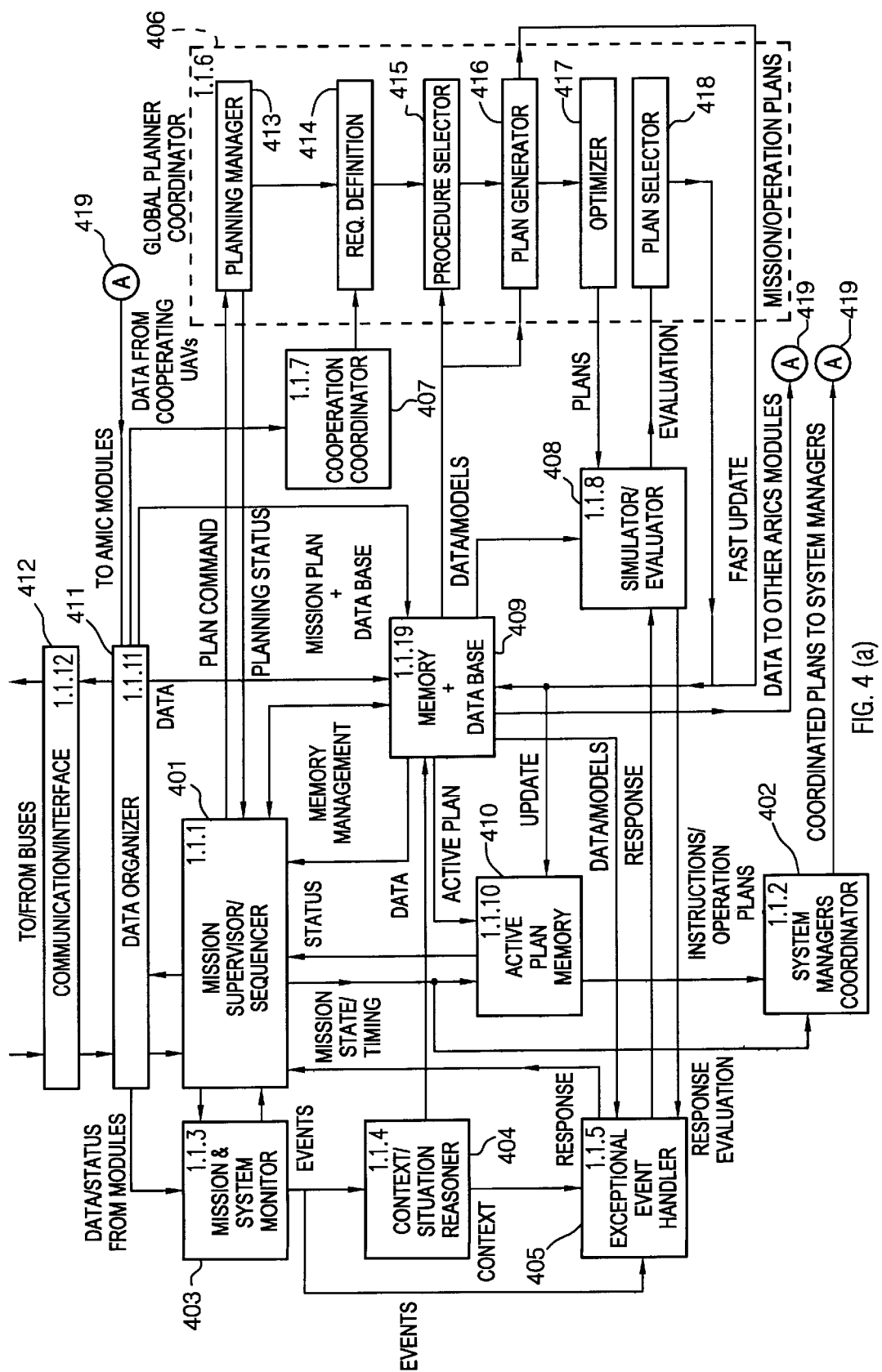
FIG. 4a is a block diagram of the functional architecture of the Mission Manager (MM) Functional Processing Module (FPM), forming part of the AMC of FIGS. 2 and 3.
FIG. 4b is a schematic illustration of a planning process according to one embodiment of the invention.
Figure 4:
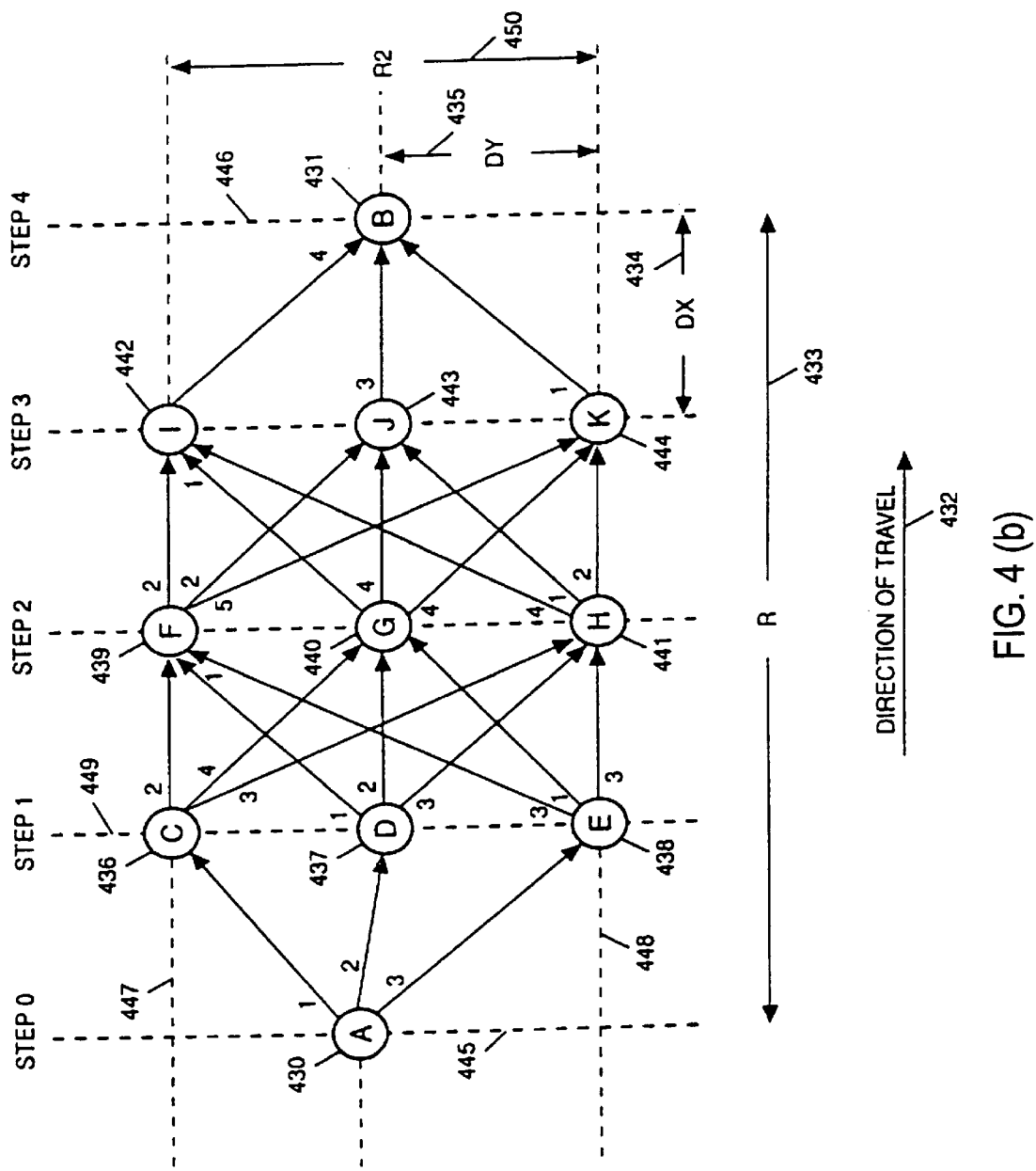

FIG. 4 describes in a diagrammatic way, the functional architecture of the Mission Manager FPM 201 in FIG. 2 (301 in FIG. 3). It should be noted that for clarity of presentation, local data buffers and temporary memories were omitted from FIGS. 4 and 5. Thus, the Mission Manager FPM 201 accommodates mainly, the following Functional Processing Sub-Modules FPSMs: a) Mission Supervisor/Sequencer FPSM 401. b) System Managers Coordinator FPSM 402. c) Mission & System Monitor FPSM 403. d) Context/Situation Reasoner FPSM 404. c) Exceptional Event Handler FPSM 405. f) Global Planner/Coordinator FPSM 406. g) Cooperation Coordinator FPSM 407. h) Simulator/Evaluator FPSM 408. i) Memory and Data Base FPSM 409. j) Active Plan Memory FPSM 410. k) Data Organizer FPSM 411. l) Communication/Interface FPSM 412. The Communication/Interface FPSM 412 provides data transfer means to and from the Global Bus 210 and the Data Bus 211, FIG. 2. The Data Organizer FPSM 411 functions are protocol management, data organization and, data dispatching. While in the "Pre-Mission" mission state (801, see FIG. 8 below) the Mission Plan MP and the associated Data Base DB is downloaded to the AMC Global Memory (Data Base 208, FIG. 2), the relevant parts thereof, (e.g. the data which are specific to the mission or to a segment thereof), are downloaded to the Memory and Data Base FPSM 409. The Memory and Data Base FPSM 409, has three functional areas: a) long-term, inerasible memory which stores data that is not changed from mission to mission, e.g., main programs and data which is related to the AV per se, b) mission memory which store data that is specific to the mission. This data is downloaded to the GMDB 208, via data link 218, in the Pre-Mission mission state, prior to launch or take-off, c) dynamic memory which stores data which is gathered throughout the mission, or, a data which has to be stored temporarily, during the execution of the mission. Data which is stored in the long-term, inerasible memory, includes: Main program, AV models and parameters, navigation error models and parameters, sensor models and parameters, models of threats and countermeasures, parameters of G, N&C loops and filters, parameters of sensor system. If desirable, further types of data may be added or deleted. Data which is stored in the mission memory, includes: MM Mission Plan—MP, global route and also desired pre-planned nominal TP and SOPs, target maps, e.g. launch sites of tactical ballistic missiles, threat and intelligence maps, e.g. sites of surface-to-air missiles batteries, weather conditions information, e.g., maps of wind conditions and map of visibility conditions, cartographic data, e.g., Digital Terrain Elevation Data (DTED), airphotos. If desired, further information may be added or, deleted to, or from the mission memory, respectively.

Obviously, in the latter embodiment the pre-stored SOPs data are transmitted from level 1 to level 2, but as has already been specified in the foregoing this is only one option and by an alternative, preferred embodiment only functional tasks and their associated parameters and constraints are transmitted to one or more SMs in level 2, which in their turn are capable of processing the transmitted data so as to bring about a detailed plan SOPs. It is recalled in this connection that the SOPs may be a priori stored in the database associated with level 2, or planned (either in part or entirely) by utilizing the SM's local planner.

It should be noted in this connection that whilst for sake of clarity of explanation the various options of SOP downloading, planning and execution discussed above will not be repeated in every particular case where the propagation of data from level 1 to level 2 is described, they, nevertheless, apply.

Reverting now to the structure of FPSM 409 it further includes dynamic memory for storing data such as dynamic location of recognized threats, gathered intelligence information, record of AV mission execution parameters for post-mission analysis, telemetry information, record of sub-systems operational parameters and others. If desired, other data may be stored, or deleted.

Data and models are transmitted from the Memory and Data Base FPSM 409 to the following FPSMs: a) Mission Supervisor sequencer FPSM 401. b) data and models to Global Planner/Coordinator FPSM 406 to Simulator/Evaluator FPSM 408, and to Exceptional Event Handler FPSM 405. c) Active Plan to be executed, to Active Plan Memory 410, i.e. a segment of the MM MP which is relevant to the current MM MS defined in terms of functional tasks and its associated parameters and constrains d) data to other AMC modules, via modules 419, 411 and 412. From the Pre-Mission state, and throughout the execution of the entire mission sequence, the Mission Supervisor/Sequencer FPSM 401 manage the mission sequence according to: a) the MM MP, which determines, inter alia, the mission phases/states, and their conditional directed connectivity, see FIG. 8. below b) information on the mission execution status and systems status which is received from the Mission and System Monitor FPSM 403, c) information on decisions and instructions regarding the response to exceptional events which is provided by Exceptional Event Handler FPSM 405.

While being in a certain phase/state, the Mission Supervisor/Sequencer FPSM 401 checks, continuously, if the transition conditions to another phase/state are met and if in the affirmative, the Mission Supervisor/Sequencer FPSM 401 transits the mission phase/state to another phase/state, and reports the new mission phase/state, as well as timing information to the Active Plan Memory FPSM 410, to the Mission and System Monitor FPSM 403, to the Global Planner/Coordinator FPSM 406, as part of the Plan Command data and to the System Managers Coordinator 402. The new mission phase/state determines a functional mission segment in terms of functional tasks and their associates constrains assigned, respectively to at least one of said SMs.

The actual assignment of the mission segment utilizes the Memory and Database Unit 409 as well as the Active Plan Memory 410 in the following manner. Thus, the Mission Supervisor/Sequencer FPSM 401 manage the retrieval and distribution of data from the Memory and Data Base unit 409 to the users. The active plan which is the operative plan to be executed during the current mission phase/state, is transmitted from the Memory and Data Base unit 409 to the Active Plan Memory 410, which maintain the updated plan. If desirable, the plan which is executed may be updated, in a Fast Update mode, which is the main updating mode in time critical situations. The System Operation Plans—SOPs, and the instructions to the System Managers is then transmitted to the System Managers Coordinator FPSM 402, where a synchronization process is performed. After the SOPs are synchronized, the coordinated plans are delivered to the System Managers via modules 419, 411 and 412. In case that a replanning or, a plan modification action is required, the Mission Supervisor/Sequencer FPSM 401 send a Plan Command to the Global Planner/Coordinator FPSM 406. If desirable, a complete planning process may be performed by FPSM 406.

The Plan Command includes data regarding: a) plan type. b) planning initialization and synchronization parameters. c) time to complete plan d) operation mode—individual or, cooperative. Further data may be included in the Plan Command, if desirable. The Global Planner/Coordinator FPSM 406 referred to also as said "Planner module" comprises of the following FPSMs: a) Planning Manager FPSM 413. b) Requirements Definition FPSM 414. c) Procedure Selector FPSM 415. d) Plan Generator FPSM 416. e) Optimizer FPSM 417. f) Plan Selector FPSM 418. Upon receiving the Plan Command from FPSM 401, the Planning Manager FPSM 413 initiates the planning process, and determine process parameters, e.g., time to plan, planning with or without optimization. The planning requirements and constraints are then defined by the Requirements Definition FPSM 414. If the AV operate in a cooperative mode, then the data provided by the Cooperation Coordinator FPSM 407, is also considered during the requirements definition. Follow the planning requirements definition, the appropriate planning procedure or, planning procedures are selected by the Procedure Selector FPSM 415, to be used by the Plan Generator FPSM 416. There are several planning procedures, each for a different planning task, e.g., cruise route planning, fast cruise route planning, trajectory planning, sensing planning, communication planning, and further planning procedures, as desired. After the appropriate planning procedures are selected, the planning procedures and the data for planning, is send from the Memory and Data Base 409, to the Plan Generator FPSM 416. The Plan Generator FPSM 416 may execute several planning procedures concurrently as instructed by the Planning Manager FPSM 413. In various circumstances, the planning process is a bi-phase process. In the first phase, executed by the Plan Generator FPSM 416, a plan or, usually, several alternative plans are generated so as to meet the constraints, but they are not yet optimized. The plans are then delivered to the Optimizer FPSM 417, where an optimization operation is conducted as the second planning phase. The Plan Generator and the Optimizer use variety of planning and optimization techniques, some of which are based on Dynamic Programming optimization methods, see: a) Bertsekas D. P. (1987), "Dynamic Programming—Deterministic and Stochastic Models", Prentice—Hall, N.J., USA, 1987, and, b) Bellman R., (1961), "Adaptive Control Processes—A Guided Tour", Princeton University Press, N.J., USA, 1961. Some procedures are using A# type of optimal search algorithms, see: Barr A., Feigenbaum E. A., (1981), "The Handbook of Artificial Intelligence", William Kaufmann Inc., USA, 1981. Other planning and optimization techniques and methods may be used such as the following known techniques (taken alone or in combination):

Dijkstra, neural network, genetic algorithm, linear programming, gradient search, Newton search, heuristic, simulated annealing, integral equations, differential equations, difference equations, fuzzy models, random search, learning techniques, non-linear programming, digital filters, and continuous time filters. Further techniques which are suitable for planning but not for simulation are the known unimodel search and multi-model search techniques.

If the time is critical, or not optimization is required, the plan generated in the first phase may be delivered directly to the Memory and Data Base, 409, a procedure which is termed "Fast Update Mode." If the plans undergo an optimization process, then, several, e.g., 3–4, alternative plans are send to the Simulator/Evaluator FPSM 408, where an evaluation procedure, or a simulation, is performed. The evaluation and simulation processes examine variety of criteria, e.g., expected time of arrival to destination, predicted fuel consumption, predicted Time-on-Target, probability of exposure to hostile countermeasures, which enable to give the appropriate score to each of the alternative plans. The criteria for plan selection may vary along the mission sequence. Based on the score given by the Simulator/Evaluator, the Plan Selector FPSM 418, selects the most desirable plan for execution, and deliver the plan to the Memory and Data Base 409, and the Planning Manager 413 reports to the Mission Supervisor Sequencer 401 that the current planning process has been terminated.

According to the mission schedule, the plan, which is to become the active plan, is loaded from the Memory and Data Base 409 to the Active Plan Memory 410, and thereafter to the System Managers Coordinator FPSM 402. In the case that the active plan doesn't include the SOPs themselves (i.e. the System Managers Coordinator FPSM 402 holds functional tasks and their associated parameters and constraints for the respective at least one participating SM), FPSM 402 will assign at a proper timing so as to coordinate the SMs activities, the tasks and their associated parameters and constraints (where constrains include scheduling considerations) to the respective SMs in level 2 which will process it so as to bring about the corresponding SOP, i.e. detailed plan of the particular task.

In the case that the AV is operated in a cooperative operation mode, the information provided by the Cooperation Coordinator FPSM 407, is used for planning requirement definition, and by the planning FPSMs to follow. The Cooperation Coordinator FPSM 407 comprise of the following FPSMs: a) Dynamic Local Blackboard. b) Evaluation Unit. c) Local Adaptive Decision Algorithms. d) Learning Network for Parameter Adjustment. Detailed description of the structure and the functions of the Cooperation Coordinator FPSM 407 in the present embodiment is given in: Yavnai A., (1994), "Distributed Decentralized Architecture for Autonomous Cooperative Operation of Multiple Agent System", in Proceedings AUVS-94, 21st Annual Technical Symposium Association for Unmanned Vehicle Systems, 23–25 May, 1994, Detroit, USA. pp. 95–101. Other techniques for coordination of cooperative operation may be used, if desirable. Information regarding subsystems status, mission and task execution status, events, as well as various relevant variables, e.g., fuel consumption rate, navigation data, and further data as required, is continuously transferred to the Mission Manager, from all the other AMC FPMs, via the buses, and units 412, and 411, respectively. This data is then delivered to the Mission and System Monitor FPSM 403. Based on this information, further processing is conducted by the Mission and System Monitor FPSM 403, using computing means, to determine the system status, and to recognize the occurrence of exceptional events. The report on mission status is delivered to the Mission Supervisor/Sequencer FPSM 401, where the occurrence of an exceptional event is reported to the Context/Situation Reasoner FPSM 404 and to the Exceptional Events Handler FPSM 405. The Context/Situation Reasoner FPSM 404 associates events and tracks their temporal evolution, in order to assess the mission and the system context and situation. The recognized context and situation is then transferred to the Exceptional Events Handler FPSM 405. The technique which is used for reasoning about the mission and system context and situation, in the present embodiment is detailed in: a) Yavnai A., (1992), "Context Recognition and situation Assessment in Autonomous Mobile Robots", Proceedings SPIE Vol. 1831 Mobile Robots VII, Boston, November 1992, pp. 119–130. b) Yavnai A., (1993), "Context Recognition and Situation Assessment in Intelligent Autonomous Systems", in Proceedings of IEEE 1993 International Symposium on Intelligent Control, August 1993, Chicago, USA, pp. 394–399. If desirable, other techniques may be used.

The Exceptional Events Handler FPSM 405 maintain decision maps which are in the form of conditional decision trees, each called a Response Decision Tree—RDT; see, e.g., FIG. 10(a) and FIG. 10(b), as examples of RDT. Each decision tree, map an exception event, into a decision on the responsive action that has to be taken, in order to, eventually, minimize the effect of the exceptional event. Based on its internal RDTs, the Exceptional Events Handler FPSM 405 determine the responsive action to be taken, as a response to the exceptional event. This decision on the response in then reported to the Mission Supervisor/Sequencer FPSM 401, and via FPSM 401, to the Global Planner/Coordinator FPSM 406, when the decision lead to a replanning, or plan modification activity. This decision on the response is also send to the Memory and Data Base 409. Another function which is performed by the Exceptional Event Handler FPSM 405, is the generation of a combined response in the case when two or more exceptional events, occur simultaneously. The response combination mechanism, and the associated FPSMs, are described with reference to FIG. 11 and FIG. 12, in the present invention.

A possible repertoire of responsive actions to abnormal events is:

a) no change at all, keep executing the current MM MP, no change of MM MS.

b) make a minor adjustment or modification in the current MM MP or a parameter thereof, no change of MM MS. Then, update the active plan memory and execute the MM MP. The minor adjustment and modification can be done by the exceptional event handler FPSM or by the planner FPSM depending upon the event.

c) transit the MM MS to another MM MS that is associated with the current MM MP, where the transition is not according to the nominal, regular, transition sequence. Then, execute the current MM MP while being at the new MM MS. The transition to another MM MS is done by the mission supervisor/sequencer FPSM.

d) select an alternative MM MP out of a bank of pre-planned MM MPs according to selection criteria. Then, update the active plan memory and execute the newly selected MM MP. A transition from the current MM MS to a new MM MS associated with the updated MM MP may be required. The MM MP selection is done by the exceptional event handler FPSM or by the mission supervisor/sequencer FPSM, depending upon the exceptional event.

e) select and combine pre-planned MM MPs, or pre-planned plan segments thereof, into a new combined MM MP. Then, update the active pan memory and execute the updated MM MP. A transition from the current MM MS, to a new MM MS, associated with the updated MM MP may be required. The plan combination is done by the planner FPSM.

f) re-plan an alternative MM MP or segments thereof. Then, update the active plan memory and execute the updated MM MP. A transition from the current MM MS to a new MM MS associated with the updated MM MP may be required. The re-planning is done by the planner FPSM.

g) reconfigure the AV either by replacing an inoperative device or module in a subsystem, by an identical functioning, backup, device, or, activate other modules in the subsystem, which albeit being different than the inoperative device can functionally execute the same task; then continue according to the MM MP; A transition from the current MM MS to a new MM MS, within the current MM MP, may be required. The reconfiguration is done by the exceptional event handler FPSM.

h) select a crisis recovery MM MP, out of a bank of pre-stored crisis recovery MM MPs according to selection criteria; then update the database and execute the selected crisis recovery MM MP. A transition from the current MM MS to a new MM MS, associated with the updated MM MP, may be required. The MM MP selection is done by the exceptional event handler FPSM or by the mission supervisor/sequencer FPSM, depending upon the exceptional event. A modification to the pre-planned crisis recovery MM MP may be require and if so, the modification is done by the exceptional event handler FPSM or by the planner FPSM.

The same responsive actions apply, mutatis mutandis, to the SMs.

An example is now given, see FIG. 4(b), of the planning/replanning process which is performed by the Global Planner/Coordinator FPSM 406. In this example, the Mission and System Monitor FPSM 403, recognize the occurrence of the exception event "SCHEDULE_LAG", see FIG. 10(a), while the AV is cruising to the target area, state 4 CRUISE 804 in FIG. 8. The Mission and System Monitor FPSM 403 reports on this exceptional situation to the Exceptional Event Handler FPSM 405, which then run a Response Decision Tree—RDT, as described by FIG. 10(a). It is assumed, in the present example, that the AV engine is running in full RPM, therefore, according to FIG. 10(a), branch 1005, in FIG. 1 10(a), has to be followed. Thus, the response to be taken as a result of the exceptional event "SCHEDULE_LAG", is to replan the cruise route, 1006, and to continue the cruise flight, according to the updated plan. A report on the selected response is then issued to the Mission Supervisor/Sequencer FPSM 401, which, in turn, issues a Plan Command to the Planning Manager FPSM 413. The Plan Command include data regarding: a) plan type being in the present example CRUISE_PLAN. b) planning initialization and synchronization parameters which in the present example being the geographical location of the origin waypoint WP A 430 in the updated cruise route, the geographical location of the terminal/destination waypoint WP B 431 in the updated cruise route, and time of the day, to arrive at WP A 430. c) time to complete the planning process. In the present example, the upper bound to the planning process time is given by time difference between the current time and the arrival time to WP A 430. Following the Plan Command, the Planning Manager FPSM 413, determines the planning process parameters, such as: a) time to plan, b) whether to incorporate, or not, an optimization phase. Based on that information, and according to the specific planning algorithm for cruise route planning, the Requirements Definition FPSM 414, defines the requirements and the data which is needed for that planning process.

In the present example, the defined requirements include: a) the geographical information such as coordinates of WP A 430 and WP B 431, b) the boundaries of the geographical area which is subject to the planning process, c) the resolution of the planning grid, namely, to how many grid cells the geographic area between the origin WP A 430, and the terminal WP B 431 should be divided. This geographic area is bound by four grid lines: 445, and 446 is one dimension, along the direction of travel 432, and 447 and 448, in the other dimension, perpendicular to the direction of travel. The four lines also determine the boundaries of the planning area, d) the weather conditions, e.g., winds, and barometric pressure in the bounded geographical area, (c) definition of no-flight areas, for reasons of flight safety and/or hostile activities.

Upon completing the requirements definition, the Procedure Selector FPSM 415, selects and retrieves the Cruise Route Planning Procedure and the requested data for planning, from the Memory and Data Base FPSM 409. After the Cruise Route Planning Procedure, and the data for planning, is selected, it is sent from the Memory and Data Base 409, to the Plan Generator FPSM 416, for planning execution. Attention is now directed again to FIG. 4(b), which illustrates the cruise route planning process. The Cruise Route Planning Procedure, which is performed by the Plan Generator FPSM 416, utilizes a Dynamic Programming based algorithm to find the optimal cruise route, in terms of the shortest flying time. Namely, to find the cruise route which will bring the AV from geographical location WP A 430 to geographical location WP B 431 in the shortest time, under specified weather conditions. This specific algorithm has a single optimization criterion—minimize time. If desirable, the optimization process may be a multi-variable optimization process, which may be much more complex and more time consuming. Specifically, the algorithm use a multi-step discrete and deterministic version of the dynamic Programming algorithm. The planning space and the planning complexity are determined by the number N of the multi-stage sequential decision steps, and by the number L of possible decisions, or actions, at each decision step. The total number D of decisions in this case is given by: D=(N−2) * L * L+2 * L. In the present example, see FIG. 4(b), N=4, L=3, hence, D=24.

The benefit of using a dynamic Programming based planning algorithm is that it eliminates many non-optimal possibilities.

In the current example, FIG. 4(b) the need to examine a combinatorial tree of 3 * 9 * 9 * 3 (i.e. 729) possibilities is avoided. Instead, only 24 possibilities have to be examined, in a sequential process. In the current example, the planning parameters N and L, determine the planning complexity, and the resulting planning time duration. As mentioned before, the geographical area which is spanned between WP A 430, and WP B 431, along the direction of travel 432, and between grid lines 447 and 448, across the direction of travel 432, is divided to smaller area cells, by a cartesian grid, the dimensions of the grid cells are DX 434, and DY 435. A coarse grid division, namely, large DX 434 and DY 435 grid dimensions, leads to a less complex decision process, and hence, to a shorter planning time. A fine grid division, namely, smaller DX 434 and DY 435 grid dimensions, leads to a longer planning time, but also to possible better decision, or, a better cruise route plan. The grid dimensions DX 434 and DY 435, may be equal to each other, or not. For the sake of simplicity, it is assumed that all the grid cells has the same area and dimensions, and that both DX and DY, are not changed, over the entire planning area. The number N of decision steps, is determined by the distance R 433 between WP A 430 and WP B 431, and by the along track geographical cell dimension DX 434. R is also termed as the planning grid length, N is given by: N=R/DX. In the present example, FIG. 4(*b*), N=4. The number L of possible decisions at each decision step, is given by the distance R2 450 between lines 447 and 448, and by the across track grid dimension DY 435.

R2 is also termed the planning grid width. L is given by:

$$L = \frac{R2}{DY} + 1,$$

i.e. L=3.

The distance R 433 is given by the geographical location of the origin WP A 430 and the terminal WP B 431. The distance R2 is subject to the decision on the planning area, and it is also derived, among other factors, from the limitation on the admissible flight corridors. In the present example, each grid line intersection forms a candidate WP for the planned route. For example, the intersection 436 between grid line 447 and grid line 449, form a potential WP C 436, at the geographical location of the intersection 436. In the same way, other potential WPs are defined. In the present example, the following potential WPs are defined: WP C 436, WP D 437, WP E 438, WP F 439, WP G 440, WP H 441, WP I 442, WP J 443, and WP K 444. The total number of potential WPs is thus nine (9), plus WP A 430 and WP B 431. If desirable, other arrangements of the WPs may be used.

The cruse route planning process is conducted in two phases: a) prediction of the flight time along each individual flight segment, between two WPs, b) selecting the optimal route for minimum travel time, between WP A 430 and WP B 431. In the first phase, the predicted flying time between every two neighboring WPs is calculated. In the present algorithm, it is not allowed to fly between two neighboring WPs which are located on the same grid line across the direction of flight 432. For example, the only allowed flight segments from WP C 436, are to: a) WP F 439, b) WP G 440, or c) WP H 441. It is, in the present example, not permitted to fly from WP C 436 to either WP D 437, or to WP E 438. However, these limitations are not necessarily imperative and may be eliminated if desirable, and in any case they do not limit the use of the algorithm.

In FIG. 4(*b*), each potential route segments is connecting two WPs, and it is represented by a directed arc from the tail (origin) WP toward the head (destination) WP. Each arc is labelled by a number which represents the predicted time of flight (in hours) between the two connected WPs. The predicted time of flight is a function of the geographical distance, the winds and other weather parameters, the engine RPM and other parameters. Accordingly, by this particular example, the predicted time of flight along the segments is: segment AC—1 hour, segment AD—2 hours, segment AE—3 hours, segment CF—2 hours, segment CG—4 hours, segment CH—3 hours, segment DF—1 hours, segment DG—2 hours, segment DH—3 hours, EF—3 hours, segment EG—1 hour, segment EH—3 hours, segment FI—2 hours, segment FJ—2 hours, segment FK—5 hours, segment GI—1 hours, segment GJ—4 hours, segment GK—4 hours, segment HI—4 hours, segment HJ—1 hour, segment HK—2 hours, segment IB—4 hours, segment JB—3 hours, segment KB—1 hour.

After the prediction of the flight time for each route segment is completed, the optimization process is initiated. The flight possibilities to each WP is examined, and the route which leads to the shortest time from WP A 430 to the WP is declared as the optimal route from WP A 430 to the said potential WP. It should be noted that in certain cases, the shortest route is not necessarily a unique route, and in some cases, more than one route may be performed in the same shortest time. In FIG. 4(*b*) the following are the optimal flying time from WP A 430, to the said WP. In step 1, the optimal flight time to WP C 436, to WP D 437, and to WP E 438, is calculated. The optimal flying time from WP A 430, to WP C 436, along segment AC is 1 hour. The optimal flying time from WP A 430, to WP D 437, along segment AD is 2 hours. The optimal flying time from WP A 430, to EP E 438, along segment AE is 3 hours. In step 2, the optimal flight time to WP F 439, to WP G 440, and to WP H 441, is calculated. The optimal flying time from WP A 430, to WP F 439 along segments AC and AF, or AD and DF is 3 hours. The optimal flying time from WP A 430, to WP G 440 along segments AD to DG, or AE and EG is 4 hours. The optimal flying time from WP A 430, to HP H 441 along segments AC and CH is 4 hours. In step 3, the optimal flight time to WP I 442, to WP J 443, and to WP K 444, is calculated. The optimal flying time from WP A 430, to WP I 442 along segments AC and CF and FI, or AD and DF and FI, or AD and DG and GI, or AE and EG and GI, is 5 hours. The optimal flying time from WP A 430, to WP J 443 along segments AC and CF and FJ, or AD and DF and FJ, or AC and CH and HJ, is 4 hours. The optimal flying time from WP A 430, to WP K 444 along segments AC and CH and KH is 6 hours. In step 4, the optimal flight time from WP A 430 to WP B 431 is calculated. The optimal flying time from WP A 430, to WP B 431, along segments AC and CH and HK and KG is 7 hours. In the present example, the optimal route is unique. No other route is available with 7 hours (or less) of execution. Hence, the optimal route is composed of the segments which connect the following WPs: A—C—H—K—B.

After completion, the optimal route plan is transmitted to the Memory and Data Base FPSM 409. A report on plan completion is transmitted by the Planning Manager FPSM 413 to the Mission Supervisor/Sequencer FPSM 401. Then, when this plan becomes the active plan, the plan is delivered to the Active Plan Memory FPSM 410. The flight plan being defined functionally in terms of segments which connects said WP, will then be processed in level two by the Flight manager into a detailed trajectory plan specifying inter alia the trajectory flight velocities, turning radius, rate of climbing and descending, timing considerations and others.

If the time allowed for route planning is long, additional optimization process may be used, where the geographic area is divided to smaller grid cells, and where the route planning give a finer plan, at the cost of longer planning time.

The planning procedure that was described in the foregoing applies, mutatis mutandis, to planning procedures other than finding the optimal route, and obviously, for different purposes when other applications are concerned. It should be further noted that the planning procedure that was described with reference to FIG. 4b is not bound by particular planning technique and other techniques, as specifies above, may be utilized for realizing the planner module.

Figure 5:
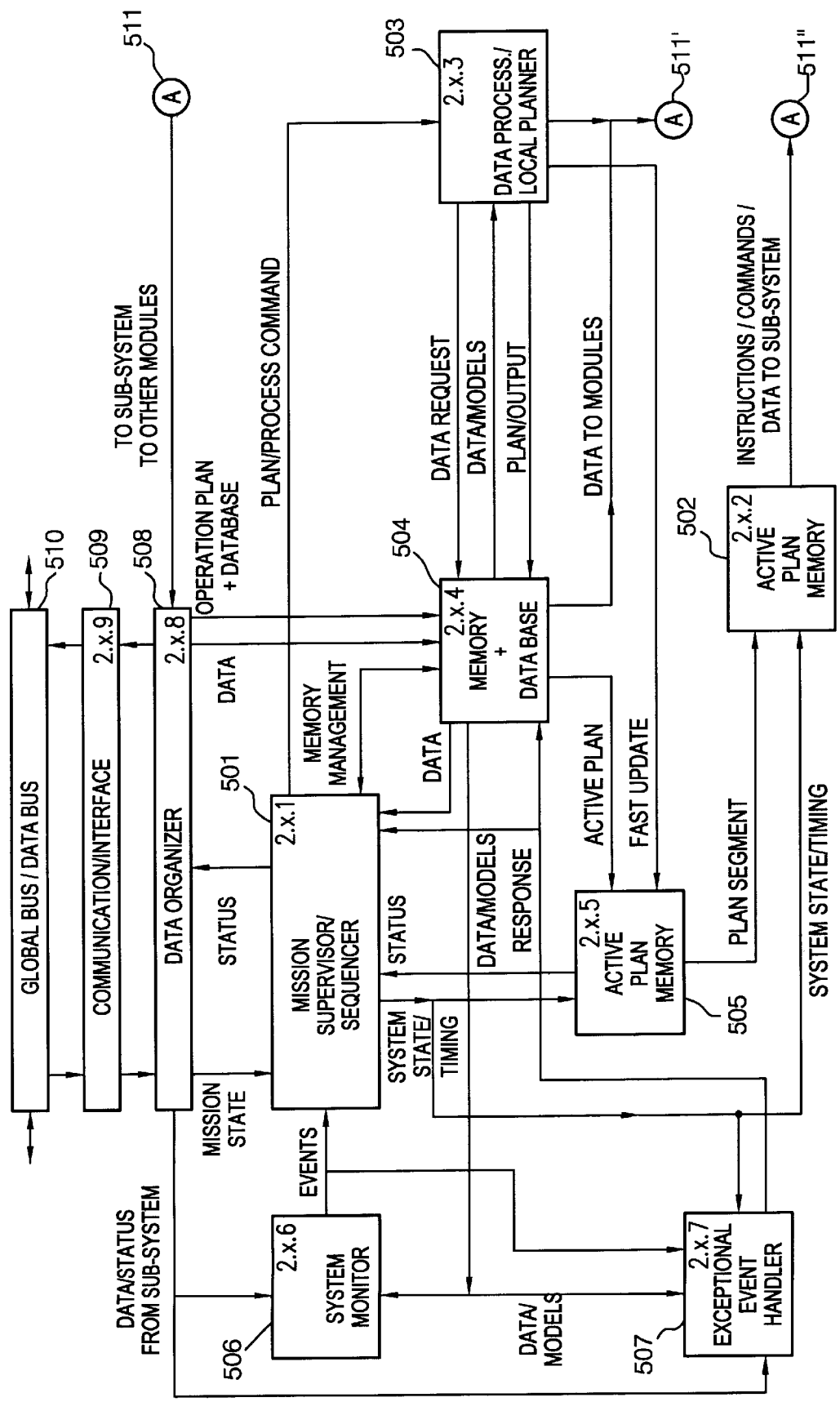
FIG. 5 is a block diagram of the functional architecture of a generic System Manager (SM) Functional Processing Module (FPM), which is used in some of the SM FPMs forming part of the AMC in FIGS. 2 and 3.

Attention is now directed to FIG. 5 which describes in a diagrammatic way, the generic functional architecture of a System Manager FPMs in FIG. 2 (and in FIG. 3). In the present embodiment, the following System Managers FPMs has a functional architecture which is based on the generic functional architecture, as described in FIG. 5: a) Flight Manager FPM 202, b) Navigation Manager FPM 203, c) Sensor Manager FPM 204, and d) Payload Manager FPM 205. If desirable, other FPMs may be based on the generic functional architecture.

A System Manager FPM, which is based on the generic architecture, comprise, mainly, of the following Functional Processing Sub-Modules FPSMs: a) System Supervisor/Sequencer FPSM 501. b) Sub-system Coordinator FPSM 502. c) Data Processing/Local Planner FPSM 503. d) Memory and Data Base 504. e) Active Plan Memory 505. f) System Monitor FPSM 506. g) Exceptional Event Handler FPSM 507. h) Data Organizer FPSM 508. i) Communication/Interface, 509. The Communication/Interface FPSM 509 provide data transfer means to and from the Global Bus and the Data Bus, designated collectively as 510, FIG. 2. All the data transmission and communication with other modules of the AMC are performed via unit 509. The Data Organizer FPSM 508 functions are protocol management, data organization and, data dispatching.

Figure 8:
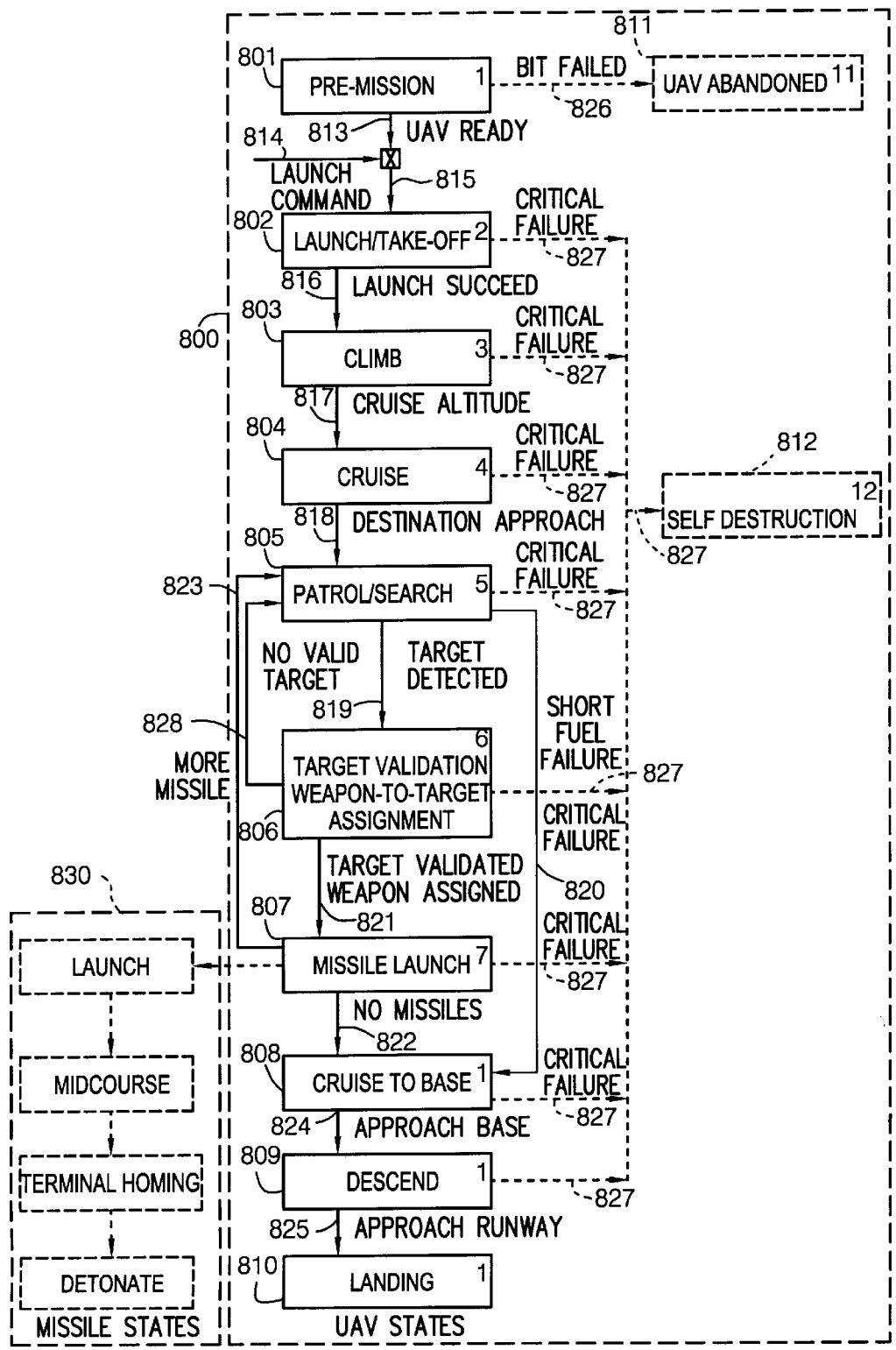
FIG. 8 is an illustrative example of a mission level state graph, which establishes the Mission Plan (MP)

As specified in the foregoing, while in the Pre-Mission, mission state 801, see FIG. 8, the Mission Plan MP, sub-systems System Operation Plans—SOPs, and the associated data, are downloaded to the AMC Global Memory and Data Base 208, FIG. 2. If desired, the data can be allocated to other memory units. The relevant parts, thereof, i.e. being SOPs broken down by System Managers, e.g. SOP for flight manager, SOP for sensing manager etc. are downloaded to the Memory and Data Base FPSM 504.

Put differently, a nominal detailed design is a priori loaded to the SM of level 2, for use when it receives a proper command from the coordinator 402 of the MM (i.e. the functional task and the associated parameters and constrains that are associated to said pre-stored SOP). The Memory and Data Base FPSM 504, has three functional areas: a) long-term, inerasible memory which store data that is not changed from mission to mission, e.g., system manager programs and data which is related to the AV and to its subsystems per se. b) mission memory which stores data that is specific to the current mission and to the SM. This data is downloaded via data link 218, in the Pre-Mission mission state, prior to launch or take-off. c) dynamic memory which store data which is related to the sub-system, and which is gathered throughout the mission, or, a data which has to be stored temporarily, during the execution of the task. Data which is stored in the long-term, inerasible memory, is related to the specific sub-system, which is managed by the relevant System Manager, e.g., system manager program, control and guidance parameters, navigation error models and parameters, sensor models and parameters, models of threats and countermeasures, parameters of sensor system. If desirable, further types of data may be added or deleted.

Data which is stored in the mission memory, which is prepared prior to the specific mission, include: System Operation Plan—SOP for the subsystem which is managed by the system manager (assuming the embodiment where nominal pre-planned SOPs are a priori stored in level 2), kinematic models of tactical ballistic missiles—for the Sensor Manager FPM 204, threat and intelligence maps, e.g. sites of surface-to-air missiles batteries, weather conditions information, e.g., maps of wind conditions and map of visibility conditions, cartographic data, e.g., Digital Terrain Elevation Data (DTED), airphotos, GPS Almanach—for the Navigation Manager FPM 203. If desired, further information may be added or, deleted to, or from the mission memory, respectively.

Data which is stored in the dynamic memory, may include: sensor measurement readings, target track file, dynamic location of recognized threats, gathered intelligence information, estimated target trajectory, record of AV mission execution parameters for post-mission analysis, telemetry information, record of sub-systems operational parameters, again broken down by the SMs under consideration. If desired, other data may be stored, or deleted. Data and models are transmitted from the Memory and Data Base FPSM 504 to the following FPSMs: a) System Supervisor Sequencer FPSM 501. b) data and models to Data Processing/Local Planner FPSM 503, to System Monitor FPSM 506, and to Exceptional Event Handler FPSM 507. c) Active Plan to be executed, to Active Plan Memory 505. d) data to other AMC modules, via 511 and modules 508, 509 and 510.

From the Pre-Mission state, and throughout the execution of the entire mission sequence, the System Supervisor/Sequencer FPSM 501 manage the system task and operation sequence according to: a) the SOP, which determines, inter alia, the task/sub-system phases/states, and their conditional directed connectivity. b) information on the task execution status, and sub-system status which is received from the System Monitor FPSM 506. c) information on decisions and instructions regarding the response to exceptional events which is provided by Exceptional Event Handler FPSM 507. While being in a certain phase/state, the System Supervisor/Sequencer FPSM 501 checks, continuously, if the transition conditions to another phase/state are met and once these conditions are met, the System Supervisor/Sequencer FPSM 501 transit the task/sub-system phase/state to another phase/state, and report the new task/subsubsystem phase/state, as well as timing information to the Active Plan Memory FPSM 505, to the System Monitor FPSM 506, and to the Data Processing/Local Planner FPSM 503, as part of the Plan/Process Command data. The System Supervisor/Sequencer FPSM 501 manages the retrieval and distribution of data from the Memory and Data Base unit 504 to the users, i.e. modules 505, 506 and 507. The active plan (i.e. SOP or segment thereof) which is the operative plan to be executed during the current task/subsystem phase/state by the subordinate subsystem, is transmitted from the Memory and Data Base unit 504 to the Active Plan Memory 505, which maintain the updated system operation plan. If desirable, the System Operation Plan—SOP, which is executed may be updated, by the Data Processing/Local Planner FPSM 503. A plan segment is send to the Sub-System Coordinator FPSM 502, which then issue synchronized instructions and commands to the subordinate sub-system.

The synchronized instructions and commands are delivered to the sub-systems via 511, and modules 508, 509 and 510. In case that a replanning or, operation plan modification is required, or a data processing action is required, the System Supervisor/Sequencer FPSM 501 sends a Plan/Process Command to the Data Processing/Local Planner FPSM 503, to perform a plan replanning, or a data processing task. If desirable, a complete planning process of the System Operating Plan—SOP, may be executed by FPSM 503. The Plan/Process Command include data regarding: a)

plan or, process type. b) local planning or, processing, initialization and synchronization examples of RDT. c) time to complete the local planning or, the data processing task. Further data may be included in the Plan/Process Command, if desirable. Each of the System Manager operate several planning procedures, each for a different planning task.

For example, the Data Processing/Local Planner FPSM 503 of the Flight Manager FPM 202 may employ procedures for cruise route planning, fast cruise route planning, trajectory planning, and scheduling planning. Further planning procedures may be employed as desirable.

Likewise, the Data Processing/Local Planner FPSM 503 of the Sensor Manager FPM 204 may employ procedures for search planning, tracking planning, and further planning procedures, as desirable.

Preferably, the Data Processing/Local Planner FPSM 503 may execute several local planning procedures concurrently, and use variety of data processing, and planning and optimization techniques.

Some of the data processing procedures are based on digital filtering techniques and Fast Fourier Transforms, see: Rabiner L. R., Gold B., (1975), "Theory and Application of Digital Signal Processing", Prentice-Hall, N.J., USA, 1975. Other data processing, estimation, and detection techniques, e.g., correlation functions, Kalman-filter, may be used. See: Barkat M., (1991), "Signal Detection and Estimation", Artech House, Mass., USA, 1991. Some of the planning and optimization techniques are based on Dynamic Programming optimization methods, see: a) Bertsekas D. P. (1987), "Dynamic Programming—Deterministic and Stochastic Models", Prentice-Hall, N.J., USA, 1987, and, b) Bellman R., (1961), "Adaptive Control Processes—A guided Tour", Princeton University Press, N.J., USA, 1961. Some procedures are using A* type of optimal search algorithms, see: Barr A., Feigenbaum E. A., (1981), "The Handbook of Artificial Intelligence", William Kaufmann Inc., USA, 1981. Other planning and simulation techniques and methods may be used, as described in the foregoing with reference to the global planner/coordinator 406.

According to the task schedule, the operation plan, which is to become the active operation plan, is loaded from the Memory and Data Base 504 to the Active Plan Memory 505, and thereafter, plan segments are loaded to the Sub-System Coordinator FPSM 502. The latter will assign the SOP segment at the proper timing to its subordinated subsystem.

Information regarding sub-systems status, and task execution status, events, as well as various relevant variables, e.g., fuel consumption rate, navigation data, and further data as required, is continuously transferred to the System Manager under consideration, from the subordinated sub-system via the buses 510, and the units 508, and 509, respectively. This data is then delivered to the System Monitor FPSM 506, and to the Exceptional Events Handler FPSM 507. Based on this information, further processing is conducted by the System Monitor FPSM 506, using computing means, to determine the task and the sub-system status, and to recognize the occurrence of exceptional events, which are under the responsibility of the said System Manager. The report on task status is delivered to the System Supervisor/Sequencer FPSM 501, and the latter after duly processing it delivers it, or portion thereof, to the Mission Manager FPM 201. The occurrence of an exceptional event is reported to the Exceptional Events Handler FPSM 507, and to the System Supervisor/Sequencer FPSM 501.

Similar to the Exceptional Events Handler FPSM 405 of the MM, also the Exceptional Events Handler FPSM 507 maintains local decision maps which are in the form of conditional decision trees, each called a Response Decision Tree—RDT, of the kind shown in FIG. 10(a) and FIG. 10(b), but which in departure from the FPSM 405 are confined to local issues of the subordinate subsystem which, as a rule, concern particular aspects of the mission execution rather than generic ones.

Each decision tree, maps an exceptional event in the responsibility of the said System Manager, into a decision on the responsive action that has to be taken, in order to, eventually, minimize the effect of the exceptional event. Based on its internal RDTs, the Exceptional Events Handler FPSM 507 determines the action to be taken, as a response to the exceptional event. This decision on the response is then reported to the System Supervisor/Sequencer FPSM 501, and via FPSM 501, to the Data Processing/Local Planner FPSM 503, when the decision lead to a replanning, or data processing activity. This decision on the response is also send to the Memory and Data Base 504. If desirable, the decision on responsive action is also reported to the Mission Manager 201. Another function which is performed by the Exceptional Event Handler FPSM 507, is the generation of a local combined response in the case when two or more exceptional events, occur simultaneously. The response combination mechanism, and the associated FPSMs, are described with reference to FIG. 11 and FIG. 12, in the present invention.

Figure 6:
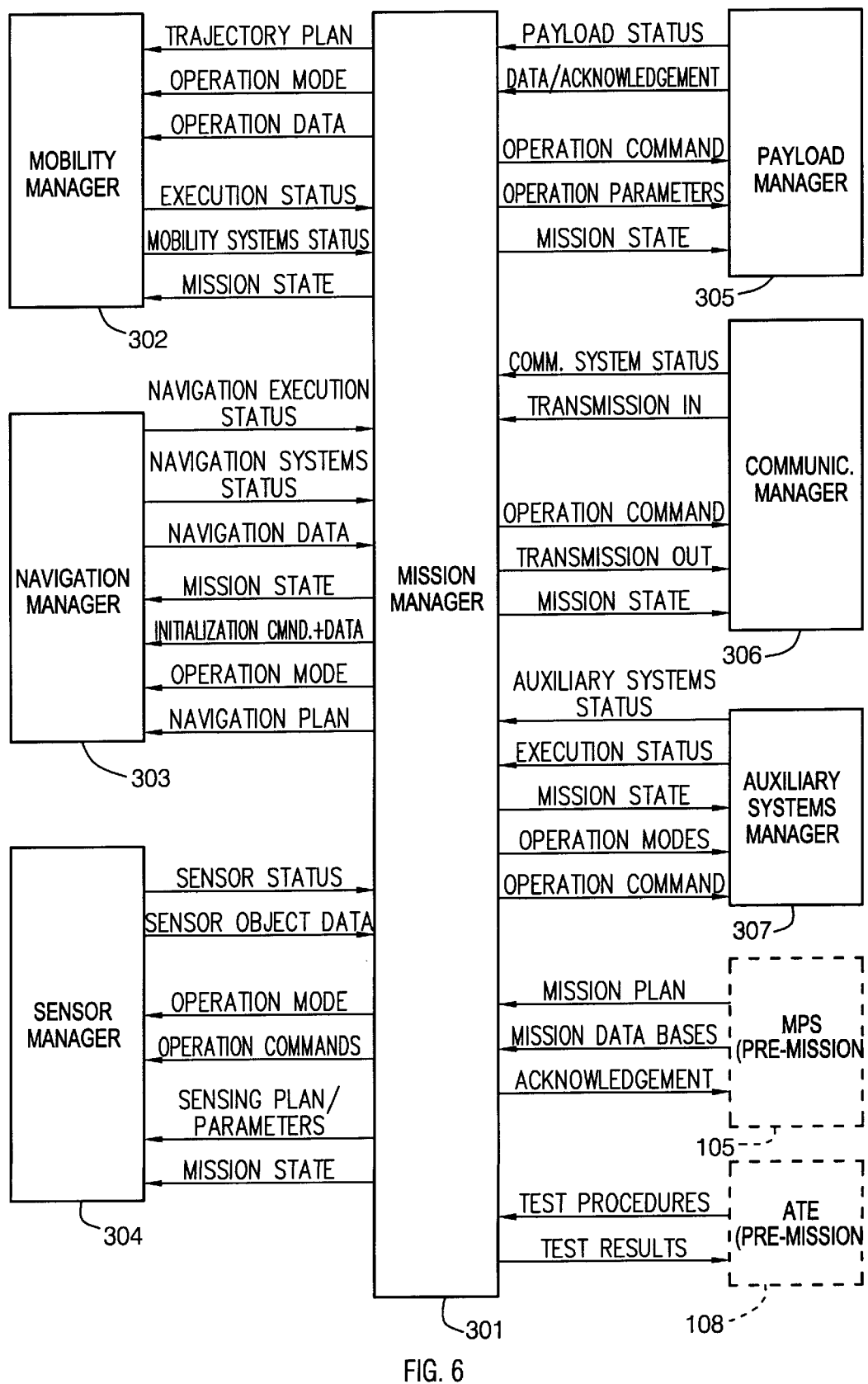
FIG. 6 is an illustration of a typical information flow between the MM FPM and the SM FPMs, of the AMC.

FIG. 6 describes the main elements of information flow within a AV AMC 300, between the Mission Manager FPM 301, and the six (6) System Manager FPMs, numbered 302 through 307 in FIG. 3. Also described in FIG. 6 is the information flow elements between the Mission Manager FPM 301, and the MPS 105 and the ATE 108. It should be noted, however, that the information flow between the Mission Manager FPM 301 and the MPS 105, and between the Mission Manager FPM 301 and the ATE 108, existed only in the pre-mission phase.

The Mission Manager 301 send the following information elements, to the System Manager FPMs:

a) to Mobility Manager 302: Route plan defined in functional manner, mobility/transportation mode, mobility data, mission state.

b) to Navigation Manager 303: initialization command, initialization data, navigation mode, Navigation plan defined in a functional manner, mission state.

c) to Sensor Manager 304: Sensing Plan defined in functional manner, and parameters, sensing mode, sensor operation commands, mission state.

d) to Payload Manager 305: payload operational plan defined in a functional manner, payload operation commands, payload operation parameters, mission state.

e) to Communication Manager 306: communication plan defined in a functional manner, communication system operation command, transmission out, mission state.

f) to Auxiliary Manager—307: auxiliary systems operation plan defined in functional manner, auxiliary systems operation mode, auxiliary systems operation command, mission state.

g) to Mission Planning System MPS 105 (at pre-mission phase): acknowledgement on receiving data.

h) to Automatic Test Equipment—ATE 108 (at pre-mission phase): test results.

It should be commented that apart from the pertinent functional task the additional data sent from level 1 to 2 constitute said parameters and constraints which are necessary for processing the functional task into detailed plan.

If desirable, other elements of information may be send from the Mission Manager 301, to the System Manager FPMs.

The Mission Manager 301 receive the following information elements, from the System Manager FPMs: a) from Mobility Manager 302: Trajectory/mobility plan execution status, mobility systems status. b) from Navigation Manager 303: navigation plan execution status, navigation data, navigation systems operative and health status. c) from Sensor Manager 304: sensing plan execution status, sensor object data i.e. high level data resulting from the sensor data processing, assimilation, fusion and abstraction; sensor status. d) from Payload Manager 305: payload status, data which is gathered and/or processed by the payload, acknowledgement, payload plan execution status e) from Communication Manager 306: transmission in, communication system status. f) from Auxiliary Systems Manager 307: execution status, auxiliary systems status. g) from Mission Planning System MPS 105 (at pre-mission phase): mission plan, mission data bases. h) from Automatic Test Equipment—ATE 108 (at pre-mission phase): test procedures. If desirable, other elements of information may be send to the Mission Manager 301, from the System Manager FPMs.

Figure 7A:
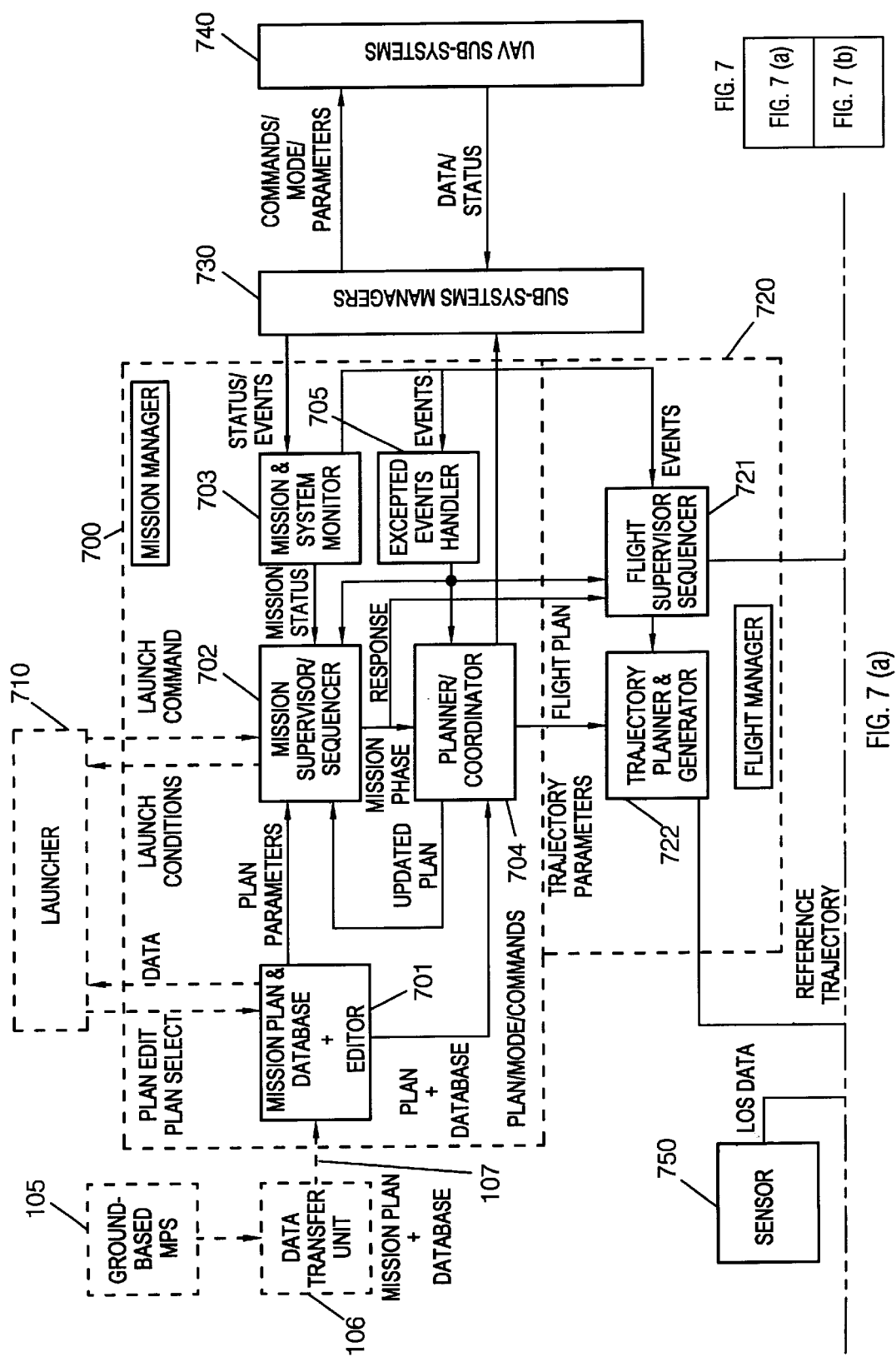
FIG. 7 is a block diagram which illustrates the interrelations between the MM FPM, the Flight Manager FPM, and the Guidance, Navigation and Control (GN&C) functions in an aerial AV, according to one embodiment of the invention.
Figure 7:
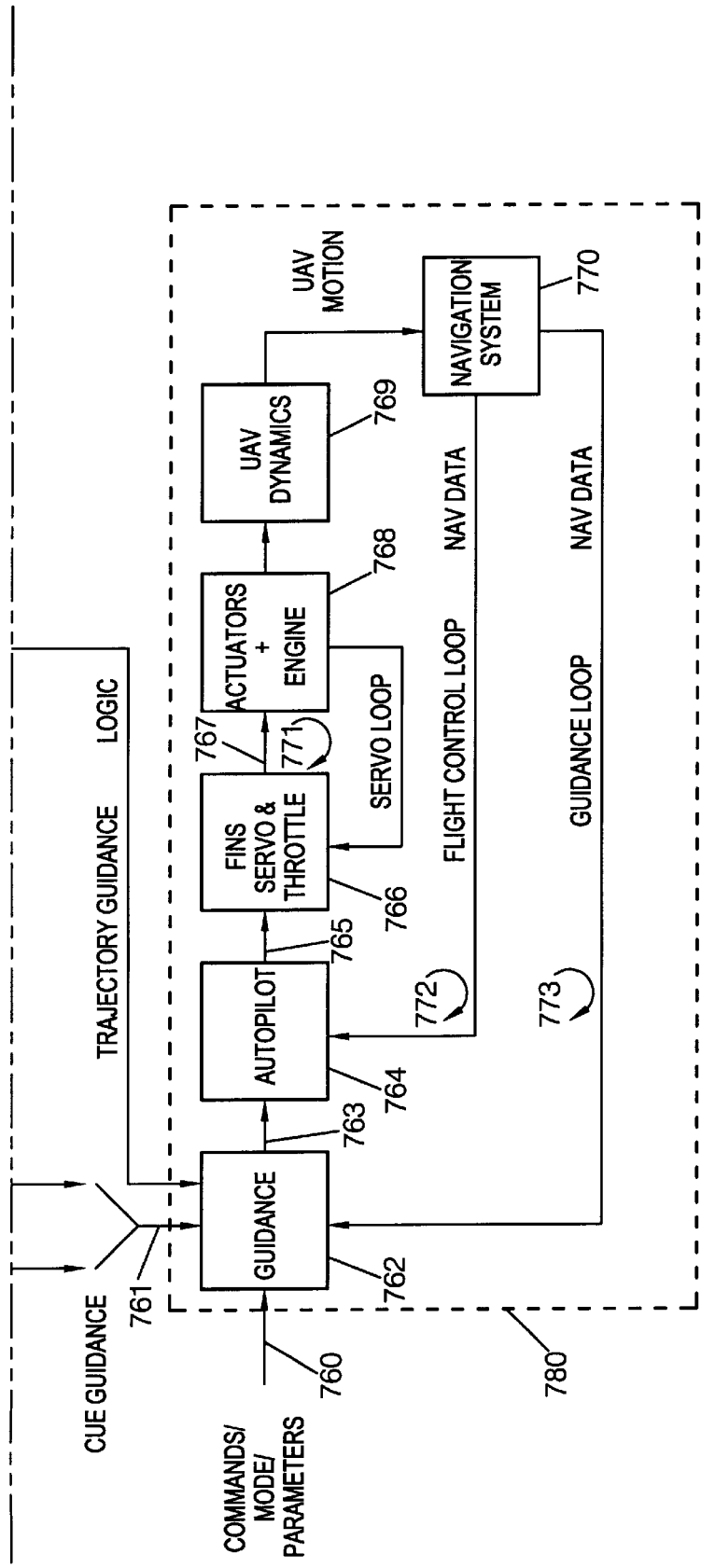

FIG. 7 illustrates in a schematic way, the functional interrelations between the Mission Manager 700 (201 in FIG. 2 and 301 in FIG. 3), the Flight Manager FPM 720 (202 in FIG. 2), and the Guidance, Navigation and Control (GN&C) functions 780 in an AV. Thus, FIG. 7 provides an extended and focused view on the flight component of the AV mission, and AV's AMC, a view which is more familiar to experts in guidance navigation and control systems and technology, respectively. MPS 105 is the Mission Planning System, DTU 106 is the Data Transfer Unit. The Launcher 710 may be any platform or a device which support the launch or, take-off of the AV. The Mission Manager 700 (201 in FIG. 2, 301 in FIG. 3) is shown here with only some of its FPSM, for reasons of clarity. Actually, the MM 700 constitutes level 1 (101 in FIGS. 1, 2, 3) of the hierarchy. Level 2 (102 in FIGS. 1, 2, 3) of the hierarchy is composed of the Flight Manager 720 (202 in FIG. 2) which is also not completely detailed in FIG. 7, along with the other System Manager FPMs, collectively designated as 730. The Sensor sub-system 750 (214 in FIG. 2, 314 in FIG. 3), the G, N&C sub-systems, collectively designated 780, and the other AV's sub-systems, collectively designated 740, constitute level 3 (103 in FIGS. 1, 2, 3) of the hierarchy.

Prior to AV launch, or take-off, the Mission Planning System—MPS 105, produce the Mission Plan—MP, and the related Data Base DB, which is then downloaded to the Data Transfer Unit 106, and via the Data Link 107, it is downloaded to the AV AMC 200.

Upon receiving a mission order 104 (or an Air Mission Order—AMO), from the relevant authority, a mission planning process is conducted by the Mission Planning System—MPS 105. The MPS 105 may be either a ground based system, or installed on a platform, such as an aircraft, a ship, or any other platform, hereinafter termed the launcher 710. The planning process in the MPS 105 is preferably automatic. However, this planning process is supervised and guided, checked and approved, by a human operator. Upon completion the planning process, and the plan validation, the Mission Plan—MP, which includes, as an internal plans, the nominal pre-planned Trajectory Plan—TP, and the nominal pre-planned Systems Operation Plans—SOP for the AV's subsystems, and the associated Data Bases—DB, are stored in the MPS 105, or in the Data Transfer Unit—DTU 106 ready to be downloaded to the AV.

When the AV is tested and approved for a mission, and the AV AMC 200 is ready to receive data, the MP (including the pre-planned nominal TP and SOP) and the associated DB are downloaded from the DTU 106 via a data transmission link 107 which may be a serial link, e.g., a standard RS—422 data link, to the AMC's Mission Plan and Data Base memory and Editor Functional Processing Sub-Module (FPSM) 701, which is one of the sub-modules that constitute the Mission Manager 700 (201 in FIG. 2, 301 in FIG. 3). If desirable, other means for data transfer from the MPS 105 to the Mission Plan and DB Memory and Editor 701, may be used. If the time allowed from receiving the mission command, to AV take-off, or launch, is too short, or, in case that the MPS 105 is failed, or no MPS operator is available to operate the MPS 105 and to conduct the mission planning process, the entire mission planning process may be performed, in-flight, by the AMC's Planner/Coordinator FPSM 704, after AV take-off, or launch, and the SOPs planned by the SMs local planners.

Prior to launch, or take-off, a Mission Plan may be selected, out of a bank of alternative mission plans, which were planned by the MPS 105, and then stored in the unit 701. Furthermore, a plan may be edited and modified, while stored in the Mission Plan & DB and Editor FPSM 701, up to the very last minute, prior to AV launch, or take-off. Plan selection and editing is performed by the AV operator or a planner personnel, onboard the launcher 710, or in its vicinity. During the plan selection and plan edit operation, the Mission Plan & DB and Editor FPSM 701, may send data to the launcher 710, for indicating and displaying various parameters and graphical data which represent the Mission Plan, and further factors, as desired, to the AV mission planner or, operator. The Mission Plan & DB and Editor FPSM 701 maintain the modified Mission Plan, and send the relevant mission data to the Mission Supervisor/Sequencer FPSM 702 and to the Planner/Coordinator FPSM 704.

Prior to launch, the Mission Supervisor/Sequencer FPSM 702 sends reports to the launcher 710, indicating if the launch conditions are met. The reports are based on information which is received from the Mission and System Monitor FPSM 703. When the launch conditions are met, a launch command is issued and send from the launcher 710, to the Mission Supervisor/Sequencer FPSM 702. Upon receiving the launch command from the launcher 710, the Mission Supervisor/Sequencer FPSM 702, takes full authority on the AV, transits the system phase/state to "LAUNCH" and reports the new phase/state to the Planner/Coordinator FPSM 704. The Planner/Coordinator FPSM 704 sends the appropriate commands to the System Manager FPMs 720 and 730, which then, send the commands to those parts of sub-systems 740 and 780 which are involved in the launch operation. If desirable, a man-in-the-loop mode of operation may be employed in the take-off and landing phases. In such mode of operation, the human operator override the AMC, in that particular phase.

During the execution of the mission, the Mission Supervisor/Sequencer FPSM 702 manage the mission sequence according to: a) the MM MP, which determines, inter alia, the mission phases/states, and their conditional directed connectivity, b) information on the mission execution status and systems status which is received from the Mission and System Monitor FPSM 703, c) information on decisions and instructions regarding the response to exceptional events. This data is provided by Exceptional Event Handler FPSM 705. While being in a certain phase/state, the Mission Supervisor/Sequencer FPSM 702 checks, continuously, if the transition conditions to another phase/state are met. Once these conditions are met, the Mission Supervisor/Sequencer FPSM 702 transits the mission phase/state to another phase/state, and reports the new mission phase/state to the Planner/Coordinator FPSM 704.

The Planner/Coordinator FPSM 704, maintains the relevant segment of the MM Mission Plan, whereas the pertinent SOPs of the AV sub-systems are maintained by the local planners of SMs 720 and 730, respectively. This FPSM adjust and update, or replan the global plans, as requested by the Exceptional Events Handler FPSM 705. The Planner/Coordinator FPSM 704 receives information on the mission phase/state from the Mission Supervisor/Sequencer FPSM 702. Based on this information, the Planner/Coordinator FPSM 704 sends the relevant segments of the operation plans, operation commands, operation mode instructions, and synchronization messages, to the System Manager FPMs 730, i.e. the functional tasks and their associated parameters and constraints (which as specified inherently include scheduling constraints).

Each of the System Manager FPMs 730 process the data which is received from the Planner/Coordinator FPSM 704, and the data and status information which is fed back from the AV sub-systems 740, and generate and send commands, instructions about the operation mode, and operational parameters to the its subordinate execution sub-systems 740.

Each of the execution sub-systems 740, which constitutes the level 3 103, send processed data, as well as information about task execution status, and systems health status, to its superior System Manager FPM. This information is further processed by the related System Manager FPM. System Managers FPMs 730, and Flight Manager FPM 720, send information related to plan execution status, system health status, and detected or recognized events to the Mission & System Monitor FPSM 703, which is one of the sub-modules in the Mission Manager FPM 700. Based on this information, further processing is conducted by the Mission & System Monitor FPSM 703, using computing means, to determine the system status, and to recognize the occurrence of exceptional events. The report on mission status is delivered to the Mission Supervisor/Sequencer FPSM 702, where the occurrence of an exceptional event is reported to the Exceptional Events Handler FPSM 705.

The Exceptional Events Handler FPSM 705 maintains decision maps which are in the form of conditional decision trees, each called a Response Decision Tree—RDT. Each decision tree maps an exceptional event, into a decision on the responsive action that has to be taken in, order to minimize the effect of the exceptional event. Based on its internal decision maps, the Exceptional Events Handler FPSM 705 determines the responsive action to be taken. This decision on the response is send to the Mission Supervisor/Sequencer FPSM 702, and to the Planner/Coordinator FPSM 704.

Attention is now given to the those modules, in FIG. 7, which are related to the flight, guidance, navigation and, control functions.

In the present invention, the AV is considered to employ two guidance modes, alternatively. a) Trajectory Guidance Mode b) Cue-Driven Guidance Mode. If desired, other guidance modes may be employed, e.g., "follow the camera", where the camera is steered by a man-in-the-loop.

In a Trajectory Guidance Mode, a reference trajectory which is generated by the Trajectory Planner and Generator FPSM 722 on the basis of the route plan segment assigned thereto by the MM (which as recalled defines a flight route in functional terms, i.e. an ordered sequence of WPs to visit and timing data) is fed as the input signal 761 to the Guidance FPSM 762. There are several approaches to define a reference trajectory to the Guidance FPSM 762. Possible approaches, e.g., define a leg between two waypoints, namely, define flight direction, flight altitude, and flight speed, or, define a waypoint to go to, or, define the trajectory to be tracked, by moving a "virtual target", or define climbing rate/slope. Other approaches to the definition of a reference trajectory, may be employed, if desirable. In this mode, also termed "instrumented flight", the Guidance FPSM 762 employ trajectory tracking guidance algorithms, which generate, by computing means, the required steering commands 763 to the Autopilot FPSM 764. There are several types of trajectory tracking guidance algorithms, which are known to those which are skilled in the art. The input information to the guidance algorithm which generate the steering commands include: reference trajectory, guidance mode and guidance law parameters 760, and the current navigation data which is transmitted from the Navigation System 770.

In a Cue-Driven Guidance Mode, the information about the Line-Of-Sight—LOS angles and, angular rate data, and if desirable, the location or, the location error of the object within the sensor detection plane, is fed from the Sensor 750, as the input signal 761, to the Guidance FPSM 762. In this mode, the driving signal to the Guidance System 762 come from the Sensor 750, and not from the Trajectory Planner and Generator FPSM 722. In this mode, the sensor tracks an object, either a target, or a terrain feature, or any other object which is of interest, either as a mission goal, or as a supportive mean, e.g., for optical navigation update. In this guidance mode, the AV flight is slaved to the signals from the Sensor 750. In the case of Cue-Driven Guidance, the Guidance FPSM 762, may use well known guidance law, e.g. Proportional Navigation Guidance or, Pursuit Guidance, or any other guidance law, as desirable. As instructed by the Mission Supervisor/Sequencer FPSM 702, the Flight Logic Module 721 may switch between the two guidance modes. According to the guidance law employed, and to input information, the Guidance FPSM 762 generate and send the steering commands 763 to the Autopilot 764. The Autopilot 764 use control laws, well known to experts in the art, to compute the desired servo commands 765 to the Servo controller 766 of the engine throttle and of the fins, i.e., the aerodynamic steering surfaces. The Servo controller works in a closed loop mode to generate the controlled electrical voltage, or current, 767, which is then fed to the fins actuators, and engine throttle, combined designated as 768. A servo loop 771 provides a closed-loop control of the fins and of the engine throttle. The state of the fins and the engine, affect the dynamic behavior of the AV, as represented by the AV dynamic mathematical model 769. The AV motion is sensed by instruments of the Navigation System 770, which also compute the AV location. Information from the Navigation System 770 is fed back to the Autopilot 764, and thus provides a closed-loop flight control loop 772. Information from the Navigation System 770 is fed back to the Guidance FPSM 762, and thus provide a closed-loop guidance loop 773, which is the most outer loop of the G, N & C functions 780.

FIG. 8 illustrates the mission level state graph, which is the highest level state graph of the AV, and which establishes the highest level of the MP hierarchy. In the present example, the AV mission state graph 800 consist of (12) twelve states, two of which are terminating states. The states are: a) State 1, 801—"PRE-MISSION". b) State 2, 802—"LAUNCH/TAKE-OFF". c) State 3, 803,—"CLIMB". d)

State 4, 804, "CRUISE". e) State 5, 805,—"PATROL/SEARCH". f) State 6, 806,—"TARGET VALIDATION/WEAPON-TO-TARGET-ASSIGNMENT (WTA)". g) State 7, 807,—"MISSILE LAUNCH". h) State 8, 808—"CRUISE TO BASE". i) State 9, 809,—"DESCEND". j) State 10, 810,—"LANDING". k) State 11, 811,—"AV ABANDONED". l) State 12, 812,—"SELF-DESTRUCTION". The interceptor missile which is launched from the AV, upon target detection and validation, has four states mission state graph 830: a) "LAUNCH", b) "MIDCOURSE", c) "TERMINAL HOMING" and, d) "DETONATE" on target, which by this particular embodiment are not governed by the decision unit of the invention.

Attention is now given to the AV state graph 800, State 1, 801, is the "PRE-MISSION" state, which takes place prior to launch, or take-off. The main activities which take place while the AV is in state 1, 801, are: a) AV systems preparation, including: fueling, installation of interceptor missiles, maintenance procedures. b) performing BIT and other test, calibration, and alignment procedures, as required. c) downloading the MM MP and its subordinated nominal pre-planned SOPs as well as the pertinent database. If desirable, further actions may be performed. When all the pre-mission procedures and test are completed and succeeded, the AV is declared "AV READY", arrow 813. If the AV failed to meet the test, it is declared "BIT FAILED", arrow 826, and the mission state is transitted to terminal mission state 11, 811, "AV ABANDONED". The meaning of "declared" is obviously, internally. In this case all the preparations for launch or take-off, are stopped. When the AV has been declared "AV READY", arrow 813, and a "LAUNCH COMMAND, arrow 814, is issued by an authorized agent, the mission state is transitted, arrow 815, to state 2, 802, "LAUNCH/TAKE-OFF". If only one of the two conditions is logical "TRUE", or, both conditions are logical "FALSE", no transition to state 2, 802, take place, and the mission state remain state 1. While in state 2, 802, the AV is launched, or take-off. Take-off may be performed either automatically, or manually, in a remotely controlled man-in-the-loop mode. If a critical failure occurred, while the AV is in any one of the mission states, state 2, 802, through state 9, 809, a "CRITICAL FAILURE" condition, arrow 827, is declared, and the mission state is transitted to the terminal mission state 12, 812, "SELF-DESTRUCTION" state. If desirable, for reasons of safety, the AV is not self destructed, particularly in state 2, 802, and in state 9, 809.

Upon the completion of a successful launch/take-off, arrow 816, "LAUNCH SUCCEED", the AV mission state is transitted to state 3, 803, "CLIMB". While in the "CLIMB" state, 803, the AV climb, usually with level wings (zero roll angle) and with pre-determined fixed climb rate, or fixed trajectory angle. This state is terminated when the AV arrive in the desired cruise altitude. Then, a "CRUISE ALTITUDE" condition 817 is declared, and the mission state is transitted to state 4 804, "CRUISE". While is state 4, 804, the AV is flying along the nominal, or the updated route. Usually, the route is represented by a series of Way-Points, WP, the geographic location of which, is determined. The WPs are interconnected by strait lines, termed "legs". Using the reference trajectory as an input, see FIG. 7, and the current location, estimated by the Navigation sub-system 770, the Guidance FPSM 762 generates steering commands 763 according to the trajectory tracking guidance law, so the desired route, as represented by the reference trajectory, is executed.

When the AV arrives at the last planned cruise WP, which may also be the first WP of the Patrol Route, a "DESTINATION APPROACH" condition 818 is declared, and the mission state is transitted to state 5, 805, "PATROL/SEARCH". While in state 5, 805, the AV is travelling along the Patrol Route, the pattern of which is optimized for efficient coverage of the search space, or the suspected launching area.

During the flight, the Sensor sub-system 214 is operated in a search mode, searching for tactical ballistic missiles, in their boost phase. If no target is detected, the AV is staying in the Patrol route, searching for targets. If the AV fuel level is approaching the level of safe return to base, or a non-critical failure occurred, the mission state is transitted, arrow 820, to state 8, 808, "CRUISE TO BASE", and the AV leave the patrol/search area.

If desirable, other factors may lead to leave state 5, 805, as well. If a target is detected, a "TARGET DETECTED" condition 819 is declared, and the mission state is transitted to mission state 6, 806, "TARGET VALIDATION/WPA". The AV is keep flying along the patrolling route, while the Sensor sub-system 214 performs target tracking, either in a full tracking mode or in a Track-While-Scan mode, and parameter estimation, for target validation/rejection. This process may, if desirable, incorporate data which is transmitted from other cooperating AVs. If the target is a valid target, a WPA process is initiated, resulting in assigning an interceptor missile to the tracked target. For the sake of clarity, it is assumed that the assigned missile is onboard the AV under discussion. When a target is validated, and an interceptor missile is assigned, arrow 821, the mission state is transitted to state 7, 807, "MISSILE LAUNCH".

While being in state 7, 807, when launching conditions are met, an interceptor missile is launched from the AV. The missile has four main state collectively designated 830. Launch state, Midcourse state, Terminal Homing state, and Detonate state. If the target validation process is failed, condition "NO VALID TARGET" 828 is declared and the mission state is turned back to mission state 5 (805), i.e. "PATROL/SEARCH".

After launching the missile, if the AV has more missiles onboard, condition "MORE MISSILES" 823 exist, and the mission state is turned back to mission state 5, 805, "PATROL/SEARCH", keep patrolling along the Patrol Route, searching for a new target. If no more missiles are onboard, condition "NO MISSILES" 822 exist, and mission state is transitted to state 8, 808, "CRUISE TO BASE". While the AV is cruising to the base, the operation of the AV systems is very similar to the associated operation while the AV is in mission state 4, 804, "CRUISE". Again, the route may be represented as a series of interconnected WPs, or the route is heading directly to home base.

The cruise altitude of the AV while in state 8, 808, may be different from the cruise altitude in state 4, 804, as desirable. When the AV approach the base, an "APPROACH BASE" condition is declared 824, and the AV enter a descend phase, entering a mission state 9, 809, "DESCEND". Upon approaching the runway, condition "APPROACH RUNWAY" 825, is declared, and the mission state is transitted to state 10, 810, "LANDING". While in state 10, 810, the AV perform landing, and runway travelling, until a full stop is achieved. The landing operation may be done manually, by a remotely man-in-the-loop operator. This is the final state of the AV in the present invention.

For a better understanding, an example is now given to the interrelations and to the information exchange between the Mission Manager FPM 201 in level 1, and the Flight Manager FPM 202 and the Navigation Manager FPM 203 in level 2, as well as between the latter two FPMs, and the Flight and Guidance subsystem 212 and the Navigation subsystem 213 in level 3. The description is within the context of the execution of a specific mission segment, in the present example—the cruise flight toward the target area. It is assumed, for the sake of clarity of the present invention, that the AV is on mission, at mission state 4 CRUISE 804, FIG. 8, executing cruise flight to the destination, along the route which is defined in the Cruise Flight Plan. Before the AV is transitted to its mission phase/state 4 CRUISE 804, the appropriate Mission Plan segments, i.e., the Cruise Flight Plan and the Navigation Plan for the mission phase/state 4 CRUISE 804, or segments thereof, are transferred from the Mission Manager FPM 201 in level 1, to the Flight Manager FPM 202 and to the Navigation Manager FPM 203, both in level 2, respectively. The above mentioned plans are downloaded form the Memory and Data Base 409, to the Active Plan Memory 410. Then, following a timing data from the Mission Supervisor/Sequencer FPSM 401, it is transferred to the System Managers Coordinator EPSM 402, and via the system buses, to the Flight Manager FPM 202 and to the Navigation Manager FPM 203. The system Managers Coordinator FPSM 402, coordinates the operation of the System Manager FPSMs by synchronizing their operation, and by coordinating data. In certain circumstances, one of the System Manager FPSMs is determined as the master, where other System Manager FPSMs are enslaved to its operation. The segment of the Flight Plan which is associated with the mission phase/state 4 CRUISE 804, comprise of an ordered sequence of WPs which together constitute a cruise route. The first WP in the sequence is referred to, as the cruise origin WP, where the last WP in the sequence, is referred to, as the cruise terminal WP. In the specific example, the terminal WP may be in the vicinity of the target area. The Cruise Flight Plan may be organized in a form of a table, where each WP in the route, is associated with the following data: a) WP index, i.e., the location of the WP in the ordered sequence, e.g., first, second. This order determine the order of visiting the WPs along the route, b) geographic location, e.g., WP geographic longitude and geographic latitude. Other forms of geographic location representation, e.g., UTM (Universal Transverse Mercator projection) coordinates, may be used, c) WP altitude above sea level, d) route schedule being, collectively, the task assigned to the flight manager, defined in a functional manner. Further data may be included, or omitted, if desirable.

Further data is sent from the Mission Manager FPM 201 in level 1, to the Flight Manager FPM 202, along with the Cruise Flight Plan. First, the indication of the transition of the mission state from mission state 3 CLIMB 803, to mission state 4 CRUISE 804, is delivered to the Flight Manager FPM 202. Secondly, the mode of operation. In the present example, the mode of cruise flight is determined by the Mission Manager FPM 201, and is delivered as an instruction to the Flight Manager FPM 202. Possible modes of cruise flights are: a) fly to WP, heading all the time towards WP—also termed as pursuit guidance, b) fly at a fixed altitude and at a fixed heading, c) fly along a predetermined route segment, connecting two successive WPs (forming part of the parameters associated with said task). Operation data is also send, as desired, from the Mission Manager FPM 201 to the Flight Manager FPM 203. The Operation Data may further include: a) cruise altitude, b) schedule, or time of arrival at each WP, c) schedule tolerance, d) the AV heading while ingress at the cruise origin WP, and while egress the cruise terminal WP, e) weather information, f) various limitations, or restrictions, if applicable, to the operation of the subsystems, e.g., maximum time of AV engine operation with full RPM, due to engine heating problems. The stipulations a–d and a–f above form the parameters and constraints associated with said task.

All the data regarding flight plan, operation mode, operation data, and mission state, is sent to the Flight Manager FPM 202, and then stored in its local Memory and Data Base, which in the generic System Manager functional architecture, FIG. 5, is numbered as 504. Based on the data which is received from the Mission Manager FPM 201, the Data Processing and Local Planner FPSM of the Flight Manager FPM 202, which in the generic System Manager functional architecture, FIG. 5 is numbered as 503, plan and generic a detailed cruise trajectory plan, to be executed by the Flight and Guidance subsystems 212.

The detailed cruise trajectory plan define the following parameters: a) guidance mode along each route segment, b) flight altitude along each route segment, c) climb or, descend rate, or angle, along each route segment, d) flight velocity, fixed or variable along each route segment, e) heading along each route segment, f) arrival time at each WP along the route, g) turning radius and turning rate at each WP, when the AV is transitted from one route segment, to its successor route segment. The detailed cruise trajectory plan is stored, temporarily, in the Flight Manager's Memory and Data Base, numbered 504, in the generic System Manager functional architecture, FIG. 5. The Flight Manager's System Supervisor/Sequencer, numbered 501 in the generic System Manager functional architecture check, continuously, if the transition conditions to another cruise flight phase/state are met.

Examples of cruise flight phase/states, which are states that are internal to the flight system, may include: a) flying along a route segment, b) turn to a successor route segment. Once the transition conditions are met, the Flight Manager's System Supervisor/Sequences FPSM 501, transit the flight phase/state, to another flight phase/state, and report the new phase/state, as well as timing information to the Flight Manager's Active Plan Memory FPSM 505, to the Flight Manager's System Monitor FPSM 506, and to the Flight Manager's Data Processing/Local Planner FPSM 503, as part of the Plan/Process Command data. The active cruise trajectory plan, which is the System Operation Plan—SOP of the Flight and Guidance subsystem 212, to be executed during the next phase/state, is transitted from the Flight Manager's 202 Memory and Data Base unit 504, to its Active Plan Memory 505, which maintain the active flight System Operation Plan. If desirable, the System Operation Plan—SOP, which is executed may be updated, by the Flight Manager's Data Processing/Local Planner FPSM 503. A segment of the trajectory plan is sent to the Flight and Guidance Subsystem Coordinator FPSM 502, which then issue coordinated flight and guidance instructions and commands to its subordinate Flight and Guidance subsystem 212. The coordinated instructions and commands are delivered to the Flight and Guidance subsystems via 511", and via modules 508, 509, 510.

Information which is delivered from the Flight Manager FPM 202, up to hierarchy, to the Mission Manager 201, include: a) execution status of the cruise flight, i.e., what portion of the cruise route has been accomplished, what WPs has been visited, actual execution scheduling, and related exceptional events, b) health status of the flight subsystems, e.g. engine status, fins servo status, instrumentation status, and, resource level, i.e., fuel level, as well as related exceptional events. In the case that a cruise trajectory replanning or, modification is required, the Flight Manager's System Supervisor/Sequencer FPSM 501 send a Plan/Process Command to its Data Processing/Local Planner FPSM 503, to perform a cruise trajectory replanning. The Plan/Process Command include data regarding: a) plan type-in the present example, a cruise trajectory plan, b) local planning intialization and synchronization parameters, e.g., geographic location of the trajectory origin and of the trajectory termination, c) time to complete the cruise trajectory re-planning. Further data may be included in the Plan/Process Command, if desirable. When the AV is performing its CRUISE mission phase/state 4 804, The Data Processing/Local Planner FPSM 503 mainly employ procedures for cruise trajectory planning, and for cruise schedule planning. Further planning procedures may be employed, if desirable. Following the flight and the guidance instructions and commands, which are issued by the Flight Manager FPM 202, the Flight and Guidance subsystems 212, generate the necessary internal commands, input reference signals and control set points, to the guidance, autopilot, engine and fin servo control loops, which perform their tasks under closed loop, or, open loop control. Typical control loops which may be activated in the cruise flight are: a) altitude control loop, b) heading control loop, c) velocity control loop, d) aerodynamic surfaces angle control loop, e) engine throttle control loop. Other control loops may be used, if desirable. Information regarding the execution status of the Flight and Guidance subsystems 212, the occurrence of exceptional events associated with the Flight and Guidance 212 subsystems, and the health status of the Flight and Guidance subsystems 212, is reported to the Flight System Monitor FPSM 506, of the Flight Manager FPM 202. The Flight Manager's System Monitor 506, checks and correlates data which it received from the Flight and Guidance subsystem 212. When the occurrence of exceptional events is detected, a report is sent to the Flight Manager's Exceptional Event Handler FPSM 507. This module also accepts data and status reports directly, via 510, 509 and 508. According to the specific exceptional event which has been detected, unit 507 run RDT, to decide on the response to be taken as a reaction to the exceptional event. The response which is selected, is then reported to the Flight Manager's System Supervisor/sequencer 501, and to the Memory and Data Base 504.

When the AV is transitted to the CRUISE mission state 4 804, the Navigation Plan for this mission state is transferred from the Mission Manager FPM 201, to the Navigation Manger FPM 203. Data which is also transmitted to the Navigation Manager FPM 203, on entering the cruise state, along with the Navigation Plan, include: a) mission state, i.e., CRUISE mission state, b) navigation operation mode. The Navigation Plan may include data on: a) the required navigation accuracy along the cruise route, b) scheduling of activating/utilization of navigation data sources, e.g., when and where along the cruise route, to use only INS, because a certain area is suspected as subject to GPS spoofing, and when and where to use INS and GPS, in combination, c) estimated availability and confidence of navigation data sources. The navigation operation mode determines the combination of navigation data sources and instrumentation to be used during the cruise flight, or part thereof. Examples of navigation modes, during the cruise state, may include: a) INS navigation, updated by GPS, b) INS navigation updated by a differential GPS navigation system, c) INS navigation, updated by a radio-navigation system, other than GPS, e.g., LORAN-C or OMEGA radio-navigation system, d) a stand alone INS, without any updating means, i.e., a pure dead reckoning navigation mode, e) similar to a), b), c), or d), but with an instrumentation cluster consisting of a vertical gyro, a tri-axis north-finding (magnetic) magnetometer, and an air data measurement unit, in lieu of the INS. Other configurations of navigation instruments may be used, if desirable. Based on the received data, the Navigation manager's Data Processing/Local Planner FPSM 503, plan a more detailed Navigation Plan, and send it when applicable, to the Navigation Manager's memory units 504 and 505, and via the Navigation manager's Subsystem Coordinator FPSM 502, and units 511", 511, 508, 509 and 510, to the Navigation subsystem 213, for execution. The Navigation Plan determines, by schedule, what are the navigation data sources to be used, at each segment of the cruise flight. The Navigation subsystem 213, performs the navigation functions according to the Navigation Plan, and use the appropriate processing modules, e.g., navigation calculation, Kalman-Filters, within the Navigation subsystem 213, to accommodate the available navigation data sources. Data on the Navigation Execution status, e.g., estimated navigation accuracy, along with data regarding the health status of the navigation subsystem, e.g., gyros, accelerometers, GPS receiver, is delivered to the Navigation Manager FPM 203, by the Navigation subsystem 213. If an exceptional event is recognized, by the Navigation System Monitor 506, within the Navigation Manager FPM 203, the occurrence of this event is reported to the Navigation Manager's Exceptional Event Handler FPSM 507, which activates a decision process, based on a RDT search. The responsibility of that particular Exceptional Event Handler FPSM 507, is limited to navigation related decisions only, e.g, a decision to change the mode or, to transit the state of the Navigation subsystem 213, from a current navigation state, to another navigation state. Also delivered from the Navigation subsystem 213, to the Navigation Manager FPM 203, is navigation data, which is used, during the cruise flight, by the flight and guidance subsystem. The navigation data include: a)geographic location of the AV, b) AV altitude above sea level, c) AV velocity vector, d) AV heading angle, e) AV body angles—pitch and roll angles, f) AV angular body rates, g) wind vector—direction and velocity. Further information may be used, if desirable. The following information items are sent from the Navigation Manger FPM 203, up the hierarchy, to the Mission Manager FP 201: a) navigation execution status, b) navigation subsystem health status, c) reduced set of navigation data, e.g. AV location, AV altitude, wind information. If desirable, other elements of navigation data may be sent, d) detected navigation countermeasures.

Figure 9:
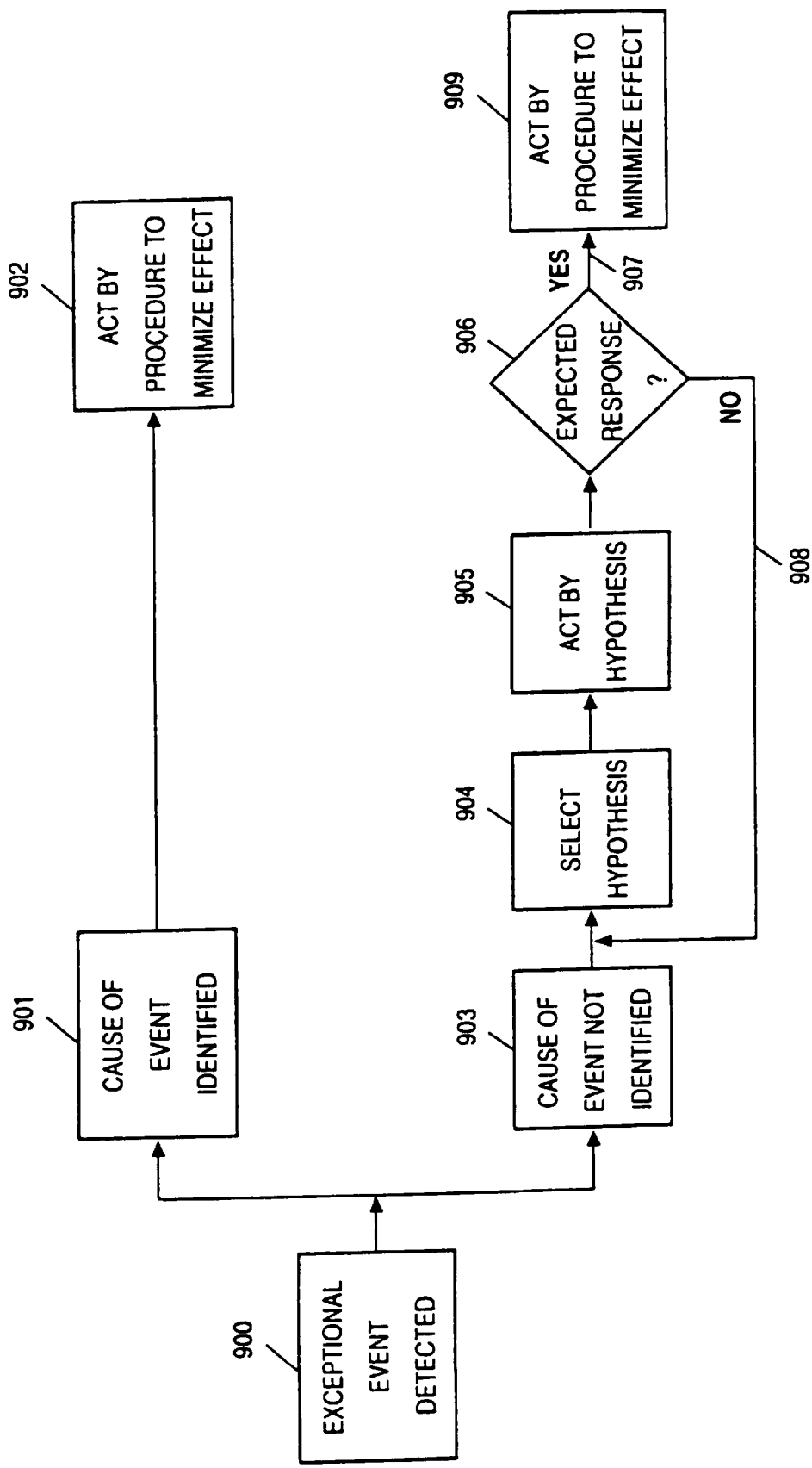
FIG. 9 is a schematic illustration of the possible categories, of exceptional event handling procedure, according to one embodiment of the invention.

FIG. 9 is a schematic illustration of the possible categories, of exceptional event handling procedure.

The responses to exceptional events, may be grouped into two categories, depending on whether the factor, or the element which cause the event has been identified, or not. In the present invention, the ability to respond to an exceptional event, is not conditioned on the identification of the cause to the exceptional event. When an exceptional event is detected, 900, two possible situations may exist:
a) the cause of the exceptional event is identified, 901, or, the cause of the exceptional event is not identified, 903. In the case of cause identification, 901, a certain action is performed, 902, according to the Response Decision Tree—RDT which is relevant to the identified cause, in order to minimize the unwanted effect. In the case where no cause of the event is identified, 903, the event handling process is more complex. A hypothesis is selected, 904, and an action is performed, 905, based on the selected hypothesis. The response to the action 905, is then examined. If the response is as was predicted, 907 namely, the hypothesis is assumed to be verified, an action 909 is taken, based on the hypothesis, in order to minimize the unwanted effect. If the response is not as was predicted, the hypothesis is false 908, and the process of hypothesis selection, 904, is iterated. The two categories of decision on responsive action are implicitly embedded within the RDTs.

FIG. 10*a–b* illustrate two typical examples of Response Decision Tree—RDT, to exceptional events. It is assumed, for the sake of clarity, that the exceptional events in the examples, occur while the AV is in the "CRUISE" mission state 804, see FIG. 8.

Figure 10:
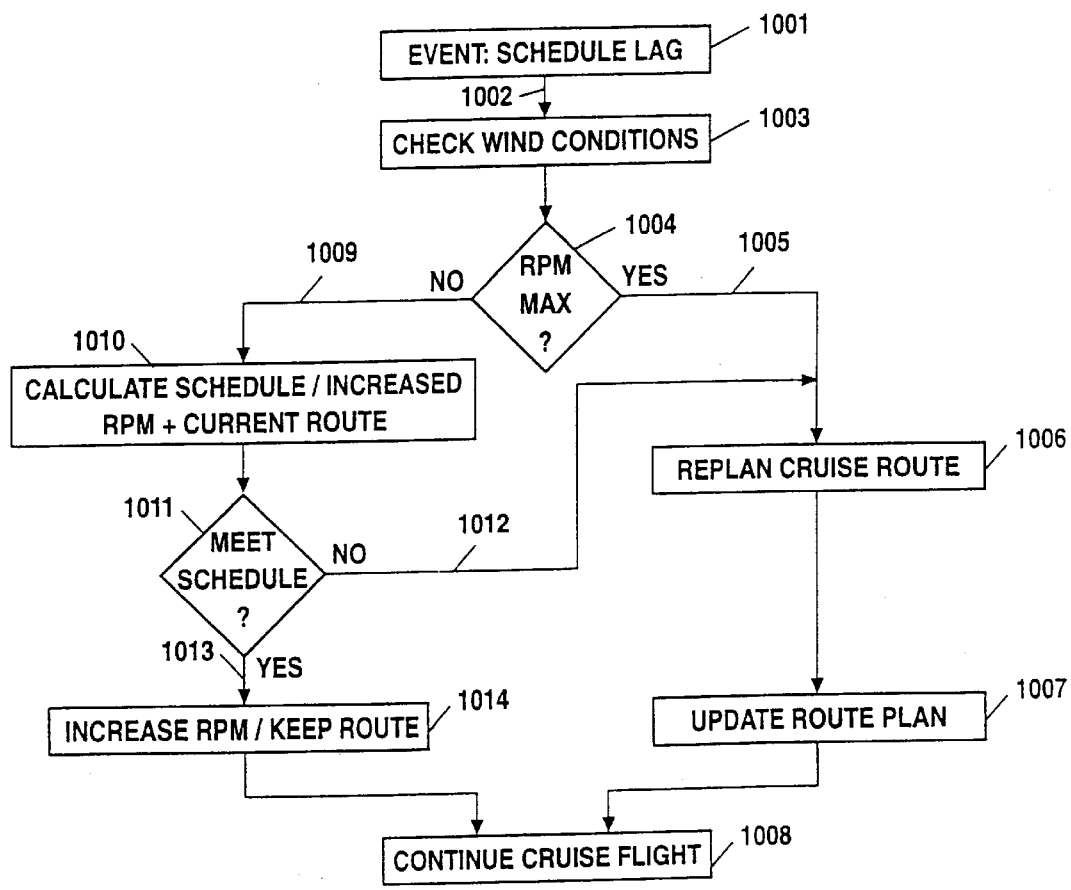
FIGS. 10a–10b show an example of two Response Decision Trees (RDT), illustrating a data flow starting at receipt of abnormal event and ending at the generation of an appropriate responsive action.
Figure 10:
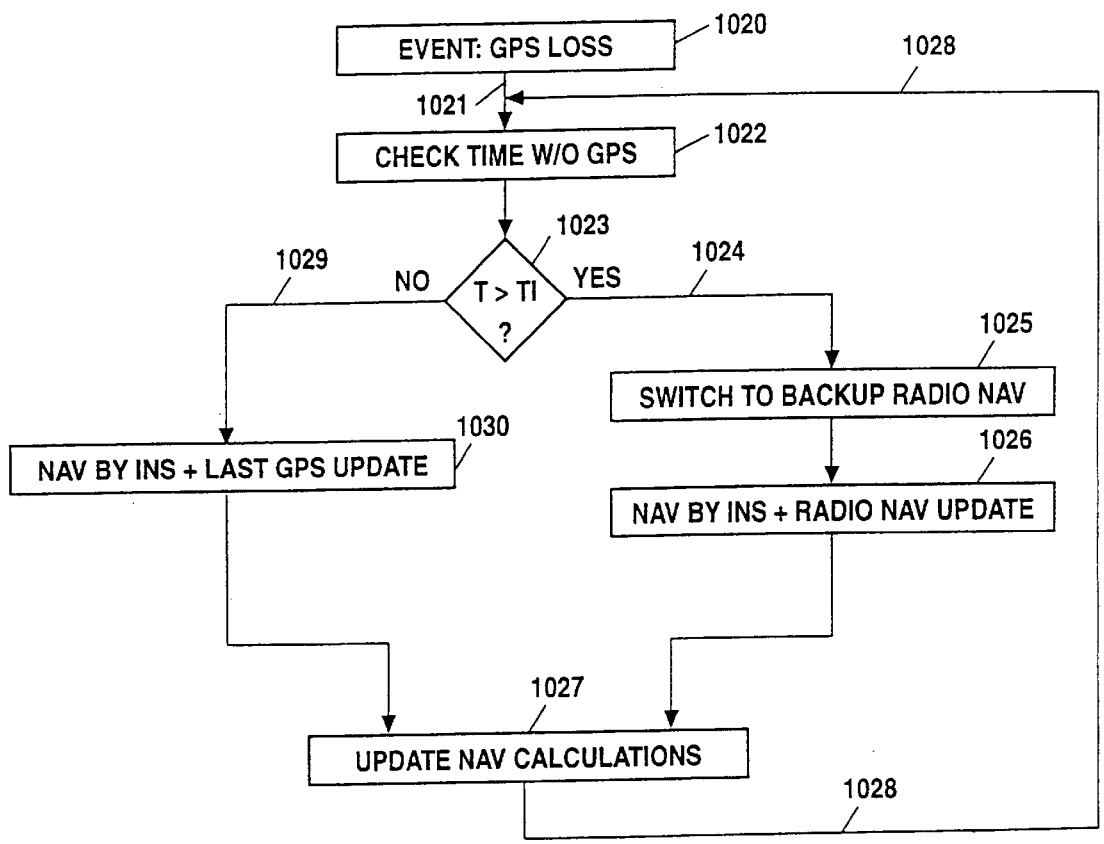

FIG. 10(*a*) is a simplified RDT to the exceptional event: "SCHEDULE_LAG". FIG. 10(*b*) is a simplified RDT to the exceptional event: "GPS_ LOSS". A typical number of RDTs for the AV may vary between 70 to 100, RDTs. In FIG. 10(*a*), the event of "SCHEDULE_LAG" 1001 is detected, by the Mission and System Monitor FPSM 703, (in FIG. 7) in the Mission Manager FPM 700. Following arrow 1002, the wind conditions, i.e., wind direction and wind speed, which are calculated by the Navigation subsystem 770, are read, 1003. Then, the engine speed, in RPM, is checked, 1004. If the RPM is at maximum, i.e. RPM=MAX RPM, then branch 1005 is followed, else, branch 1009 is followed. In the former condition, the RDT branch 1005 is followed, and the cruise route is replanned, activity 1006, by the Planner/Coordinator FPSM 704. Upon the completion of the replanning process, the route plan is updated, 1007, and the cruise flight is continued, 1008, according to the updated plan. If in checking the RPM, 1004, it is found that RPM<RPM MAX, then arrow 1009 is followed, and a calculation process 1010 is performed, in order to predict the possible schedule in case that the AV will fly in maximum RPM in the pre-determined route. The predicted schedule is then checked, 1011, and in the case that it is within the permitted limits, branch 1013 is followed, else, branch 1012 is followed. In the case that the schedule can be met by increasing the RPM to RPM MAX, branch 1013, the action 1014, to be taken is to increase the RPM to RPM MAX, and to follow the pre-determined route, i.e., to continue the cruise flight, 1008, with increased velocity. If increasing the RPM to RPM MAX is not satisfactory, for the purpose of schedule keeping, branch 1012, the cruise route has to be replanned, by process 1006, followed by 1007, and 1008.

In FIG. 10(*b*), the event of "GPS_LOSS" 1020 is detected, by the Navigation sub-system 770 and reported to the Mission and System Monitor FPSM 703, (in FIG. 7) in the Mission Manager FPM 700. Follow arrow 1021, the elapsed time T, from GPS loss is checked routinely, 1022, and compared to a threshold time T1, 1023. If the elapsed time T is greater than the threshold T1, branch 1024 is followed. Else, branch 1029 is followed. If the elapsed time T is still smaller, or equal to T1, the navigation process, which is performed by the Navigation subsystem 770, is based on information from the INS, and the most recent readings from the GPS, when it was available, 1030.

A Kalman-filter is used to combine the navigation information sources, in the best available way. The process 1030, is followed by routine updates of the navigation calculations, 1027, where the specific navigation configuration, i.e., what are the sources of the navigation information, is taken into account. After the navigation calculations are updated, 1027, the routine is iterated, following arrow 1028. Once the elapsed time T exceed T1, branch 1024 is followed, and the backup radio navigation, e.g., LORAN-C, is being active in lieu of the GPS, 1025. Then, the Navigation process performed by the Navigation subsystem 770 is based on information from the INS and from the radio navigation system, combined by a Kalman-filter 1026. Process 1026, is followed by updating the navigation calculations, 1027. The cycle which follow arrows 1028, and 1021 is iterated, unless the GPS information is recovered and available, again.

Figure 11:
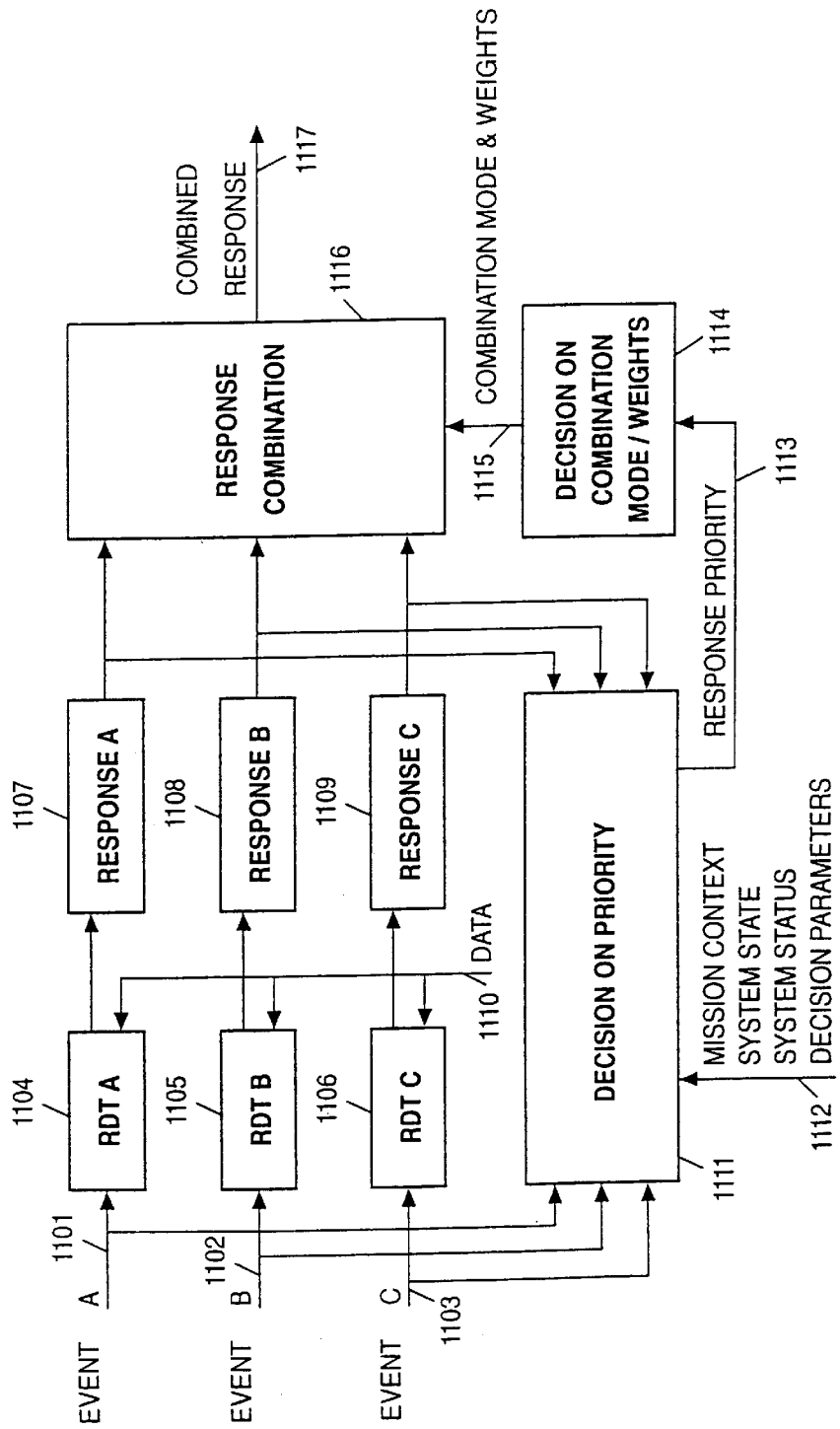
FIG. 11 is a schematic illustration of the response combination process forming part of the MM FPM of FIG. 4, according to one embodiment of the invention.

FIG. 11 is a schematic illustration of the response combination process, which is a part of the Exceptional Event Handler FPSM 705, in the Mission Manager FPM 700 of FIG. 7 (FIG. 4). For the sake of clarity, we consider, in the present example, that three exceptional events are occurred simultaneously. The Mission and System Monitor FPSM 703, detects the occurrence of Event A 1101, Event B 1102, and Event C 1103. The occurrence of the three events is reported to the Exceptional Event Handler FPSM 705. Within the Exceptional Event Handler FPSM 705, three RDTs are run concurrently, each RDT for a specified single event. RDT A 1104, is run to determine the individual Response A 1107 for the individual Event A 1101. RDT B 1105 is run to determine the individual Response B 1108 for the individual Event B 1102. RDT C 1106 is run to determine the individual Response C 1109 for the individual Event C 1103. The RDTs are fed with data 1110 which is required for the decision making, e.g., mission state, geographical location, wind conditions. The Decision on Priority FPSM 1111, determines the priority of the responses to the individual exceptional events, according to risk criteria, and to time criticality. The highest is the potential risk, or the most time critical is a certain event, the highest is the priority.

Preferably, but not necessarily, the criteria, in decreasing order of priority, are: a) time criticality or, risk of immediate mission loss. b) risk to probability of success or, risk of possible future mission loss. c) risk of performance degradation. d) risk to people or, equipment, including AV. e) save of resources. Other criteria, or criteria priority may be used, if desirable.

The inputs to the Decision on Priority FPSM 1111, include: a) indication of the exceptional events, Event A 1101, Event B 1102, Event C 1103. b) the associated individual responses, Response A 1107, Response B 1108, and Response C 1109, respectively. c) information vector 1112 which include: mission context, mission state, subsystems state and status, decision parameters. Based on the inputs, and on the decision criteria, the response priority is determined, and reported thereafter 1113 to the FPSM 1114. Special attention is given to exceptional events which are time critical, e.g., obstacle detection. According to the Response Priority 1113 information, the Decision on Combination Mode FPSM 1114 determines the Combination Mode 1115 to be used in order to generate a combined response, to the three simultaneous individual events.

As will be explained in greater detail with reference to FIG. 12, four modes of response combination are considered: a) Critical conflict mode. b) Competitive conflict mode. c) Cooperative mode. d) Complementary mode. Given the individual responses 1107, 1108, 1109, and the Combination Mode 1115, the Response Combination FPSM 1116, generate a Combined Response 1117, which is then delivered to the Mission Supervisor/Sequencer FPSM 702, and to the Planner/Coordinator FPSM 704.

Four modes of response combination, in case of concurrent exceptional events, are illustrated by FIGS. 12*a–d*.

FIG. 12(*a*): Critical conflict combination mode 1200. FIG. 12(*b*): Competitive conflict combination mode 1210. FIG. 12(*c*): Cooperative combination mode 1220. FIG. 12(*d*) Complementary combination mode 1230. For the sake of clarity, and by a way of example only, each scheme illustrate the combination of two responses only.

In FIG. 12(a), two exceptional events which occur simultaneously are considered. An "OBSTACLE_DETECTION" event, 1201, and a "THREAT_DETECTION", event, 1201. The response, 1203, to the "OBSTACLE_DETECTION" event, 1201, is to go up, i.e., to increase the flight altitude. The response, 1204, to the "THREAT_DETECTION" event, 1202, is to fly in a lower altitude. The responses are combined, 1207, according to the Combination Mode and Weights 1205, and 1206 that was determined by FPSM 1114, FIG. 11. In the present case, a Critical conflict combination mode 1200, is used, where the strategy of combination is "WINNER-TAKE-ALL". The Weight 1205, is far more dominant than the Weight 1206, since the event 1201 is time critical and very risky to the mission. In this case, the flight altitude is determined by the occurrence of event 1201 only. The Combined Response 1208 is then transmitted to the Mission Supervisor/Sequencer FPSM 702, and to the Planner/Coordinator FPSM 704. In FIG. 12(b), two exceptional events which occur simultaneously are considered. A "HIGH_FUEL_COMSUMPTION" event, 1211, and a "THREAT_DETECTION" event, 1202. The response, 1212, to the "HIGH_FUEL_CONSUMPTION" event, 1211, is to go up, i.e., to increase the flight altitude. The response, 1204, to the "THREAT_DETECTION" event, 1202, is to fly in a lower altitude. The responses are combined, 1215, according to the Combination Mode and Weights 1213, and 1214 that was determined by FPSM 1114, FIG. 11. In this case, a Competitive conflict combination mode 1210, is used, where the strategy of combination is to weight the contribution of each response, according to the relative weight. In this case, the flight altitude is determined as the weighted combination of both responses. The Combined Response 1216, which determine the flight altitude, is then transmitted to the Mission Supervisor/Sequencer FPSM 702, and to the Planner/Coordinator FPSM 704.

In FIG. 12(c), two exceptional events which occur simultaneously are considered. A "HIGH_FUEL_CONSUMPTION" event 1211 and an "ALTIMETER_FAILURE" event. The response to the latter 1221, is to go up, i.e., to increase the flight altitude, and the response, 1222, to the "ALTIMETER_FAILURE" event, 1221, is also to increase the flight altitude. The two individual responses are then combined, 1225, according to the Combination Mode and Weights 1223, and 1224 that was determined by FPSM 1114, FIG. 11. In this case, a Cooperative combination mode 1220, is used, where the strategy of combination is to weigh the contribution of each response, according to the relative weight. In this case, the flight altitude is determined as the weighted combination of both responses. The Combined Response 1226, which determine the flight altitude, is then transmitted to the Mission Supervisor/Sequencer FPSM 702, and to the Planner/Coordinator FPSM 704.

In FIG. 12(d), two exceptional events which occur simultaneously are considered. A "THREAT_DETECTION" event, 1230, and a "NAVIGATION_FAILURE" event, 1232. In the present case, the response, 1231, to the "THREAT_DETECTION" event, 1230, is to activate onboard countermeasures. The response, 1233, to the "NAVIGATION_FAILURE" event, 1232, is to increase the flight altitude. The two individual responses are exclusive to each other, and accordingly the combination 1236 process is just to add the individual responses, according to the Combination Mode and Weights 1234, and 1235 that were determined by FPSM 1114, FIG. 11. In this case, a Complementary combination mode 1230, is used, where the strategy of combination is to add the two responses. The Combined Response 1237, which determined the operations to be taken, is then transmitted to the Mission Supervisor/Sequencer FPSM 702, and to the Planner/Coordinator FPSM 704.

Figure 13:
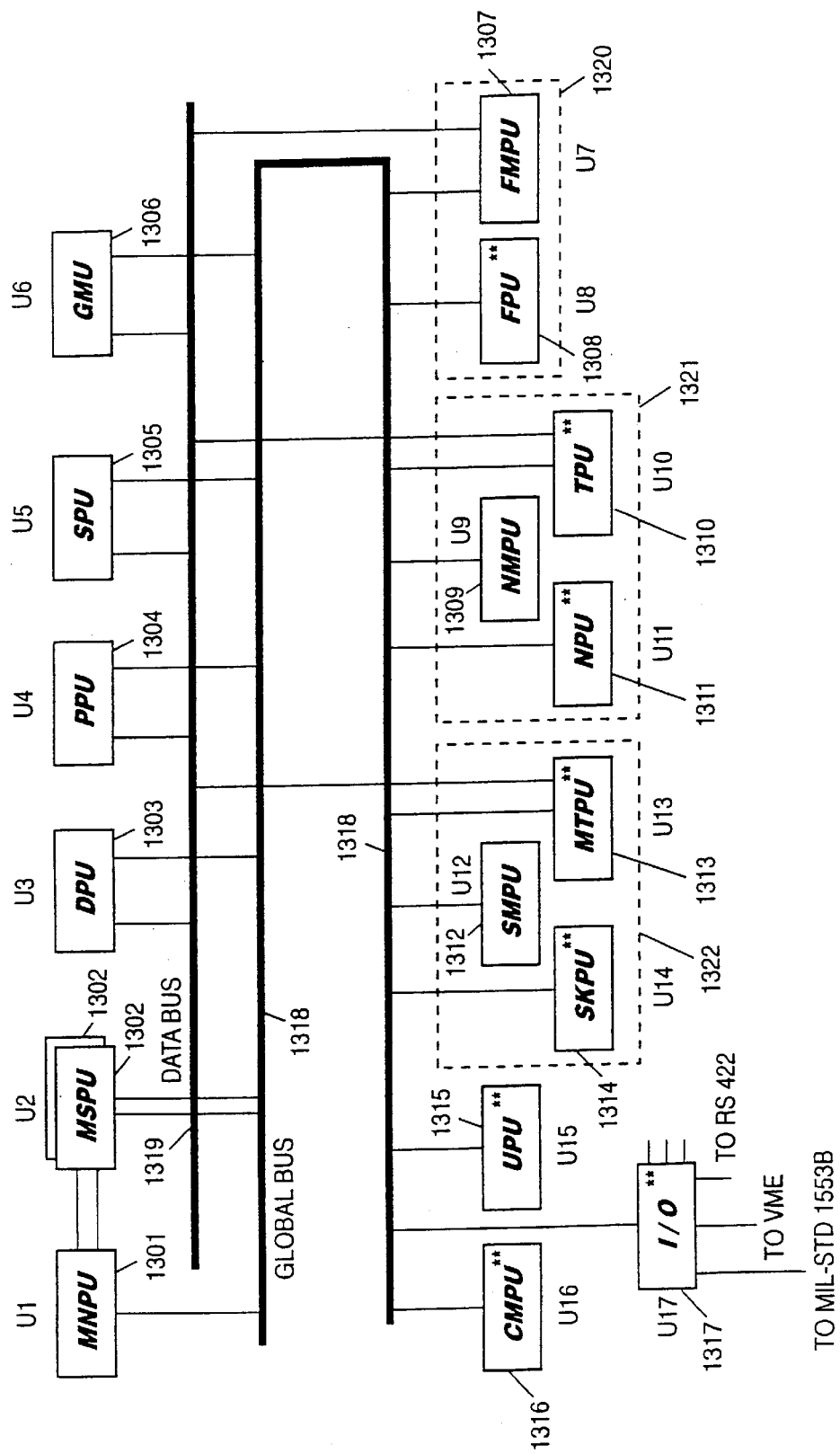
FIG. 13 is a schematic illustration of the AMC computer architecture, according to one embodiment of the invention.

FIG. 13 illustrates a typical architecture of the AMC computer system. The need to achieve high level of architecture flexibility, and to allocate variety of FPMs and FPSMs to hardware units, calls for an architecture which includes heterogenous computing means, e.g., a combination of general purpose CISC microprocessors, RISC type microprocessors, DSP type microprocessors and microcontrollers. It should be noted, however, that the hardware realization that is shown in FIG. 13, is only one of many possible variants, and accordingly the actual hardware realization depends upon the particular application.

The architecture shown in FIG. 13 consists of seventeen units, designated U1 through U17. If desirable, the number of units may be greater or, smaller. The architecture comprise of two buses—a Global Bus 1318, (210 in FIG. 2) which connects all the units, and a fast Data Bus 1319, (211 in FIG. 2) which connect only some of the units. The Global Bus 1318 may be a standard serial bus, e.g. a MIL-STD, 1553B standard bus, for control and low volume data transfer between all units, where the Data Bus 1319, may be a standard fast parallel bus, e.g. a VME bus, for high data rate. If desirable, additional units may be connected or, disconnected to and from the buses, respectively.

The AV sub-systems may be connected to the buses 1318 and 1319, via an interface. If desirable, only one bus may be used for the functions of the global bus and the data bus, or, more than two buses may be used. Also, if desirable, other types of buses, or bus standards may be used.

Unit U2 1302 is the host processor, usually of the CISC type, which accommodates two identical processors. In a nominal operation, one is operating and one is in a stand-by position, as a back-up. The operation of unit U2 is monitored by unit U1 1301, which may be implemented by a microcontroller. If the operating processor of unit U2 1302 is failed, U1 1301 activates the other unit, and switched between the two units for replacing, functionally, the failed unit by the back-up one. Unit U3 1303 is a decision processing unit, which performs, mainly, integer or, fixed point mathematical operations. It may use either a CISC type or a DSP type processor. Unit U4 1304 is the planning processing unit, it executes massive calculations, and performs a combination of both fixed-point and floating point calculations. A RISC type processor is preferably utilized for this unit.

Unit U5 1305 is the simulation processing unit. It performs real-time simulations and performance prediction. It also performs both fixed-point and floating point calculations. A RISC type processor is preferably utilized for this unit. Unit U6 1306 is the global memory and DB memory unit.

Units U1 1301, U2 1302, U3 1303, U4 1304, and U5 1305, execute the FPSMs of the Mission Manager FPM 201 in FIG. 2. The flight related processing units 1320, includes of two units. Unit U7 1307 is the Flight Manager processing unit, which perform the FPSMs of the Flight Manager FPM 202 in FIG. 2. A RISC type processor is preferably utilized for this unit.

Unit U8 1308 is the Flight processing unit which performs the guidance and control FPSMs 762, 764 and partly, 766 in FIG. 7. A CISC type processor may be appropriate for this unit.

The Navigation related processing units 1321, includes three units. Unit U9 1309 is the Navigation Manager processing unit, which perform the FPSMs of the Navigation Manager FPM 203 in FIG. 2. A CISC type processor may be appropriate for this unit. Unit U10 1310 is the Terrain Navigation processing unit, which perform Terrain Reference Navigation, when desirable. A CISC type processor may be appropriate for this unit and unit U11 1311 is the Navigation processing unit, which performs all the navigation calculations which support the Navigation subsystem 770 in FIG. 7, or 213 in FIG. 2. A CISC type processor may be appropriate for this unit.

The Sensor related processing units 1322, also includes three units, i.e. unit U12 1312 is the Sensor Manager processing unit, which performs the FPSMs of the Sensor Manager FPM 204 in FIG. 2. A CISC type processor may be appropriate for this unit; unit U13 1313 is the Matching process unit, which is dedicated to signal processing and pattern matching and recognition procedures. This unit may employ a DSP processor, and Unit u14 1314 is the Seeker processing unit which performs all the seeker low level signal handling and enhancement algorithms, as well as the seeker servo and control functions. A RISC type processor may be appropriate for this unit.

Unit U15 1315 is the Utility processing unit. It performs the FPSMs of the Payload Manager FPM 205 and the Auxiliary Systems Manager FPM 207, in FIG. 2. The implementation of this processing unit may be based on a micro-controller. Unit U16 1316 is the Communication Manager processing unit which performs the FPSMs of the Communication Manager FPM 206 in FIG. 2. The implementation of this processing unit may also be based on a micro-controller, or on dedicated communication processor.

If desirable, one processing unit may comprise of more than one physical processor. Also, one processing unit may optionally execute more than one FPM or FPSM, or, a FPM or a FPSM may be executed by more than one processing unit.

Unit U17 1317 is an Input/Output (I/O) controller, which provides data communication interface to external data links, e.g. RS-422 serial link, MIL-STD 1553B avionics serial bus, and VME parallel bus. The Global Bus 1318 connects all the units, U1 through U17. The Data Bus 1319 connects units U3 1303, U4 1304, U5 1305, U6 1306, U7 1307, U10 1310 and, U13 1313. If desirable, other computer architectures may be implemented and/or other types of processors may be used, in lieu of the processor types which were mentioned above.

Figure 14:
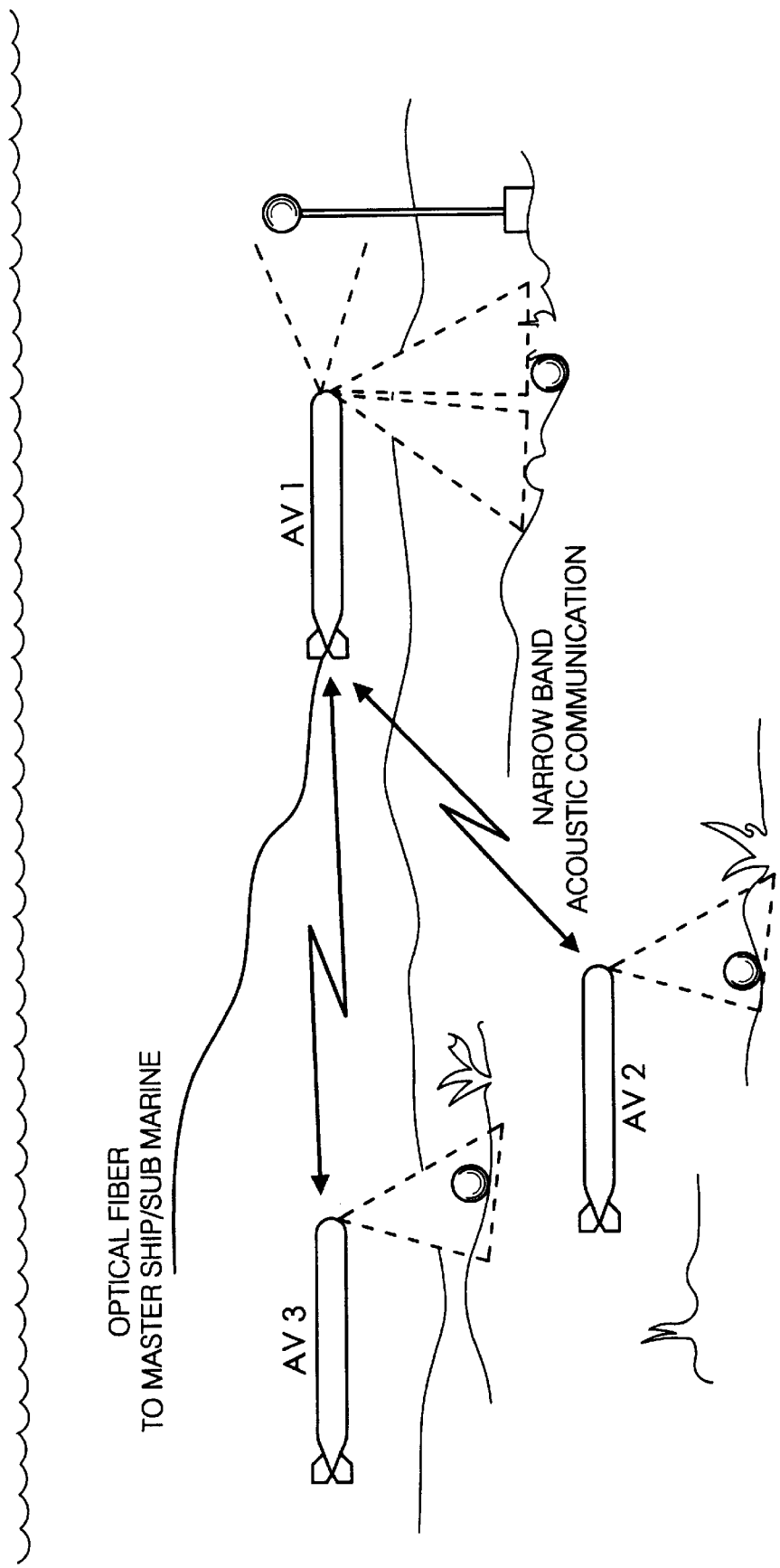
FIG. 14 is a schematic view of an underwater application of Underwater AVs which utilized embedded AMC onboard.

FIG. 14 illustrates a fleet of Autonomous Underwater Vehicles—AUVs, in a Mine Clearing application. Each AUV use an AMC onboard.

Figure 15:
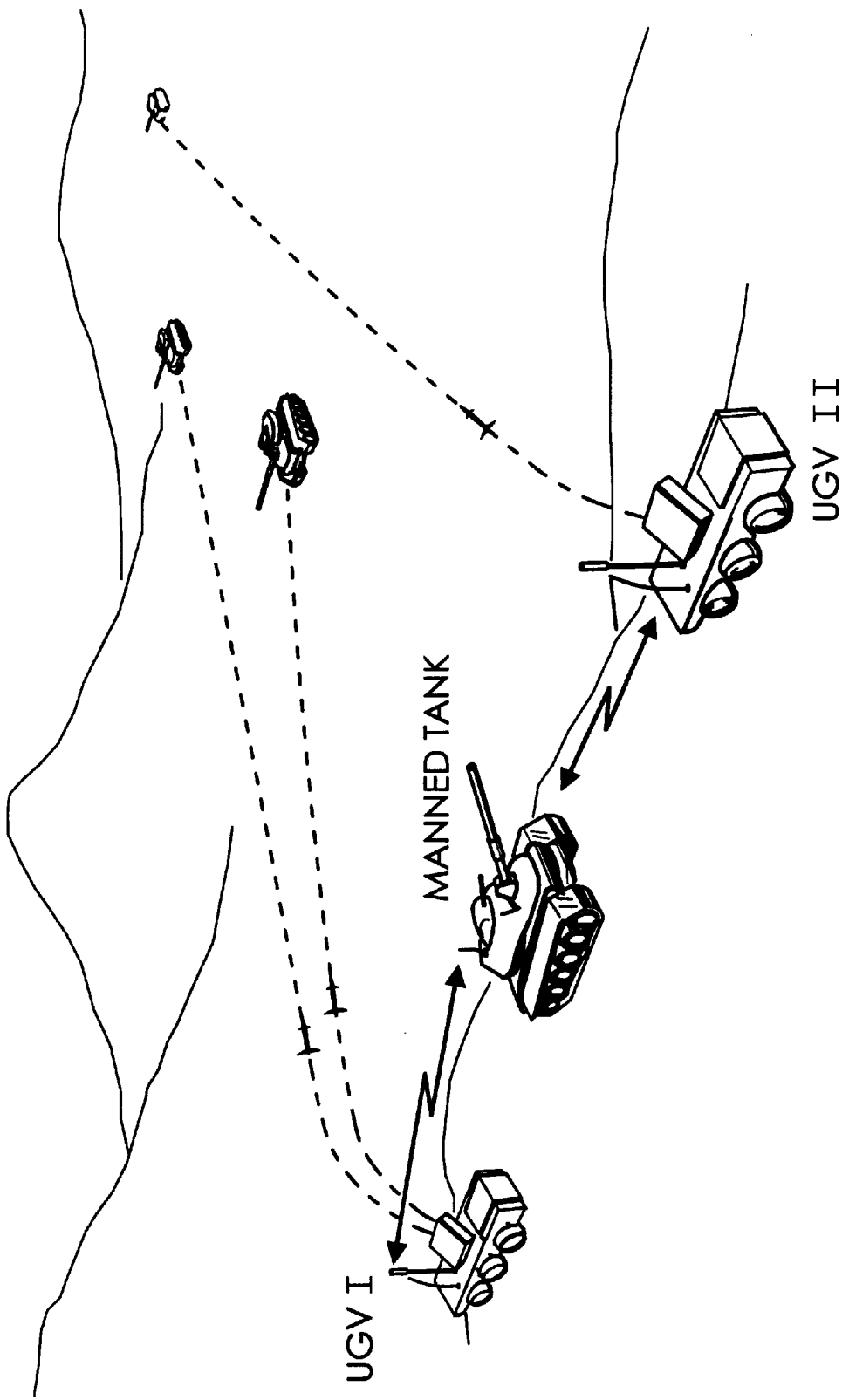
FIG. 15 is a schematic view of a ground application of ground AVs which utilized embedded AMC onboard.

FIG. 15 illustrates a land warfare application, where each of the Unmanned Ground Vehicles, uses an AMC onboard.

Figure 16:
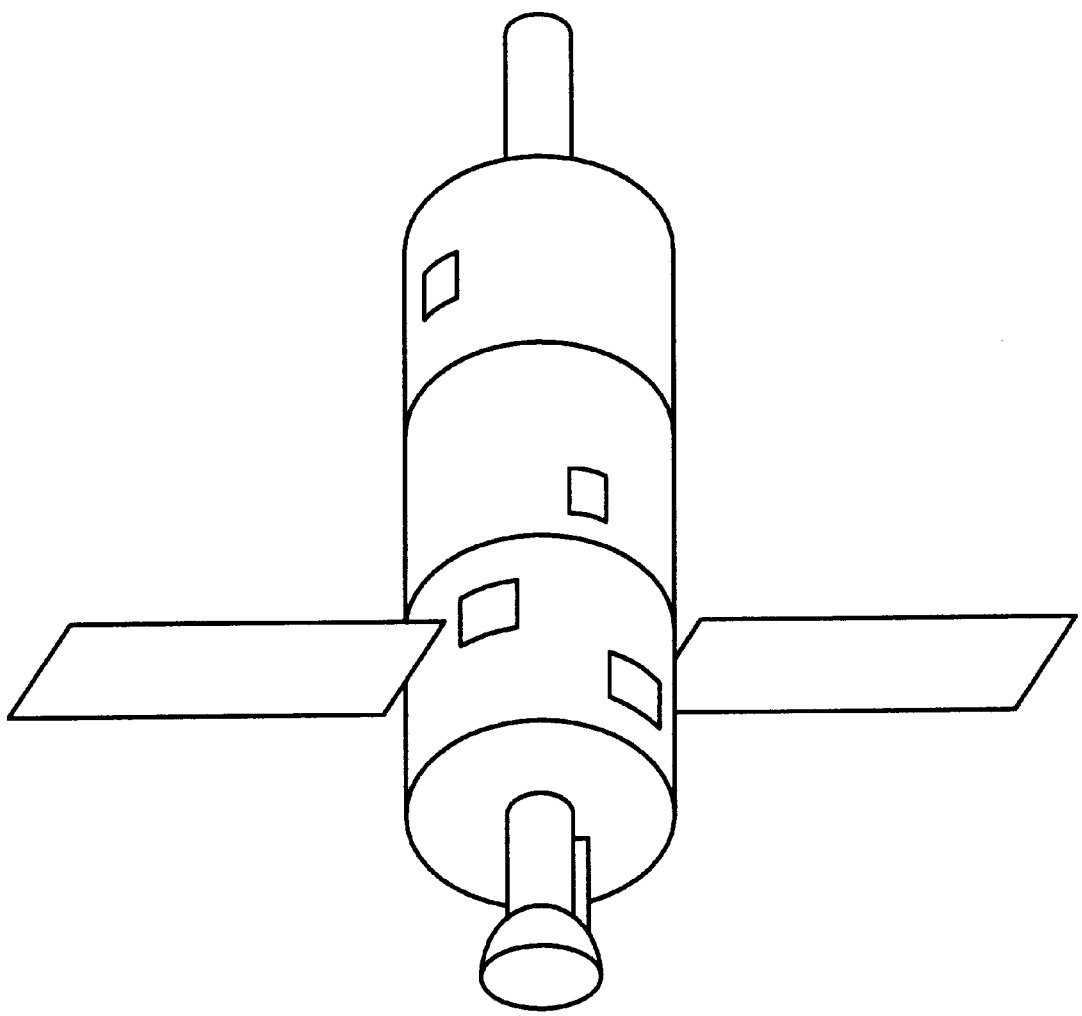
FIG. 16 is a schematic view of a space application of AV which utilized embedded AMC onboard.

FIG. 16 illustrates schematically a space application of AV which utilized embedded AMC onboard.

The present invention has been described with a certain degree of particularity but it should be understood that various modifications and alteration may be made without departing from the scope or spirit of the invention as defined by the following claims:

What is claimed is:

1. In a vehicle designed for the execution of a mission, a programmable decision unit for managing and controlling the execution of the mission by utilizing a plurality of subsystems and database means for holding and managing data including pre-stored data and data acquired by and received from said plurality of subsystems, which programmable decision unit comprises a mission plan (MP), for accomplishing the execution of said mission that utilizes said database, the MP comprising:

(a) a plurality of states each being a mission state representing a mission segment to be executed by at least one of the subsystems and including mission states that are defined as "mission start", "mission complete" and "mission failed"; and (b) a plurality of arcs linking said states and each signifying transition conditions between two mission states which it links;

the operation of managing and controlling the execution of the mission includes a succession of iterations that include each:

(i) assignment of a mission segment associated with a current mission state to at least one of said subsystems;

(ii) receipt from the subsystems of report data which include data indicative of the execution status of said mission segment by said at least one subsystem;

(iii) evaluation of said report data for determining at least either of normal behavior and exceptional event; and (iii.1) in response to normal behavior, either staying in current mission state of the MP or transiting from the current mission state of the MP to another in the case that said report data, or portion thereof, satisfy said transition conditions; or (iii.2) in response to exceptional event eliciting a responsive action in order to accomplish the execution of said mission;

said programmable decision unit manages and controls the execution of said mission in essentially autonomous fashion.

2. The decision unit according to claim 1, being capable of classifying said exceptional event as belonging to a first group, constituting a replanning group, or a second group, constituting non-replanning group, and in response to a first group classification, said decision unit activates an associated planner module, for short time, while-on-mission, modifications of said mission plan either partially or in its entirety.

3. The decision unit according to claim 2, wherein said responsive action being one of the following a to h options:

a) no change at all, keep executing said MP, no change of mission state;

b) make a minor modification in the MP, or a parameter thereof with no change of mission state, then update the database and execute the modified MP;

c) transit the mission state to a new mission state of the MP, not according to a regular transition sequence; then execute the MP, while being at the new mission state;

d) select a new MP out of the bank of pre-stored MP according to a selection criteria, then update the database, and execute the new selected MP;

e) select and combine pre-stored MPs, or pre-stored MP segments thereof, into a new combined MP, then, update the database and execute the combined MP;

f) re-plan an alternative MP or segments thereof by utilizing said planner module; then update the database and execute the replanned MP;

g) reconfigure the AV either by replacing an inoperative device or module in a subsystem, by an identical backup device, or activate other modules in the subsystem; then continue according to the MP; and h) select a crisis recovery MP, out of a bank of pre-stored crisis recovery MPs according to selection criteria; then update the database and execute the selected crisis recovery MP.

4. The decision unit according to claim 1, wherein said MP is downloaded, in its entirety, to said database prior to departure to said mission.

5. The decision unit according to claim 2, wherein said portion of said MP is downloaded prior to departure to said mission whereas the remaining portion thereof is planned by said planner module while-on-mission.

6. The decision unit according to claim 2, wherein said planner module employs at least one of the following techniques: dynamic programming Dijkstra, neural network, genetic algorithm, linear programming, gradient search, Newton search, heuristic, simulated annealing, integral equations, differential equations, difference equations, fuzzy models, random search, learning techniques non-linear programming, digital filters, continuous time filters, A*, unimodel search and multi-model search.

7. The decision unit according to claim 2, wherein said planner module generates at least two MPs having each a plan score assigned thereto in accordance with predetermined criteria; said planner module selects the MP having the highest score.

8. The decision unit according to claim 7, wherein said planner module further comprising a simulator sub-module for simulating the operation of each one the at least two MPs for assigning thereto said score.

9. The decision unit according to claim 8, wherein said simulator module employs at least one of the following techniques: dynamic programming, Dijkstra, neural network, genetic algorithm, linear programming, gradient search, Newton search, heuristic, simulated annealing, integral equations, differential equations, difference equations, fuzzy models, random search, learning techniques non-linear programming, digital filters, continuous time filters and A*.

10. The decision unit according to claim 1, wherein said decision unit is responsive to, essentially simultaneous at least two of said events, for generating a combined response.

11. The decision unit according to claim 10, wherein said combined response is dependent upon at least one of the following factors: the degree of the abnormal event, the system state, the mission context, the sub-system status, risk to mission accomplishment and the priority of responses.

12. The decision unit according to claim 10, wherein said combined response follows one of the following four modes:
 a) critical conflict mode; b) competitive conflict mode; c) cooperative mode; and d) complementary mode.

13. The decision unit according to claim 1, wherein said MP has at least two "mission complete" states.

14. The decision unit according to claim 1, wherein said MP has at least two "mission fail" states.

15. The decision unit according to claim 1, wherein said report data is received by employing either or both of polling and interrupt techniques.

16. The decision unit according to claim 1, functionally organized in a multi-level hierarchy.

17. An autonomous vehicle (AV) having a decision unit as defined in claim 1.

18. The AV according to claim 17, selected from the group of air AV, space AV, ground AV, underground AV, sea AV, underwater AV and autonomous missile.

19. A system comprising a fleet of AV's for accomplishing a common mission, wherein each AV is as defined in claim 17.

20. A system according to claim 19, in which at least two of said AVs are adapted to operate in a cooperative mode of operation for accomplishing said common mission.

21. A system according to claim 19 comprising a fleet of Autonomous Underwater Vehicles—AUVs for a Mine Clearing application.

22. A system according to claim 19 comprising a fleet of air AVs for intercepting tactical ballistic missiles over enemy territory.

23. A system according to claim 19 comprising a fleet of UGVs for warfare application.

24. The decision unit according to claim 1, wherein said portion of said MP is downloaded prior to departure to said mission whereas the remaining portion thereof is planned by said planner module while-on-mission.

25. In an autonomous vehicle (AV) designed for the execution of a mission, and having an autonomous programmable decision unit for managing and controlling the execution of the mission by utilizing a plurality of subsystems and database means for holding and managing data including pre-stored data and data acquired by and received from said plurality of subsystems, said autonomous programmable decision unit being functionally organized in a three-level hierarchy architecture of a top level, an intermediate level and a leaf level;

said top level having a mission manager (MM) comprising a mission manager mission plan (MM MP) for accomplishing the execution of said mission that utilizes said database; said MP graph consisting of a plurality of states each being a mission manager's mission state (MM MS) and including MM MS that are defined as "mission start", "mission complete" and "mission failed"; and a plurality of arcs linking said states each signifying transition conditions between two Mm MSs which it links;

said intermediate level comprising a plurality of system managers (SM), subordinated to said MM, and comprising each a system manager's operational plan (SOP) that utilizes said database;

said leaf level comprising a plurality of subsystems each subordinated to one only of said SM's;

each MM MS representing a MM mission segment, to be assigned to at least one of the SMs, in terms of at least one essentially functionally defined task and its associated constraints and parameters; the SOP of each SM determining an SOP mission segment for assignment to and execution by the subsystem subordinated thereto in terms of detailed design of said essentially functionally defined task;

the operation of managing and controlling the execution of the mission including a succession of iterations that include each:
 (i) assignment of an MM mission segment associated with a current MM MS via said at least one SM to said at least one subsystem;
 (ii) receipt by each one of said at least one SM from its subordinated subsystem intermediate level report data which include data indicative of the execution status of said SOP mission segment by said subsystem;
 (iii) receipt by said MM from the SMs top level report data which include data indicative of the execution status of said MM mission segment by said at least one sub system;
 (iv) evaluation of said top level report data for determining either of normal behavior and an exceptional event; and
  (iv.1) in response to normal behavior either staying in current MM MS or transiting from the current MM MS to another in the case that said top level report data, or portion thereof, satisfy said transition conditions; or (iv.2) in response to exceptional event eliciting a responsive action from the MM in order to accomplish the execution of said mission.

26. A decision unit according to claim 25, wherein at least one of said SOP graphs consisting of a plurality of states each being an SM task state (SM TS) and including SM TS that are defined as "task start", "task complete" and "task failed"; and a plurality of arcs linking said states and each signifying transition conditions between two SM TS which it links, and wherein said SM:

(ii.1) evaluates of said intermediate level report data for determining either of normal behavior and an exceptional event; and (ii.11) in response to normal behavior either staying in current SM TS or transiting from the current SM TS to a next one in the case that said intermediate level report data, or portion thereof, satisfy said transition conditions; or (ii.12) in response to an exceptional event eliciting a responsive action from the SM.

27. The decision unit according to claim 25, wherein said task parameters include operation mode, operation data and timing and synchronization data for the execution of said task or task portion.

28. The decision unit according to claim 25, wherein said MM classifies said exceptional event as belonging to a first group, constituting a replanning group, or a second group constituting non-replanning group, and in response to a first group classification, said MM activates an associated planner module for short time while-on-mission, modifications of said MM MP either partially or in its entirety.

29. The decision unit according to claim 28, wherein said responsive action of the MM being one of the following a to h options:

a) no change at all, keep executing said MM MP, no change of MM mission state;

b) make a minor modification in the MM MP, or a parameter thereof with no change of MM mission state, then update the database and execute the modified MM MP;

c) transit the mission state to a new mission state of the MM MP, not according to a regular transition sequence; then execute the MM MP, while being at the new mission state;

d) select a new MM MP out of a bank of pre-stored MM MP according to a selection criteria; then update the database, and execute the new selected MM MP;

e) select and combine pre-stored MM MPs, or pre-stored MM MP segments thereof, into a new combined MM MP; then, update the database and execute the combined MM MP;

f) re-plan an alternative MM MP or segments thereof by utilizing said planner module; then update the database and execute the replanned MM MP;

g) reconfigure the AV either by replacing an inoperative device or module in a subsystem, by an identical backup device, or activate other modules in the subsystem; then continue according to the MM MP; and h) select a crisis recovery MM MP, out of a bank of pre-stored crisis recovery MM MPs according to selection criteria; then update the database and execute the selected crisis recovery MM MP.

30. The AV according to claim 25, wherein said MM comprising the following sub-modules, in combination:

a) Mission Supervisor/Sequencer FPSM,
b) System Managers Coordinator FPSM,
c) Mission & System Monitor FPSM,
d) Context/Situation Reasoner FPSM,
e) Exceptional Event Handler FPSM,
f) Global Planner/Coordinator FPSM,
g) Cooperation Coordinator FPSM,
h) Simulator/Evaluator FPSM,
i) Memory and Data Base FPSM,
j) Active Plan Memory FPSM,
k) Data Organizer FPSM; and
l) Communication/Interface FPSM.

31. The AV according to claim 28, wherein said planner module comprising, in combination:

a) Planning manager FPSM,
b) Requirements Definition FPSM,
c) Procedure Selector FPSM,
d) Plan Generator FPSM,
e) Optimizer FPSM 417; and
f) Plan Selector FPSM.

32. The AV according to claim 28, wherein said planner module is responsive to a plan command which includes the following parameters:

a) plan type,
b) planning initialization and synchronization parameters,
c) time to complete plan; and
d) operation mode—individual or, cooperative.

33. An AV having a decision unit according to claim 25, comprising the following six SMs:

a) Flight Manager (FM), b) Navigation Manager (NM), c) Sensor Manager (SNM), d) Payload Manager (PM), e) Communication Manager (CM), and, f) Auxiliary Systems Manager (ASM); said AV further comprising the following six subsystems, respectively subordinated to said six SMs: a) Flight and Guidance Systems, b) Navigation System, c) Sensor System, d) Payload System, e) Communication System, and, f) Auxiliary Systems.

34. An AV according to claim 25, wherein said MM:

a) initializes the AV operation,
b) executes AV mission management and sequencing, according to said Mission Manager Mission Plan—MM MP,
c) monitors the mission executing status, and subsystems health,
d) analyzes the mission context and situation,
e) executes global MP planning, plan adjustment, and replanning,
f) generates and assigns tasks for assignment to the SMs,
g) plans evaluation and simulation,
h) makes decisions on responsive action in case of exceptional event or failure,
i) responds in combination if multiple exceptional events occur simultaneously; and
j) coordinates the AV operation in cooperative operation mode.

35. An AV according to claim 33, wherein said FM does:

a) initializing of the operation of the Flight and Guidance System,
b) Flight and Guidance System management and sequencing, following the mission and flight plan—SOP, c) planning and generate of detailed local Trajectory Plan—TP, according to the mission plan, where the TP has to be executed by the guidance and flight control subsystems,
d) generate commands including operation (flight) mode,
e) monitoring the flight execution status, and the Flight and Guidance System health status,
f) report the flight execution status, and the Flight and Guidance sub-subsystems health status to MM
g) makes decisions on responsive action to exceptional events which are related to flight and guidance, and to Flight and Guidance System failures,
h) report to the MM on exceptional events; and
i) runs BIT procedure of Flight and Guidance subsystems.

36. An AV according to claim 33, wherein said NM does:
a) initializing of the operation of the Navigation System,
b) calibration and alignment of the Navigation System,
c) Navigation System management and sequencing, following the navigation plan—SOP,
d) updates to the navigation plan,
c) generate commands including operation (navigation) mode
f) monitoring of the navigation execution status, and the Navigation System health status,
g) report the navigation execution status, and the Navigation sub-systems health status to MM,
h) make decision on responsive action to exceptional events which are related to navigation performance, and to Navigation System failures,
i) control the distribution of the processed navigation data to the user FPMs,
j) perform high level data processing, data association and data fusion functions, on data which is received from Navigation sub-systems, and/or from the Global Memory and Data Base,
k) report to the MM on exceptional events and
l) run BIT procedure of Navigation sub-systems.

37. An AV according to claim 33, wherein said SNM does:
a) initializing of the operation of the Sensor System,
b) initialization of the calibration of the Sensor System,
c) Sensor System management and sequencing, following the sensing plan—SOP,
d) updates to the sensing plan to cope with actual situation,
e) generate commands including operation (search and sensing) mode,
f) monitoring of the sensing execution status, and the Sensor System health status,
g) reports of the sensing execution status, and the Sensor sub-systems health status to MM,
h) decision on responsive action to exceptional events which are related to sensor performance, and to Sensor System failures,
i) control the distribution of the sensor processed data to all the user FPMs,
j) perform high level data processing, data association and data fusion functions, on data which is received from Sensor sub-systems, and/or from the Global Memory and Data Base—GMDB,
k) report the MM on exceptional events; and
l) run BIT procedure of Sensor sub-systems.

38. An AV according to claim 33, wherein said Payload Manager does:
a) initializing of the operation of the Payload System,
b) initiate the calibration of the Payload System,
c) Payload System management and sequencing, following the payload operation plan—SOP,
d) update the payload operating plan to cope with the actual situation,
e) generate and transmit commands including payload operation mode and operation data/parameters to payload sub-system,
f) monitoring the payload operation execution status, and the Payload System health status,
g) report the payload execution status, and the Payload sub-systems health status to MM,
h) decision on responsive action to exceptional events which are related to payload performance, and to Payload System failures,
i) control the distribution of the payload processed data to all the user FPMs,
j) perform high level data processing, data association and data fusion functions, on data which is received from payload sub-systems, and/or from the Global Memory and Data Base—GMDB,
k) report the MM on excepted events; and
l) run BIT procedure of Payload sub-systems.

39. An AV according to claim 33, wherein said CM does:
a) initializing of the operation of the Communication System,
b) Communication System management and sequencing, following the communication plan—SOP,
c) update the communication plan to cope with the actual situation,
d) organize the in-coming and the out-going transmissions, according to protocols,
e) monitoring of the communication execution status, and the Communication System health status,
f) report the communication execution status, and the Communication System health status to MM,
g) decision on responsive action to exceptional events which are related to communication performance, and to Communication System failures,
h) report the MM on exceptional events; and
i) run BIT procedure of Communication System.

40. An AV according to claim 33, wherein said ASM does:
a) initializing of the operation of the Auxiliary Systems,
b) Auxiliary Systems management and sequencing, following the auxiliary systems operation plan—SOP,
c) update the auxiliary systems operating plan to cope with the actual situation,
d) generate and transmit commands including operation mode, and operation data parameters to auxiliary systems,
e) monitoring of the auxiliary systems operation execution status, the resource level, and the Auxiliary Systems health status,
f) report the auxiliary systems execution status, the resource level, and the Auxiliary Systems health status to MM,
g) decision on responsive action to exceptional events which are related to auxiliary systems performance, and to Auxiliary Systems failures, h) report the MM on exceptional events; and i) run BIT procedure of Auxiliary sub-systems.

41. The decision unit according to claim 25, wherein said SM classifies said exceptional event as belonging to a first group, constituting a replanning group, or a second group, constituting non-replanning group, and in response to a first group classification, said SM activates an associated planner module, for short time, while-on-mission, modifications of said SOP either partially or in its entirety.

42. The decision unit according to claim 41, wherein said responsive action of the SM being one of the following a to h options:

a) no change at all, keep executing said SOP, no change of SM task state;

b) make a minor modification in the SOP, or a parameter thereof with no change of SOP task state, then update the database and execute the modified SOP;

c) transit the task state to a new task state of the SOP, not according to a regular transition sequence; then execute the SOP, while being at the new task state;

d) select a new SOP out of a bank of pre-stored SOPs according to a selection criteria; then update the database, and execute the new selected SOP;

e) select and combine pre-stored SOPs, or pre-stored SOPs segments thereof, into a new combined SOP; then, update the database and execute the combined SOP;

f) re-plan an alternative SM SOP or segments thereof by utilizing said planner module; then update the database and execute the replanned SOP;

g) reconfigure the AV either by replacing an inoperative device or module in a subsystem, by an identical backup device, or activate other modules in the subsystem; then continue according to the SOP; and h) select a crisis recovery SOP, out of a bank of pre-stored crisis recovery SOPs according to selection criteria; then update the database and execute the selected crisis recovery SOP.

43. The decision unit according to claim 25, functionally organized in a multi-level hierarchy.

44. In a vehicle designed for the execution of a mission, a programmable decision unit for managing and controlling the execution of the mission by utilizing a plurality of subsystems and database means for holding and managing data including pre-stored data and data acquired by and received from said plurality of subsystems, which programmable decision unit comprises a mission plan (MP), for accomplishing the execution of said mission, comprising:

(a) a plurality of states each being a mission state representing a mission segment to be executed by at least one of the subsystems and including mission states that are defined as "mission start", "mission complete" and "mission failed"; and (b) a plurality of arcs linking said states and each signifying transition conditions between two mission states which it links;

the operation of managing and controlling the execution of the mission includes a succession of iterations that include each:

(i) assignment of a mission segment associated with a current mission state to at least one of said subsystems;

(ii) receipt from the subsystems of report data which include data indicative of the execution status of said mission segment by said at least one subsystem;

(iii) evaluation of said report data for determining at least either of normal behavior and exceptional event; and (iii.1) in response to normal behavior, either staying in current mission state of the MP or transiting from the current mission state of the MP to another in the case that said report data, or portion thereof, satisfy and transition conditions; or (iii.2) in response to exceptional even eliciting a responsive action in order to accomplish the execution of said mission.

45. The decision unit according to claim 44, being capable of classifying said exceptional event as belonging to a first group, constituting a replanning group, or a second group, constituting non-replanning group, and in response to a first group classification, said decision unit is capable of activating an associated planner module, for short time, while-on-mission, modifications of said mission plan either partially or in its entirety.

46. The decision unit according to claim 45, wherein said responsive action being one of the following a to h options:

a) no change at all, keep executing said MP, no change of mission state;

b) make a minor modification in the MP, or a parameter thereof with no change of mission state, then update the database and execute the modified MP;

c) transit the mission state to a new mission state of the MP, not according to a regular transition sequence; then execute the MP, while being at the new mission state;

d) select a new MP out of a bank of pre-stored MP according to a selection criteria; then update the database, and execute the new selected MP;

e) select and combine pre-stored MPs, or pre-stored MP segments thereof, into a new combined MP; then, update the database and execute the combined MP;

f) re-plan an alternative MP or segments thereof by utilizing said planner module; then update the database and execute the replanned MP;

g) reconfigure the AV either by replacing an inoperative device or module in a subsystem, by an identical backup device, or activate other modules in the subsystem; then continue according to the MP; and h) select a crisis recovery MP, out of a bank of pre-stored crisis recovery MPs according to selection criteria; then updated the database and execute the selected crisis recovery MP.

47. The decision unit according to claim 44, wherein said MP is downloaded, in its entirety, to said database prior to departure to said mission.

48. The decision unit according to claim 45, wherein said portion of said MP is downloaded prior to departure to said mission whereas the remaining portion thereof is planned by said planner module while-on-mission.

49. The decision unit according to claim 45, wherein said planner module employs at least one of the following techniques: dynamic programming, Dijkstra, neural network, genetic algorithm, linear programming, gradient search, Newton search, heuristic, simulated annealing, integral equations, differential equations, difference equations, fuzzy models, random search, learning techniques non-linear programming, digital filters, continuous time filters, A*, unimodel search and multi-model search.

50. The decision unit according to claim 45, wherein said planner module generates at least two MPs having each a plan score assigned thereto in accordance with predetermined criteria; said planner module is further selects the MP having the highest score.

51. The decision unit according to claim 50, wherein said planner module further comprising a simulator sub-module for simulating the operation of each one the at least two MPs for assigning thereto said score.

52. The decision unit according to claim 51, wherein said simulator module employs at least one of the following techniques: dynamic programming, Dijkstra, neural network, genetic algorithm, linear programming, gradient search, Newton search, heuristic, simulated annealing, integral equations, differential equations, difference equations, fuzzy models, random search, learning techniques non-linear programming, digital filters, continuous time filters and A*.

53. The decision unit according to claim 44, wherein said decision unit is responsive to, essentially simultaneous at least two of said events, for generating a combined response.

54. The decision unit according to claim 53, wherein said combined response is dependent upon at least one of the following factors: the degree of the abnormal event, the system state, the mission context, the sub-system status, risk to mission accomplishment and the priority of responses.

55. The decision unit according to claim 53, wherein said combined response follows one of the following four modes:
   a) critical conflict mode;
   b) competitive conflict mode;
   c) cooperative mode; and
   d) complementary mode.

56. The decision unit according to claim 44, wherein said report data is received by employing either or both of polling and interrupt techniques.

57. The decision unit according to claim 44, functionally organized in a multi-level hierarchy.

58. The decision unit according to claim 49, wherein said MP has at least two "mission complete" states.

59. The decision unit according to claim 49, wherein said MP has at least two "mission fail" states.

60. In a vehicle designed for the execution of a mission, a programmable decision unit for managing and controlling the execution of the mission by utilizing a plurality of subsystems and database means for holding and managing data including pre-stored data and data received from said plurality of subsystems, which programmable decision unit comprises a mission plan (MP) for accomplishing the execution of said mission, comprising:
   a plurality of mission segments to be executed by at least one of the subsystems; and the operation of managing and controlling the execution of the mission includes a succession of iterations that includes each:
   (i) assignment of a mission segment associated with a current mission state to at least one of said subsystems;
   (ii) receipt from the subsystems of report data which includes data indicative of the execution status of said mission segment by said at least one subsystem;
   (iii) evaluation of said report data for determining at least either of normal behavior and exceptional event.

* * * * *

UNITED STATES PATENT AND TRADEMARK OFFICE
CERTIFICATE OF CORRECTION

PATENT NO. : 6,122,572
DATED : September 19, 2000
INVENTOR(S) : Arie Yavnai

It is certified that error appears in the above-identified patent and that said Letters Patent is hereby corrected as shown below:

Claim 1,
Last line, after "fashion" insert -- whereby said vehicle becomes an autonomous vehicle (AV) --.

Claim 6,
Line 3, after "programming" insert -- , --;
Line 7, after "techniques" insert -- , --.

Claim 26,
Line 8, delete "of".

Claim 36,
Line 13, change "decision" to -- decisions --.

Signed and Sealed this

Ninth Day of October, 2001

Attest:

*Nicholas P. Godici*

NICHOLAS P. GODICI
*Attesting Officer*   *Acting Director of the United States Patent and Trademark Office*